United States Patent
Narayan et al.

(10) Patent No.: US 11,532,830 B2
(45) Date of Patent: Dec. 20, 2022

(54) INEXPENSIVE METAL-FREE ORGANIC REDOX FLOW BATTERY (ORBAT) FOR GRID-SCALE STORAGE

(71) Applicant: UNIVERSITY OF SOUTHERN CALIFORNIA, Los Angeles, CA (US)

(72) Inventors: Sri Narayan, Arcadia, CA (US); Surya G. K. Prakash, Hacienda Heights, CA (US); Bo Yang, Los Angeles, CA (US); Lena Hoober-Burkhardt, Los Angeles, CA (US); Sankarganesh Krishnamoorthy, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 307 days.

(21) Appl. No.: 16/785,715

(22) Filed: Feb. 10, 2020

(65) Prior Publication Data
US 2020/0176802 A1 Jun. 4, 2020

Related U.S. Application Data

(63) Continuation of application No. 15/458,500, filed on Mar. 14, 2017, now Pat. No. 10,566,643, which is a
(Continued)

(51) Int. Cl.
*H01M 8/18* (2006.01)
*H01M 8/20* (2006.01)
*H01M 8/08* (2016.01)

(52) U.S. Cl.
CPC ............ *H01M 8/188* (2013.01); *H01M 8/08* (2013.01); *H01M 8/20* (2013.01);
(Continued)

(58) Field of Classification Search
None
See application file for complete search history.

(56) References Cited

U.S. PATENT DOCUMENTS

| 3,238,066 A | 3/1966 | Klass et al. |
| 4,578,323 A | 3/1986 | Hertl et al. |
| (Continued) | | |

FOREIGN PATENT DOCUMENTS

| CN | 102035007 A | 4/2011 |
| CN | 101877412 A | 3/2020 |
| (Continued) | | |

OTHER PUBLICATIONS

Office Action dated Apr. 2, 2019 in U.S. Appl. No. 15/458,500, filed Mar. 14, 2017, 24 pgs.
(Continued)

*Primary Examiner* — Wojciech Haske
(74) *Attorney, Agent, or Firm* — Brooks Kushman P.C.

(57) ABSTRACT

A flow battery includes a positive electrode, a positive electrode electrolyte, a negative electrode, a negative electrode electrolyte, and a polymer electrolyte membrane interposed between the positive electrode and the negative electrode. The positive electrode electrolyte includes water and a first redox couple. The first redox couple includes a first organic compound which includes a first moiety in conjugation with a second moiety. The first organic compound is reduced during discharge while during charging the reduction product of the first organic compound is oxidized to the first organic compound. The negative electrode electrolyte includes water and a second redox couple. The second couple includes a second organic compound including a first moiety in conjugation with a second moiety. The reduction product of the second organic compound is oxidized to the second organic compound during discharge.

21 Claims, 36 Drawing Sheets

Related U.S. Application Data continuation of application No. 14/307,030, filed on Jun. 17, 2014, now Pat. No. 9,614,245.

(60) Provisional application No. 61/835,746, filed on Jun. 17, 2013.

(52) U.S. Cl.
CPC ...... *H01M 2250/10* (2013.01); *H01M 2300/0002* (2013.01); *H01M 2300/0082* (2013.01); *Y02B 90/10* (2013.01); *Y02E 60/50* (2013.01)

(56) References Cited

U.S. PATENT DOCUMENTS

| | | | |
|---|---|---|---|
| 6,686,089 | B1 | 2/2004 | Fujiwara et al. |
| 8,338,027 | B2 | 12/2012 | Ohtsuka et al. |
| 2005/0031671 | A1 | 2/2005 | Johnson |
| 2007/0134520 | A1 | 6/2007 | Shimomura et al. |
| 2007/0184309 | A1 | 8/2007 | Gust, Jr. et al. |
| 2009/0017379 | A1 | 1/2009 | Inatomi et al. |
| 2009/0308752 | A1 | 12/2009 | Evans et al. |
| 2011/0284456 | A1 | 11/2011 | Brozell |
| 2013/0224538 | A1 | 8/2013 | Jansen et al. |
| 2014/0030572 | A1* | 1/2014 | Esswein ............ H01M 10/4242 429/105 |
| 2014/0051003 | A1 | 2/2014 | Esswein et al. |
| 2015/0236543 | A1 | 8/2015 | Brushett et al. |
| 2015/0243991 | A1 | 8/2015 | Huskinson et al. |
| 2016/0043423 | A1 | 2/2016 | Huskinson et al. |

FOREIGN PATENT DOCUMENTS

| | | |
|---|---|---|
| JP | 2002/100398 A1 | 4/2002 |
| JP | 2008/222559 A1 | 9/2008 |
| WO | 95/07555 | 3/1995 |
| WO | 2004/014362 A1 | 2/2004 |
| WO | 2011/131959 A1 | 10/2011 |
| WO | 2012/005700 A1 | 1/2012 |
| WO | 2015/148358 A1 | 10/2016 |

OTHER PUBLICATIONS

Chaudry, Z.Z. et al., "Streptozotocin is equally diabetogenic whether administered to fed or fasted mice," Laboratory Animals 47(4), 2013, pp. 257-265.

Dulloo, A.G. et al., "Differential Effects of High-Fat Diets Varying in Fatty Acid Composition on the Efficiency of Lean and Fat Tissue deposition During Weight Recover After Low Food Intake," Metabolism, v. 44, n. 2 (Feb. 1995), pp. 273-279.

Halburg, N. et al., "Effect of intermittent fasting and refeeding on insulin action in healthy men," J. Appl. Physiol. 99, 2005, pp. 2128-2136.

Karbowska, J. et al., "Intermittent fasting up-regulates Fsp27/Cidec gene expression in white adipose tissue," Nutrition 28, 2012, pp. 294-299.

Lim, E.L. et al., "Reversal of type 2 diabetes: normalisation of beta cell function in association with decreased pancreas and liver triacylglyercol," Diabetologia (2011), 54, pp. 2506-2514.

Matschinsky, F.M. et al., "Adaptations of alpha- and beta-cells of Rat and Mouse Pancreatis Islets to Starvation, to Refeeding after Starvation, and to Obesity," J. Clin. Invest., v. 65, 1980, pp. 207-218.

Alt, H., "Investigation into the use of quinone compounds-for battery cathodes," Electrochimica Acta, v. 17, Issue 5, May 1972, pp. 873-887—Abstract Only, 3 pgs.

Aziz, M.J., U.S. Appl. No. 61/705,845, filed Sep. 26, 2012, "Small Organic Molecule Based Flow Battery," 29 pgs.

Aziz, M.J., U.S. Appl. No. 61/823,258, filed May 14, 2013, "Small Organic Molecule Based Flow Battery," 41 pgs.

Aziz, M.J., U.S. Appl. No. 61/838,589, filed Jun. 24, 2013, "Small Organic Molecule Based Flow Battery," 61 pgs.

Bhatt, D.P. et al., "Cyclic voltammetric study of quinone-hydroquinone organic system in aqueous magnesium perchlorate electrolyte," J. of Power Sources, Issue 2, Jun. 1993, pp. 177-186—Abstract Only, 2 pgs.

Conant, J.B. et al., "Reduction Potentials of Quinones. II. The Potentials of Certain Derivatives of Benzoquinone, Naphthoquinone and Anthraquinone," Cambridge 38, Massachuetts, 1924, pp. 1858-1881.

Fikile, R. et al., U.S. Appl. No. 61/940,997, filed Feb. 18, 2014, "Aqueous All-Organic Redox Flow Battery," 19 pgs.

International Search Report dated Oct. 28, 2014 of PCT/US2014/042775 filed Jun. 17, 2014, 4 pgs.

Narayan, S. et al., U.S. Appl. No. 61/835,746, filed Jun. 17, 2013, "Inexpensive Metal-Free Organic Redox Flow Battery (ORB) for Grid-Scale Storage," 35 pgs.

Nawar, S. et al., "Benzoquinone-hydroquinone couple for flow battery," In Materials Research Society Symposium Proceedings, Jan. 25, 2013 (E-pub.), v. 1491, mrsf12-1491-c-08-09, 10 pgs.

Office Action dated Apr. 22, 2016 in U.S. Appl. No. 14/823,546, filed Aug. 11, 2016, 16 pgs.

Office Action dated Jul. 5, 2016 in U.S. Appl. No. 14/431,175, filed Mar. 25, 2016, 23 pgs.

Partial Supplementary European Search Report dated Nov. 2, 2016 for EP Appn. No. 14814606.1 filed Jan. 20, 2016, 6 pgs.

Wang, W. et al., "Anthraquinone with tailored structure for a nonaqueous metal organic redox flow battery," Chemical Communications, 2012, v. 48, pp. 6669-6670.

Xu, Y. et al., "Electrochemical reaction mechanism of tiron in acidic aqueous solution," Advanced Materials Research, 2012, v. 396-398, pp. 1730-1735.

Xue, Y., "Novel organic redox flow batteries using soluble quinonoid compounds as positive materials," published in 2009 World Non-Grid-Connected Wind Power and Energy Conference, Sep. 2009, 4 pgs—Abstract Only (2 pgs).

Yan, X. et al., "A study of tiron in aqueous solutions for redox flow battery application," Electrochimica Acta 55 (2010), pp. 715-720.

European Patent Office Communication dated Dec. 13, 2018 for EP Appn. No. 14814606.1, 6 pgs.

* cited by examiner cronconic acid squaric acid deltic acid

Sulfonation and Oxidation

Trifluoromethylation

Hydroxylation

Amination

Anthraquinone sulfonic acid

Hydroquinone sulfonic acid

INEXPENSIVE METAL-FREE ORGANIC REDOX FLOW BATTERY (ORBAT) FOR GRID-SCALE STORAGE

CROSS-REFERENCE TO RELATED APPLICATIONS

This application is a continuation of U.S. Ser. No. 15/458,500 filed Mar. 14, 2017, now U.S. Pat. No. 10,566,643 issued Feb. 18, 2020, which is a continuation of U.S. application Ser. No. 14/307,030 filed Jun. 17, 2014, now U.S. Pat. No. 9,614,245 issued Apr. 4, 2017, which, in turn, claims the benefit of U.S. provisional application Ser. No. 61/835,746 filed Jun. 17, 2013, the disclosures of which are hereby incorporated in their entirety by reference herein.

STATEMENT REGARDING FEDERALLY SPONSORED RESEARCH OR DEVELOPMENT

This invention was made with government support under DE-AR0000353 awarded by the Department of Energy/ARPA. The government has certain rights in the invention.

TECHNICAL FIELD

The present invention is related to metal-free organic redox flow batteries.

BACKGROUND

Organic redox flow batteries are particularly attractive for meeting the demanding performance, cost and sustainability requirements for grid-scale energy storage. It is widely known that the intermittency of renewable energy generation from solar and wind resources necessitates that large-scale energy storage be available for load-shifting or peak-shaving on the grid, at sub-station, and even at residences. With an estimated global electricity production of about 50-60 TeraWatt hours/day, even if only 20% of this energy is stored, deployment of 10-15 Gigatons of batteries over a 15 year period assuming a modest specific energy of 50 Wh/kg is required. A point of reference for the scale of assessing this demand is that it is five times as large as the world's iron and steel industry in that 2.8 Gigatons of iron ore is mined every year worldwide. The astonishing magnitude of this demand for batteries for grid-scale energy storage imposes the most stringent requirements not only on cost and durability, but also on eco-friendliness and sustainability. The requirement of eco-friendliness and sustainability has only been recently emphasized in the Department of Energy's approach to new technology solutions.

The capital cost of a battery system is largely determined by the materials cost, complexity of the system design, and performance features such as—energy density, power density, durability, and efficiency. Sustainability is determined by resource limitations, eco-friendliness of the manufacturing and recycling processes. Although some of the more mature systems like vanadium redox and zinc-chlorine are gradually moving towards large-scale implementation, the high associated expenses mandate cost reductions. Moreover, some of the prior art battery technologies use heavy metals such as vanadium and/or chromium which are environmentally undesirable. Iron-air and manganese dioxide-carbon systems are promising from a cost and sustainability standpoint. However, these technologies are not based on renewable resources thereby rendering their long term sustainability uncertain. It should be appreciated that a battery based on carbon resources that avoids the use of metals can provide long-term sustainability in addition to being inexpensive.

Accordingly, there is a need for improved redox flow battery systems that are eco-friendly while using inexpensive material.

SUMMARY

The present invention solves one or more problems of the prior art by providing, in at least one embodiment, an organic redox flow battery (ORBAT) flow battery. The flow battery includes a positive electrode, a positive electrode electrolyte, a negative electrode, a negative electrode electrolyte, and a polymer electrolyte membrane interposed between the positive electrode and the negative electrode. The positive electrode electrolyte includes water and a first redox couple. The positive electrode electrolyte flows over and contacts the positive electrode. The first redox couple includes a first organic compound which includes a first moiety having formula 1 in conjugation with a second moiety having formula 2 and a reduction product of the first organic compound:

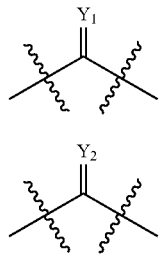

wherein:

$Y_1$ and $Y_2$ are each independently O or NR; and

R is H or carbon atom.

The first organic compound is reduced during discharge while during charging the reduction product of the first organic compound is oxidized to the first organic compound. The negative electrode electrolyte includes water and a second redox couple. The negative electrode electrolyte flows over and contacts the positive electrode. The second couple includes a second organic compound including a first moiety having formula 3 in conjugation with a second moiety having formula 4 and a reduction product of the second organic compound:

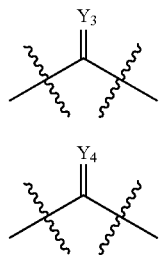

wherein:

Y$_3$ and Y$_4$ are each independently O or NR$_1$; and

R$_1$ is H or carbon atom; and

The reduction product of the second organic compound is oxidized to the second organic compound during discharge while during charging, the second organic compound is reduced to the reduction product of the second organic compound.

In another embodiment, an organic redox flow battery that uses quinones and hydroquinones to generate electricity is provided. The flow battery includes a battery cell which includes a positive electrode, a negative electrode, and a polymer electrolyte membrane. The polymer electrolyte membrane is interposed between the positive electrode and the negative electrode. The positive electrode electrolyte includes water and a first quinone redox couple. The positive electrode electrolyte flows over and contacts the positive electrode. The first quinone redox couple includes a first quinone and a first hydroquinone. During discharge of the flow battery, the first quinone is reduced to the first hydroquinone. During charging of the flow battery, the first hydroquinone is oxidized to the first quinone. The negative electrode electrolyte includes water and a second quinone redox couple. The negative electrode electrolyte flows over and contacts the negative electrode. The second quinone redox couple includes a second quinone and a second hydroquinone. During discharge, the second hydroquinone is oxidized to the second quinone. Advantageously, the quinones have a charge capacity in the range of 200-490 Ah/kg, and cost about $5-10/kg or $10-20/kWh, leaving ample scope for achieving a target of 100/kWh for the entire battery system. Moreover, the organic redox flow battery does not use any heavy metals such as vanadium, chromium or zinc, and also avoids volatile organic solvents such as those used in lithium batteries. Finally, the organic redox battery is demonstrated to be useful for gridscale energy storage applications in a scalable prototype flow cell.

In another embodiment, a flow battery that uses a quinone and hydroquinone on the positive side is provided. The flow battery includes a positive electrode, a positive electrolyte, a negative electrode, a negative electrode electrolyte, and a polymer electrolyte membrane. The polymer electrolyte membrane is interposed between the positive electrode and the negative electrode. The positive electrode electrolyte includes water and a first quinone redox couple. The positive electrode electrolyte flows over and contacts the positive electrode. The first quinone redox couple includes a first quinone and a first hydroquinone with the first quinone being reduced to the first hydroquinone during discharge. Characteristically, the first quinone is selected from the group consisting of benzoquinone and benzoquinones that are substituted with an electron withdrawing group. In a some variation, the quinone may also include electron donating groups.

In another embodiment, a flow battery that uses a quinone and hydroquinone on the negative side is provided. The flow battery includes a positive electrode, a positive electrolyte, a negative electrode, a negative electrode electrolyte, and a polymer electrolyte membrane. The polymer electrolyte membrane is interposed between the positive electrode and the negative electrode. The positive electrode electrolyte flows over and contacts the positive electrode. The negative electrode electrolyte includes water and a quinone redox couple. The negative electrode electrolyte flows over and contacts the positive electrode. The quinone redox couple includes a quinone and a hydroquinone with the hydroquinone being oxidized to the quinone during discharge. Characteristically, the quinone includes a component selected from the group consisting of anthraquinone and anthraquinone that are substituted with an electron donating group. In a variation, the quinone may also include electron withdrawing groups.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "standard electrode potential" means the electrical potential (i.e., the voltage developed) of a reversible electrode at standard state in which solutes are at an effective concentration of 1 mol/liter, the activity for each pure solid, pure liquid, or for water (solvent) is 1, the pressure of each gaseous reagent is 1 atm., and the temperature is 25° C. Standard electrode potentials are reduction potentials.

The term "quinone" refers to a class of cyclic organic compounds that include fully conjugated —C(=O)— groups and carbon-carbon double bonds. In one example, the term "quinone" refers to organic compounds that are formally derived from aromatic compounds by replacement of an even number of —CH= groups with —C(=O)— groups with the double bonds rearranged as necessary to provide a fully conjugated cyclic dione, tetra-one, or hexa-one structure.

The term "conjugated" when referring to two functional groups (having a double bond) means that the two groups are part of a connected system of p-orbital delocalized electrons with alternating single and multiple bonds. The two groups also include a degree of unsaturation. For example, conjugated groups may include multiple double bonds or aromatic groups (e.g., phenyl) between the groups. Moreover, if the two groups adjacent, the groups are also conjugated.

Abbreviations:

"MSE" is mercury sulfate reference electrode.

"MMO" is mixed mercury-mercuric oxide.

"DMF" is dimethylformamide.

"AQS" is anthraquinone-2-sulfonic acid.

"AQDS" is anthraquinone-2,6-disulfonic acid.

"BQDS" is 1,2-benzoquinone-3,5-disulfonic acid.

"DHA" is 1,8-dihydroxy anthraquinone.

"CV" is cyclic voltammetry.

"RDE" is rotating disk electrode.

Figure 1:
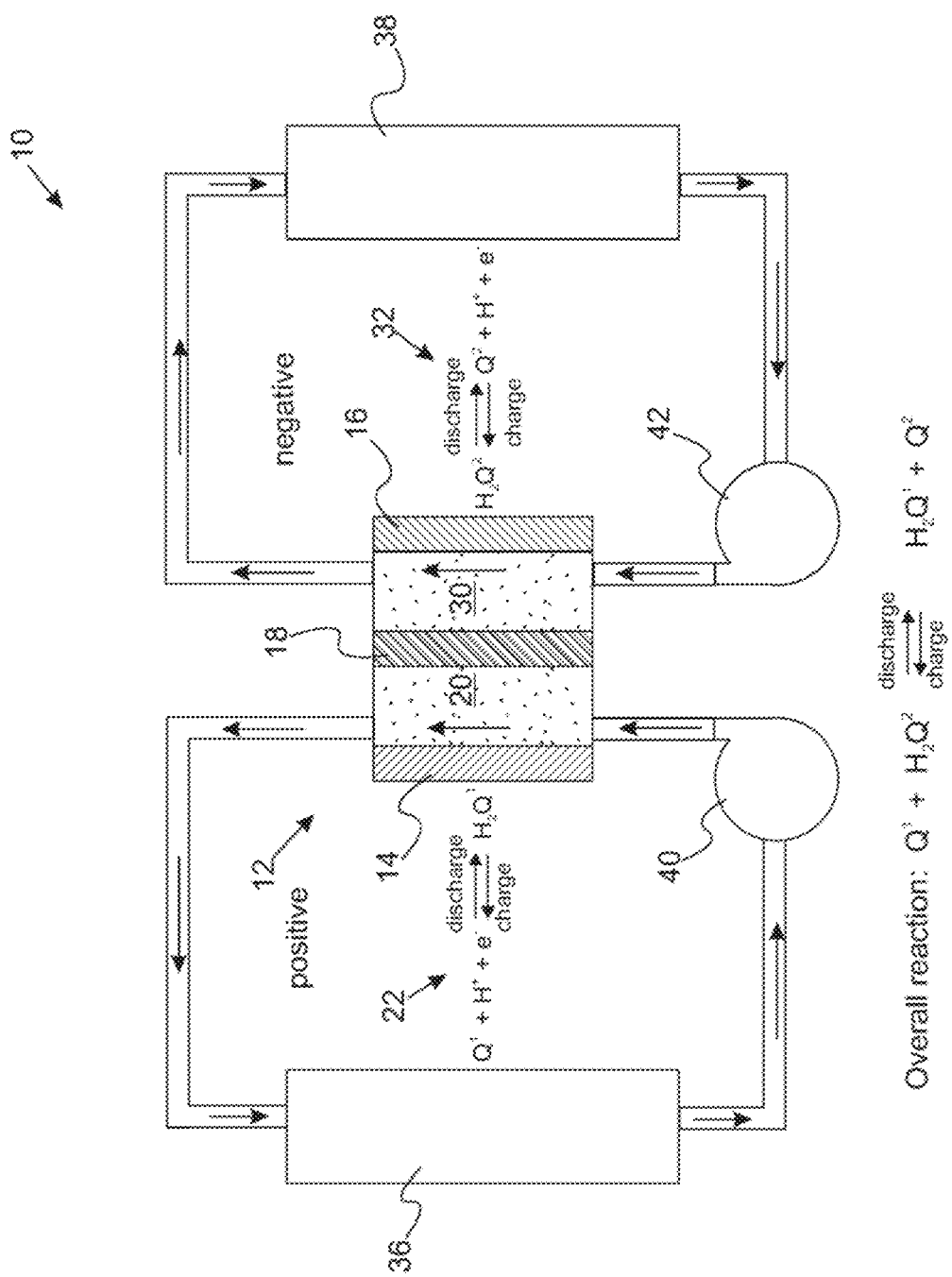
FIG. 1 provides a schematic illustration of a flow battery that includes electrolytes that include quinones and hydroquinones.

With reference to FIG. 1, a schematic illustration of a flow battery that includes a pair of organic redox couples is provided. Flow battery 10 includes battery cell 12 which includes positive electrode 14, negative electrode 16, and polymer electrolyte membrane 18. In the context of a flow cell, reduction occurs during discharge at the positive electrode and oxidation occurs during discharge at the negative electrode. Conversely, oxidation occurs during charging at the positive electrode and reduction occurs during charging at the negative electrode. Polymer electrolyte membrane 18 is interposed between positive electrode 14 and negative electrode 16. Positive electrode electrolyte 20 includes water and a first redox couple 22. In FIG. 1, a first quinone redox couple is depicted as an example. Positive electrode electrolyte 20 flows over and contacts positive electrode 14. First redox couple 22 includes a first organic compound $Q^1$ and a reduction product $H_2Q^1$ of the first organic compound. In a refinement, the first organic compound which include a first moiety having formula 1 in conjugation with a second moiety having formula 2 and a reduction product of the first organic compound:

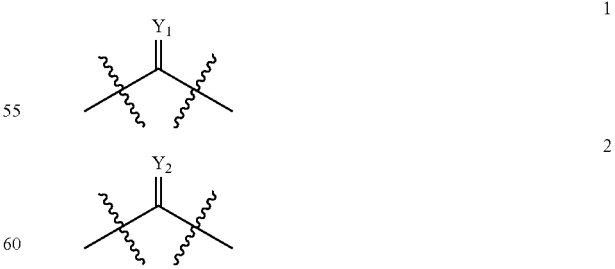

wherein:

$Y_1$ and $Y_2$ are each independently O or NR; and

R is H or carbon atom.

During discharge of the flow battery, the first organic compound $Q^1$ is reduced to the first reduction product $H_2Q^1$ of the first organic compound. During charging of the flow battery, the first reduction product $H_2Q^1$ is oxidized to the first organic compound $Q^1$. Negative electrode electrolyte 30 includes water and a second redox couple 32. Negative electrode electrolyte 30 flows over and contacts the negative electrode 16. In FIG. 1, a second quinone redox couple is depicted as an example. The second redox couple 32 includes a second organic compound $Q^2$ and a reduction product $H_2Q^2$ of the second organic compound. In a refinement, the second organic compound includes a first moiety having formula 3 in conjugation with a second moiety having formula 4 and a reduction product of the first organic compound

Figure 2:
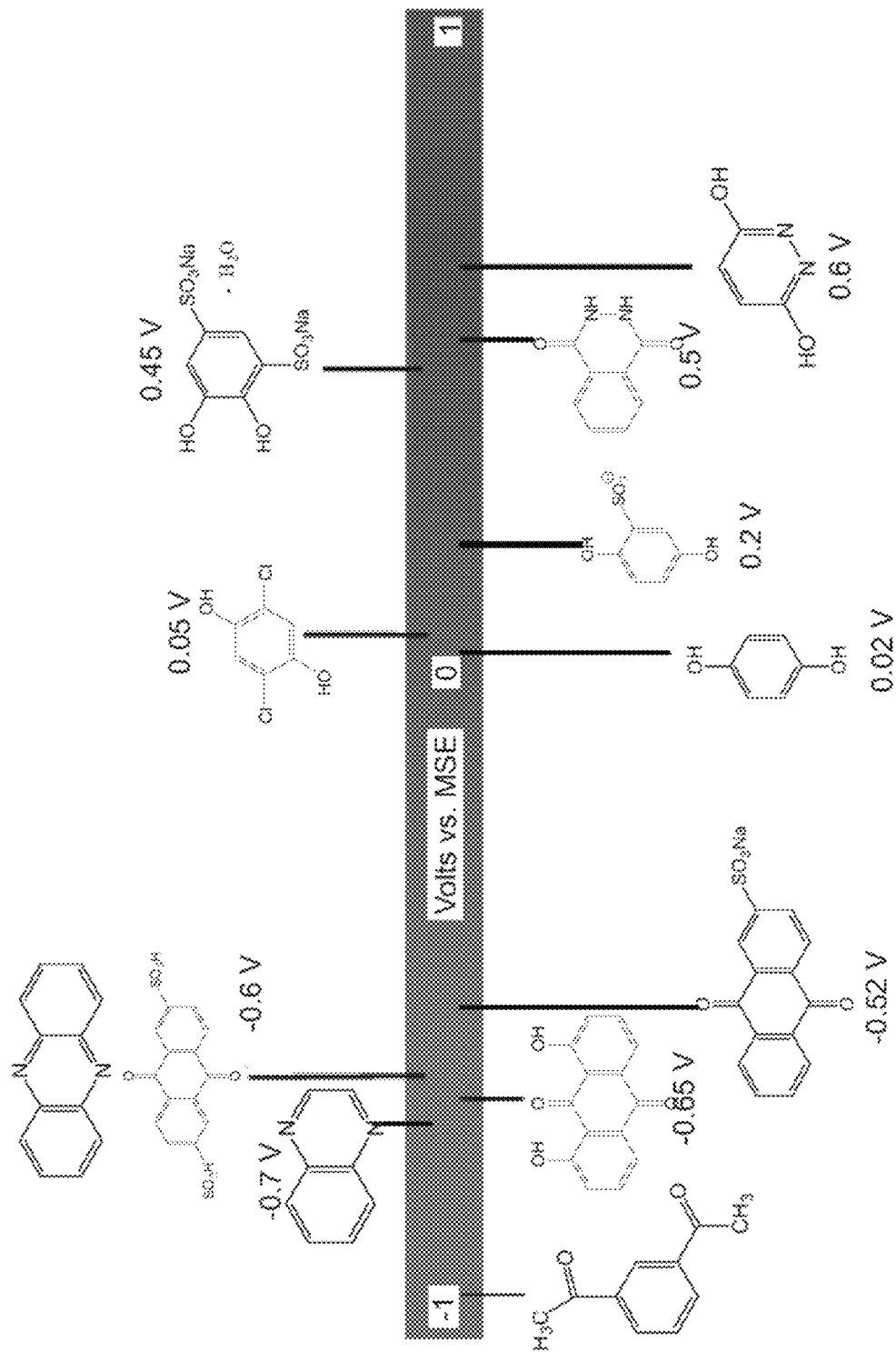
FIG. 2 provides a figure showing the spread of half-wave redox potentials for various compounds.

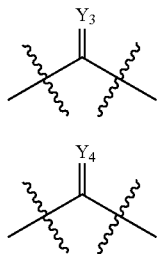

wherein:

$Y_3$ and $Y_4$ are each independently O or $NR_1$; and $R_1$ is H or carbon atom. During discharge, the reduction product $H_2Q^2$ is oxidized to the second organic compound $Q^2$. In a refinement, the first organic compound (e.g., first quinone) has a standard electrode potential that is at least 0.3 volts higher than a standard electrode potential (e.g., MSE) for the second organic compound (e.g., the second quinone). Compounds having standard electrode potential greater than 0.3 relative to a standard electrode potential (e.g., MSE or standard hydrogen electrode) are useful in the negative electrode electrolyte while compounds having standard electron potentials less than 0.3 relative to a standard electrode potential (e.g., MSE or standard hydrogen electrode) are useful in the positive electrode electrolyte. FIG. 2 provides a figure showing the spread of half redox potentials for various compounds. In another refinement, the first organic compound (e.g., first quinone) has a standard electrode potential greater than 0.6 volts relative to a standard electrode and/or the second organic compound (e.g., first quinone) has a standard electrode potential less than 0.3 volts relative to a reference electrode (e.g, MSE, MMO or standard hydrogen electrode). In still another refinement, the first organic compound (e.g., first quinone) has a standard electrode potential greater than 0.4 volts relative to a standard electrode (e.g., MSE or standard hydrogen electrode) and/or the second organic compound (e.g., first quinone) has a standard electrode potential less than or equal to 0.2 volts relative to a standard electrode (e.g., MSE or standard hydrogen electrode). In one refinement, no non-aqueous organic solvents are sued in the flow cell. In another refinement, solvents in addition to water are used. Examples of additional solvents include, but are not limited to, dimethylformamide, $C_{1-4}$ alcohols, acetone nitrile, and combinations thereof. The positive electrode electrolyte and the negative electrode electrolyte can both be operated under acidic (e.g. pH from 0.5 to 6.5) or basic (e.g., pH from 8 to 14) conditions. In one useful refinement, the positive electrode electrolyte and/or the negative electrode electrolyte each independently have a pH from 9 to 14. Advantageously, no soluble heavy metals are used in this battery system. Moreover, the battery cell can be operated in an acidic or alkaline environment.

Still referring to FIG. 1, flow battery 10 further includes a positive electrode reservoir 36 in fluid communication with the positive electrode 14. The positive electrode electrolyte 20 is stored in the positive electrode reservoir 36 to charge and discharge the flow battery. The positive electrode electrolyte cycles through battery cell 12 from positive electrode reservoir 36 via the pumping action of pump 40. A negative electrode reservoir 36 is in fluid communication with the negative electrode 16. The negative electrode electrolyte 30 is stored in the negative electrode reservoir 36 to charge and discharge the flow battery. The negative electrode electrolyte cycles through battery cell 12 from negative electrode reservoir 38 via the pumping action of pump 42.

In a variation as set forth above, the flow battery utilizes a first quinone and a second quinone. Quinones are known to undergo fast electrochemical transformations which are necessary for sustaining high discharge and charge rates in a battery. The facility of electrochemical transformation is characterized by the kinetic parameter termed exchange current density. The standard rate constant for the quinone/hydroquinone couple is of the order of $10^{-5}$ m $s^{-1}$. This value of rate constant corresponds to very fast reaction rates comparable to other electrochemical couples such as the vanadium redox couple. In general, useful quinones are highly soluble in water, chemically stable in strongly acidic/basic solutions, capable of high cell voltage of about 1 V, round-trip efficiency >80%, and high discharge rate. By selecting a first quinone and a second quinone that are far apart in electrode potential, the cell voltage can be maximized to 1 V. Moreover, the electrode potentials can be modified favorably by substituent groups on the quinones as set forth below. Based on data provided in Table 1 and 2 (J. B. Conant and L. F. Fieser, *J. Am. Chem. Soc.*, 46, 1858, 1924), the choice of materials to achieve the highest cell voltage would be a benzoquinone derivative with a strongly electron-withdrawing substituent (e.g. sulfonic acid) for the positive electrode and an anthraquinone derivative with a strongly electron-donating group (e.g., N-dimethylamino) for the negative electrode. Other materials such as napthaquinones have a medium electrode potential and hence are not desirable for either electrode.

TABLE 1

Properties of some common quinones

| Quinone | Specific Capacity, Ah/kg | Electrode Potential vs. NHE, V | Suitability for Positive or Negative Electrode |
|---|---|---|---|
| Tetrachloro-1,2-benzoquinone | 218 | 0.823 | Positive Elec. |
| 1,2-benzoquinone (ortho) | 496 | 0.786 | Positive Elec. |
| 1,4-benzoquinone (para) | 496 | 0.700 | Positive Elec. |
| 2-hydroxyl1,4-benzoquinone | 432 | 0.596 | Not desirable |
| 1,4-naphthaquinone-2-sulfonic acid | 194 | 0.534 | Not desirable |
| 1,4-naphthaquinone | 339 | 0.483 | Not desirable |
| 2-hydroxy-1,4-naphthaquinone | 308 | 0.357 | Not desirable |
| 9,10-anthraquinone-1-sulfonic acid | 186 | 0.183 | Negative Elec. |
| 9,10-anthraquinone | 257 | 0.157 | Negative Elec. |
| 1-hydroxy-9,10-anthraquinone | 236 | 0.131 | Negative Elec. |

TABLE 2

Effect of substituent of electrode potential and solubility

| Substituent Type | Effect on Electrode Potential, mV | Effect on Solubility |
| --- | --- | --- |
| Sulfonic acid —$SO_3H$ | +70 | increases |
| Chloro —Cl | +10 to +46 | decreases |
| Hydroxyl —OH | −100 | increases |
| Methoxyl —$OCH_3$ | −90 | decreases |
| Ring addition (4-carbon) | −220 | decreases |
| Methyl —$CH_3$ | −50 | decreases |
| -ortho to -para quinone | −130 | no change |

In general, the unsubstituted quinones have limited solubility in water. However, the solubility of the quinones can be increased substantially with sulfonic acid and the hydroxyl substituents (Table 2). For example, benzoquinone has a solubility of 0.1 moles/liter, while benzoquinone disulfonic acid has a solubility of 1.7 moles/liter at 25° C. Solubility of the quinones can be increased further by operating at 45° C. So achieving the solubility value of 2 to 3 moles/liter is quite feasible with the quinone family of compounds. Table 3 summarizes the benefits of using quinones in a redox flow battery:

TABLE 3

Features and Benefits of Organic Redox Flow Battery

| Feature of Organic Redox Flow Battery | Benefits for System Level Metrics of Grid-Scale Energy Storage System |
| --- | --- |
| Quinones can be derived from inexpensive raw materials such as asphalt ($0.30/kg) | Makes the cost target of $100/kWh readily attainable as material costs are in the range of $10-20/kWh |
| Quinones undergo fast electrochemical redox reactions | High discharge and charge rates can be achieved High roundtrip efficiency of >80% can be achieved |
| Quinones have a specific capacity that ranges from 200-490 Ah/kg and cell voltage in the range of 0.8 to 1.0 V, and specific energy of 50-100 Wh/kg | High energy density reduces materials cost to be 410-20/kWh |
| A variety of quinone compounds can be prepared with different substituent groups | Voltage, stability and solubility can be readily tuned for use. |
| Only water-based solutions are used in the tanks. Volatile organic solvents are completely avoided. | Eco-friendly Extremely safe for scale up less expensive from materials and regulatory standpoint |
| Avoids the use of soluble heavy metals to store energy | Environmentally friendly Sustainable Cost target can be easily attained |
| Deactivated materials at end of battery life can be recycled by simple chemical reactions | Recycling will be easy Low material cost Eco-friendly; sustainable |

In a variation, the first quinone is described by formula 5 or 6:

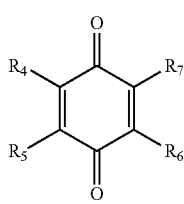

(5)

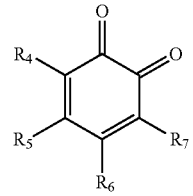

Figure 3A:
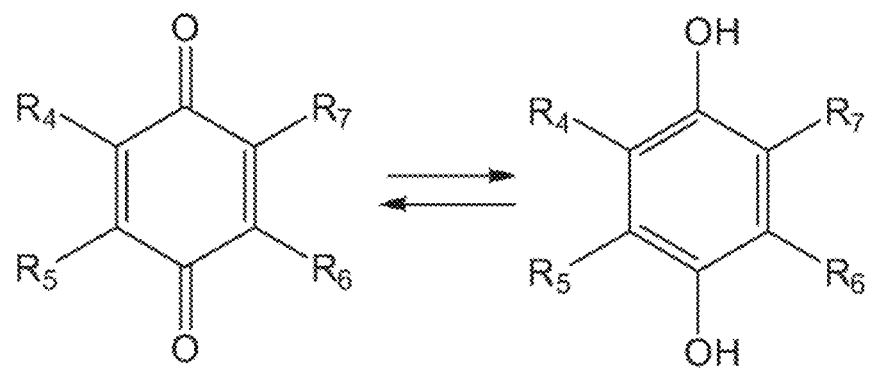
FIGS. 3A-B provide specific examples for compounds having formula (5) along with the related hydroquinones.
Figure 3A:
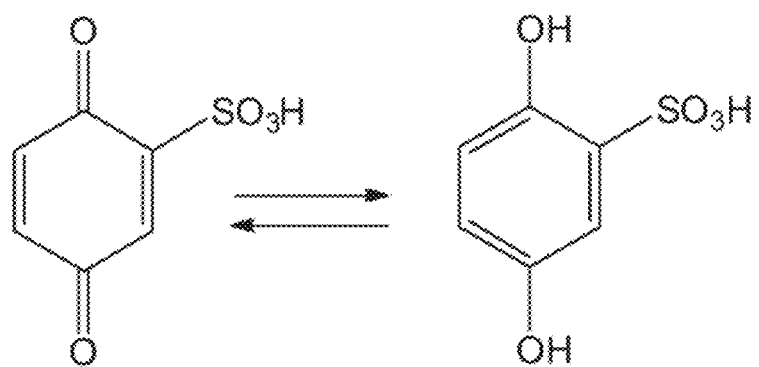
Figure 3A:
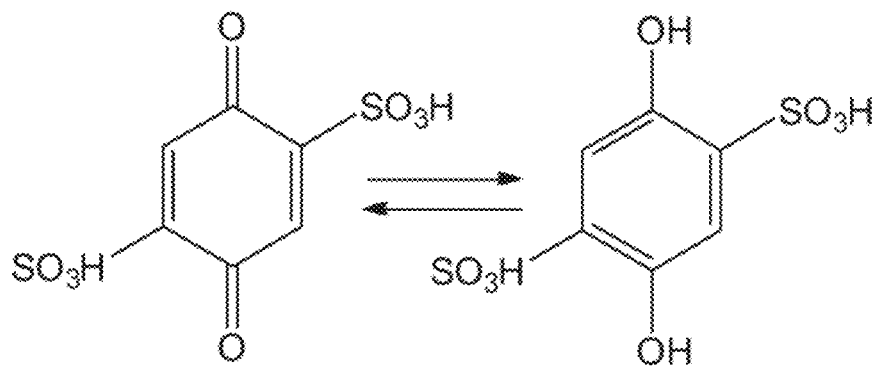
Figure 3B:
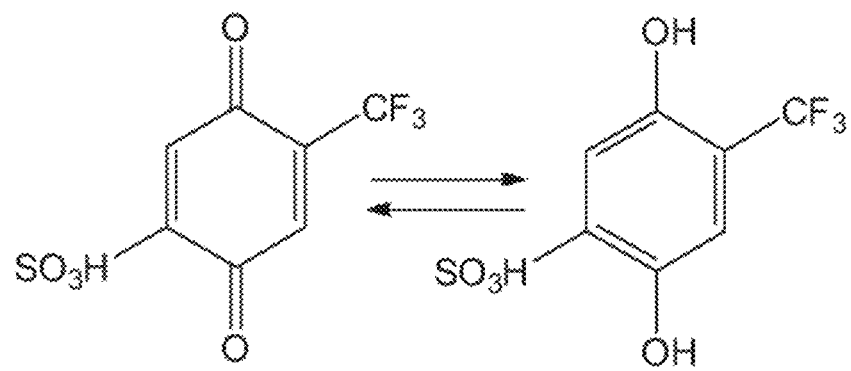
Figure 3B:
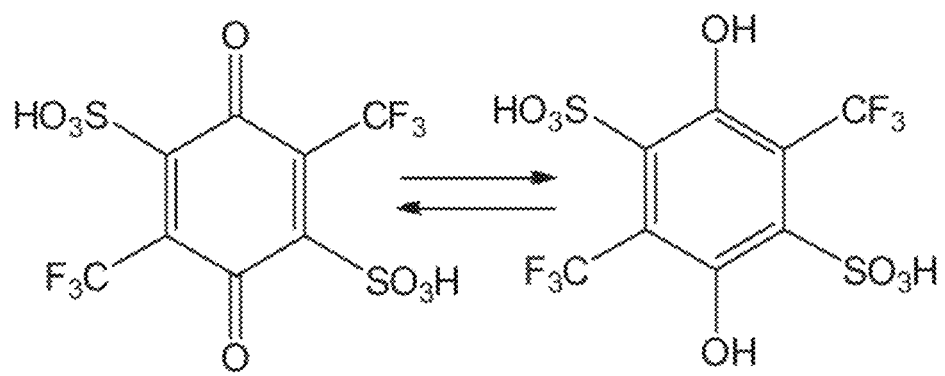
Figure 4:
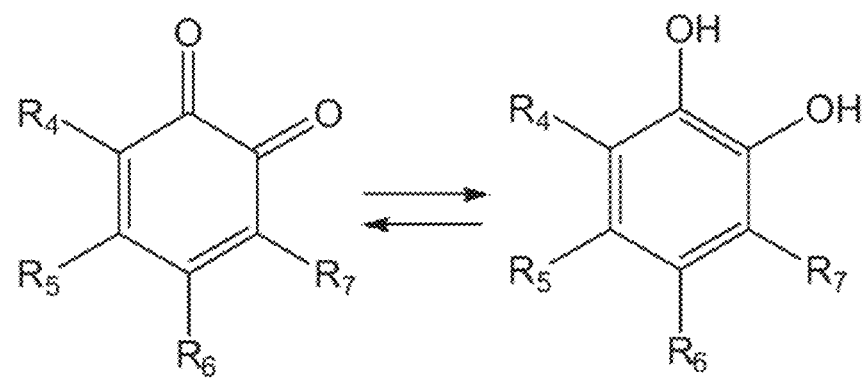
FIG. 4 provides specific examples for compounds having formula (6) along with the related hydroquinones.
Figure 4:
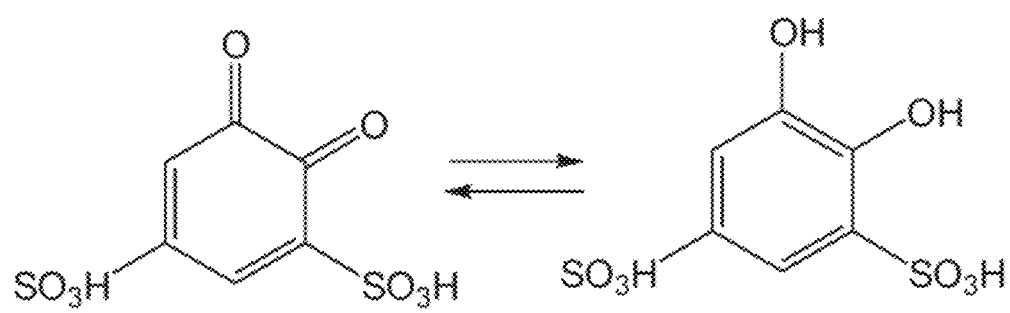
Figure 4:
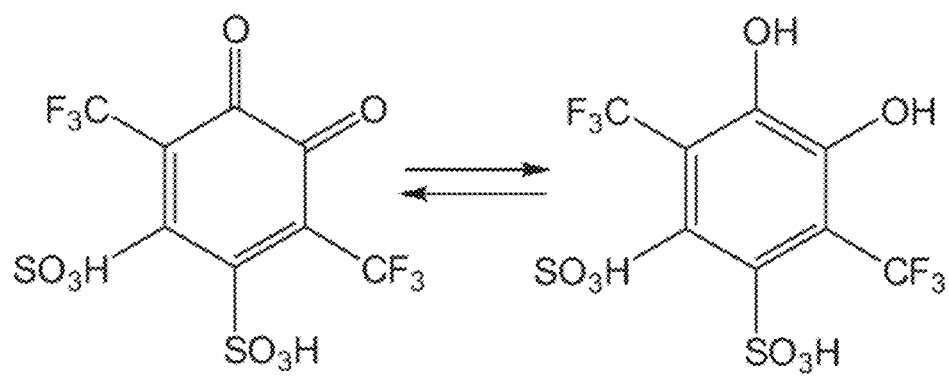

(6)

wherein $R_4$, $R_5$, $R_6$, $R_7$ are each independently selected from the group consisting of hydrogen and electron withdrawing groups. In a further refinement, $R_4$, $R_5$, $R_6$, $R_7$ are each independently H, —$NO_2$, —$N(R_2)_3^+X^-$, —$CF_3$, $CCl_3$, —CN, —$SO_3H$, —$PO_3H_2$, —COOH, —OH, —$O^-M^+_2$, —$SO_3^-$ $M^+$, —$PO_3^{2-}M^+_2$, —$COO^-M^+$, —$COOR_2$, F, Cl, Br, —CHO, or —$COR_2$ where $R_2$ is H or $C_{1-10}$ alkyl, $M^+$ is a positively charged counter-ion, and $X^-$ is a negatively charge counter-ion. In a further refinement, $R_4$, $R_5$, $R_6$, $R_7$ are each independently H, —$NO_2$, —$CF_3$, or —$SO_3H$. In one refinement, at least one of $R_4$, $R_5$, $R_6$, $R_7$ is an electron withdrawing group that can increase the reduction potential of the compound having the group. In a refinement, 1, 2, 3, or 4 of $R_4$, $R_5$, $R_6$, $R_7$ are electron withdrawing groups. Examples of such electron withdrawing groups include but are not limited to, —$NO_2$, —$N(R_2)_3^+X^-$, —$CF_3$, $CCl_3$, —CN, —$SO_3H$, —$PO_3H_2$, —COOH, —OH, —$O^-M^+$, —$SO_3^-M^+$, —$PO_3^{2-}M^+$, —$COO^-M^+$, —$COOR_2$, F, Cl, Br, —CHO, or —$COR_2$ where $R_2$ is H or $C_{1-10}$ alkyl, $M^+$ is a positively charged counter-ion (e.g., $Na^+$, $K^+$, and the like). As described herein, when electron withdrawing groups are used as substituents for organic compounds in the negative electrode electrolyte such groups can provide further separation from the reduction potential of the positive electrode electrolyte. In another refinement, $R_8$-$R_{15}$ include one or more (e.g., 1, 2, 3) electron donating group. Examples of such electron donating groups include, but are not limited to, $C_{1-10}$ alkyl, $NH_2$, —$NHR_2$, —$N(R_2)_2$, —$O^-M^+_2$, —NHCOR$_2$, —OR$_2$, —CH$_3$, —C$_2$H$_5$, or phenyl where R$_2$ is H or $C_{1-10}$ alkyl and M$^+$ is a positively charged counter ion. In still another refinement, at least one of $R_8$-$R_{15}$ is a functional group that increases water solubility. Examples of such functional groups include, but are not limited to, —SO$_3$H, —PO$_3$H$_2$, —COOH, —OH, —O$^-$M$^+$, —SO$_3$$^-$M$^+$, —PO$_3$$^{2-}$M$^+_2$, —COO$^-$M$^+$, pyridinyl, imidazoyl, or pyrroyl, where M$^+$ is a positively charged counter ion (e.g., Na$^+$, K$^+$, or the like). Advantageously, the compounds having formula 5 and 6 are used in the positive electrode electrolyte. FIGS. 3A and 3B provide specific examples for compounds having formula (5) on the left side along with the related hydroquinones on the right side. FIG. 4 provides specific examples for compounds having formula (6) along with the related hydroquinones. In a refinement, salts (e.g., sodium and potassium salts) of the compounds in FIGS. 3A, 3B, and 4 can also be used in the flow battery. Such salts are formed from acidic hydrogen and other OH groups.

In a variation, the second quinone is described by formula 7:

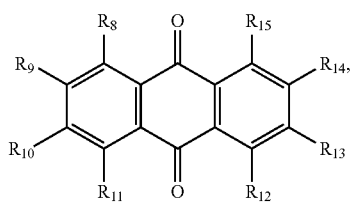

Figure 5A:
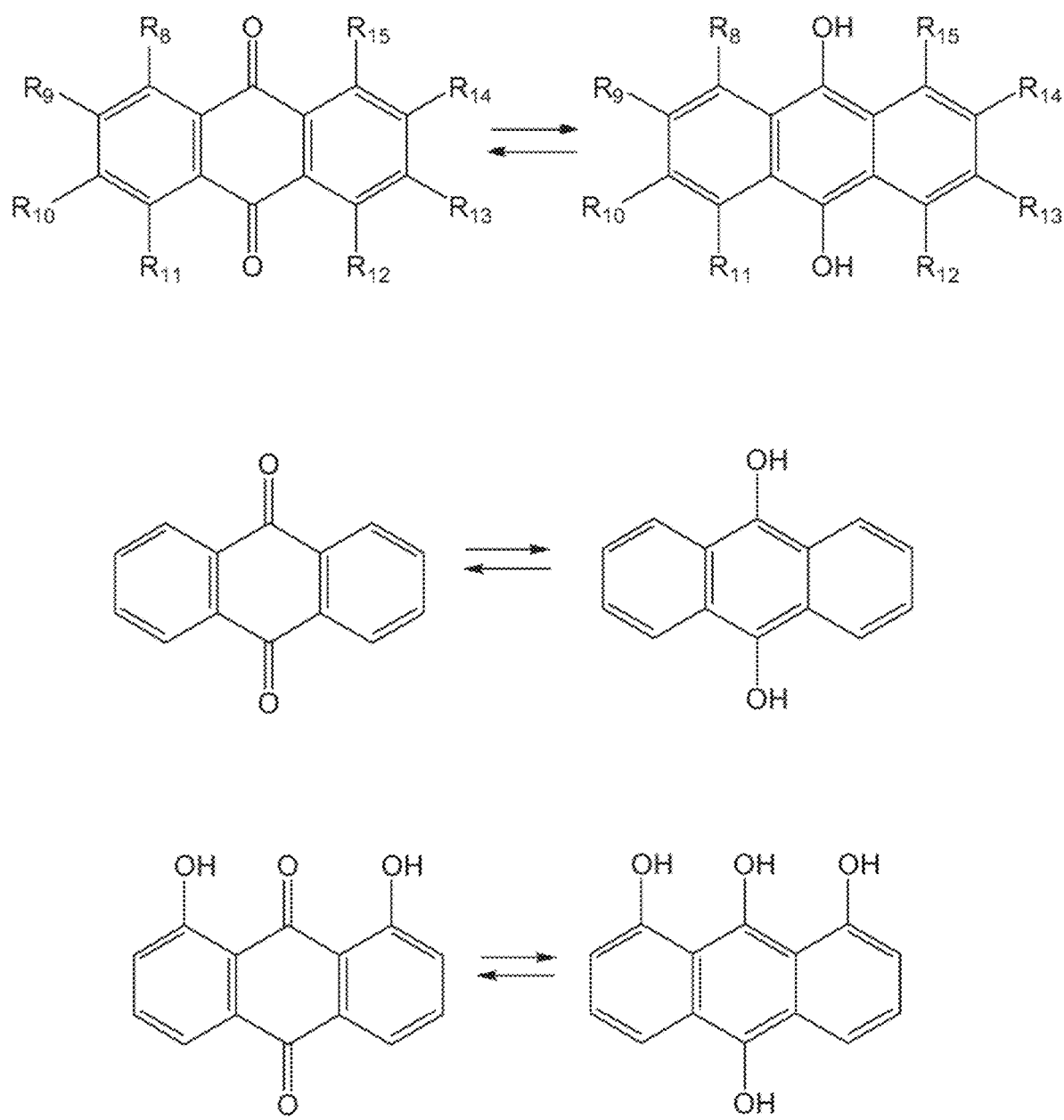
FIGS. 5A-B provide specific examples for compounds having formula (7) along with the related hydroquinones.
Figure 5B:
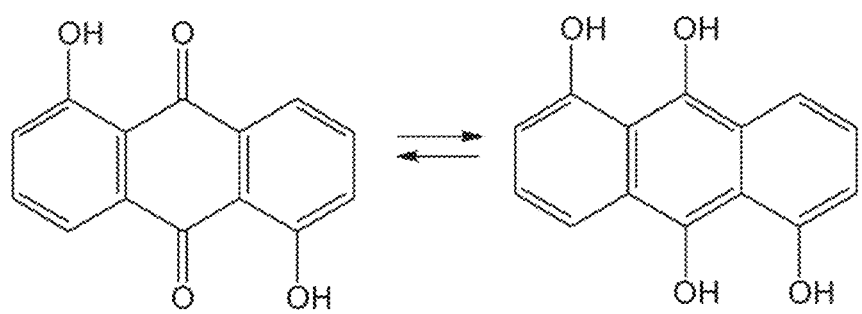
Figure 5B:
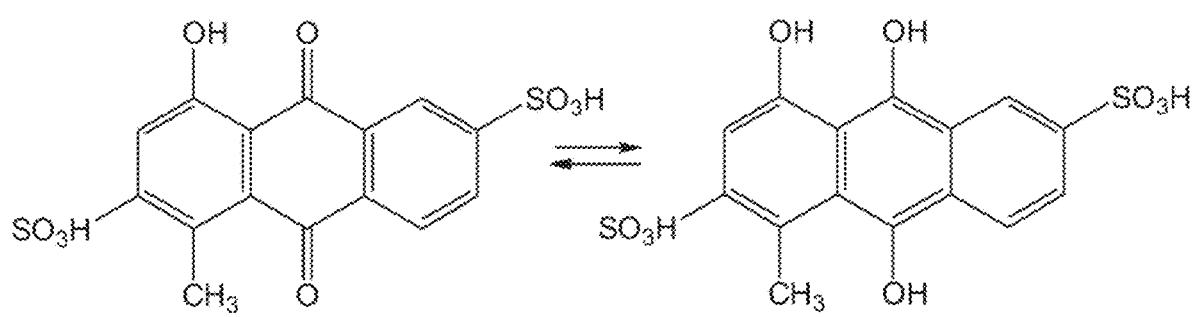
Figure 5B:
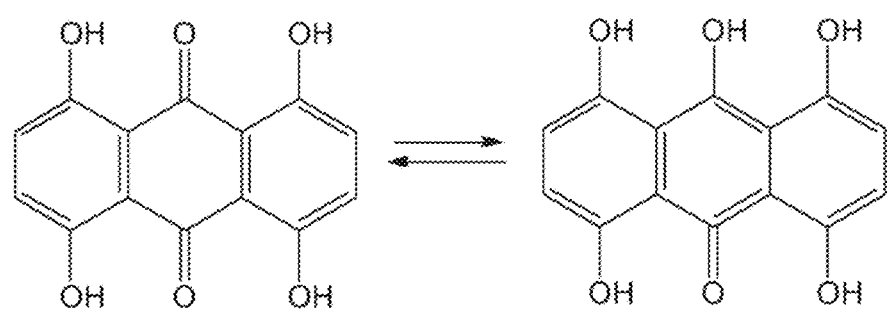
Figure 6:
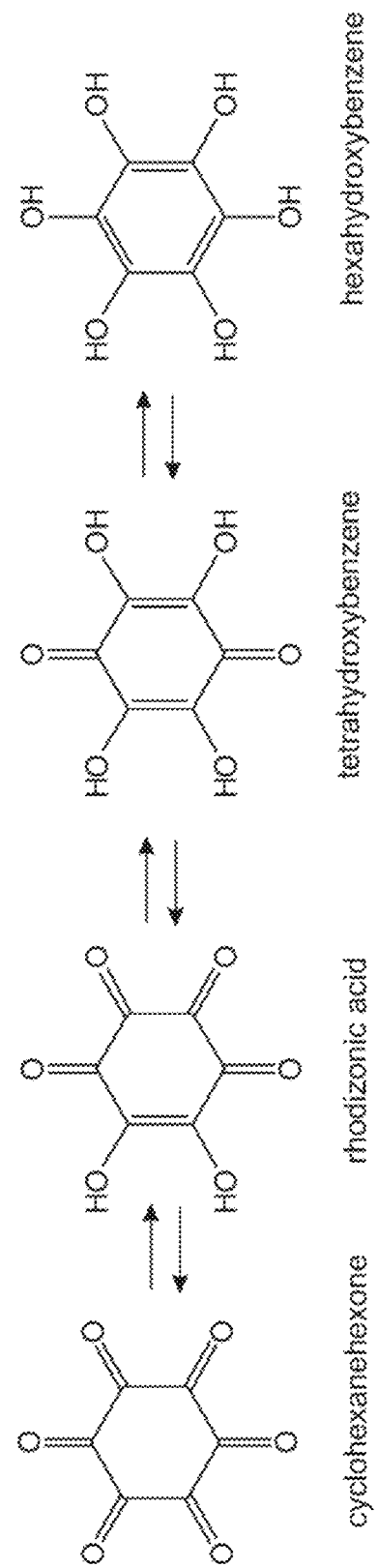
FIG. 6 provides additional quinone compounds that can be used in a flow battery.

(7)

and salts thereof,
wherein $R_8$-$R_{15}$ are each independently selected from the group consisting of H, —SO$_3$H, and electron donating groups with the proviso that at least one of $R_5$-$R_{15}$ is an electron donating group. In a refinement, at least one of $R_8$-$R_{15}$ is $C_{1-10}$ alkyl, $NH_2$, —NHR$_2$, —N(R$_2$)$_2$, —O$^-$M$^+$, —NHCOR$_2$, —OR$_2$, —CH$_3$, —C$_2$H$_5$, or phenyl where R$_2$ is H or $C_{1-10}$ alkyl and M$^+$ is a positively charged counter ion. In a further refinement, at least one of $R_8$-$R_{15}$ is hydrogen, methoxy, —N-(dimethyl), or hydroxyl. In one refinement, at least one of $R_8$-$R_{15}$ is an electron donating group that can decrease the reduction potential of the compound having the group. In a refinement, 1, 2, 3, 4, 5, or 6 of $R_8$-$R_{15}$ are electron donating groups. Examples of such electron donating groups include but are not limited to, $C_{1-10}$ alkyl, $NH_2$, —NHR$_2$, —N(R$_2$)$_2$, —O$^-$M$^+$, —NHCOR$_2$, —OR$_2$, —CH$_3$, —C$_2$H$_5$, or phenyl where R$_2$ is H or $C_{1-10}$ alkyl and M$^+$ is a positively charged counter ion (e.g., Na$^+$, K$^+$, or the like). As described herein, when electron donating groups are used as substituents for organic compounds in the positive electrode electrolyte such groups can provide further separation from the reduction potential of the negative electrode electrolyte. In some refinements, $R_8$-$R_{15}$ include one or more (e.g., 1, 2, 3 or 4) electron withdrawing groups. Examples of such electron withdrawing groups include but are not limited to, —NO$_2$, —N(R$_2$)$_3$$^+$X$^-$, —CF$_3$, CCl$_3$, —CN, —SO$_3$H, —PO$_3$H$_2$, —COOH, —OH, —O$^-$M$^+$, —SO$_3$-M$^+$, —PO$_3$$^{2-}$M$^+_2$, —COO$^-$M$^+$, —COOR$_2$, F, Cl, Br, —CHO, —COR$_2$ where R$_2$ is H or $C_{1-10}$ alkyl, M$^+$ is a positively charged counter-ion (e.g., Na$^+$, K$^+$, and the like). In still another refinement, at least one of $R_8$-$R_{15}$ is a functional group that increases water solubility. Examples of such functional groups include, but are not limited to, —SO$_3$H, —PO$_3$H$_2$, —COOH, —OH, —O$^-$M$^+$, —SO$_3$$^-$M$^+$, —PO$_3$$^{2-}$M$^+_2$, —COO$^-$M$^+$, pyridinyl, imidazoyl, and pyrroyl, where M$^+$ is a positively charged counter ion (e.g., Na$^+$, K$^+$, or the like). Advantageously, the compounds having formula 7 are used in the negative electrode electrolyte. FIGS. 5A and 5B provide specific examples for compounds having formula (7) on the left along with the related hydroquinones on the right. In a refinement, salts (e.g., sodium and potassium salts) of the compounds in FIGS. 5A and 5B can also be used in the flow battery. Such salts are formed from acidic hydrogen and other OH groups.

In a variation, the second organic compound used in the negative electrode electrolyte includes a compound having formula 8 or 9:

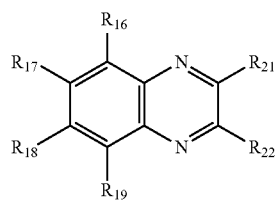

(8)

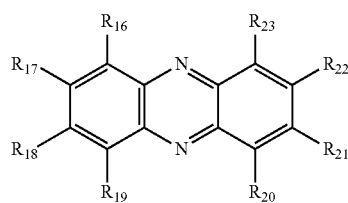

(9)

wherein $R_{16}$-$R_{23}$ are each independently H, $NH_2$, —NHR$_2$, —N(R$_2$)$_2$, —O$^-$M$^+$, —NHCOR$_2$, —OR$_2$, —CH$_3$, —C$_2$H$_5$, —SO$_3$H, —PO$_3$H$_2$, —COOH, —OH, —N(R$_2$)$_3$$^+$X$^-$, —CF$_3$, CCl$_3$, —CN, —COOR$_2$, F, Cl, Br, —CHO, —COR$_2$—O$^-$M$^+$, —SO$_3$$^-$M$^+$, —PO$_3$$^{2-}$M$^+_2$, —COO$^-$M$^+$, pyridinyl, imidazoyl, pyrroyl, or phenyl where R$_2$ is H or $C_{1-10}$ alkyl and M$^+$ is a positively charged counter-ion (e.g., Na$^+$, K$^+$, and the like). In one refinement, at least one of $R_{16}$-$R_{23}$ is an electron withdrawing group that can increase the reduction potential of the compound having the group. In a further refinement, 1, 2, 3, 4, 5, or 6 of $R_{16}$-$R_{23}$ are electron withdrawing groups. Examples of such electron withdrawing groups include but are not limited to, —NO$_2$, —N(R$_2$)$_3$$^+$X$^-$, —CF$_3$, CCl$_3$, —CN, —SO$_3$H, —PO$_3$H$_2$, —COOH, —OH, —O$^-$M$^+$, —SO$_3$$^-$M$^+$, —PO$_3$$^{2-}$M$^+_2$, —COO$^-$M$^+$, —COOR$_2$, F, Cl, Br, —CHO, —COR$_2$ where R$_2$ is H or $C_{1-10}$ alkyl, M$^+$ is a positively charged counter-ion (e.g., Na$^+$, K$^+$, and the like). As described herein, when electron withdrawing groups are used as substituents for organic compounds in the negative electrode electrolyte such groups can provide further separation from the reduction potential of the positive electrode electrolyte. In one refinement, at least one of $R_{16}$-$R_{23}$ is an electron donating group that can decrease the reduction potential. In a further refinement, 1, 2, 3, 4, 5, or 6 of $R_{16}$-$R_{23}$ are electron donating groups. Examples of such electron donating groups include but are not limited to, $C_{1-10}$ alkyl, $NH_2$, —NHR$_2$, —N(R$_2$)$_2$, —O$^-$M$^+$, —NHCOR$_2$, —OR$_2$, —CH$_3$, —C$_2$H$_5$, or phenyl where R$_2$ is H or $C_{1-10}$ alkyl and M$^+$ is a positively charged counter-ion (e.g., Na$^+$, K$^+$, or the like). As described herein, when electron donating groups are used as substituents for organic compounds in the positive electrode electrolyte such groups can provide further separation from the reduction potential of the negative electrode electrolyte. In still another refinement, at least one of $R_{16}$-$R_{23}$ is a functional group that increases water solubility. In a further refinement, 1, 2, 3, 4, 5, or 6 of $R_{16}$-$R_{23}$ are such functional groups. Examples of such functional groups include, but are not limited to, —$SO_3H$, —$PO_3H_2$, —COOH, —OH, —$O^-M^+$, —$SO_3^-M^+$, —$PO_3^{2-}M^+_2$, —$COO^-M^+$, pyridinyl, imidazoyl, and pyrroyl, where $M^+$ is a positively charged counter-ion (e.g., $Na^+$, $K^+$, and the like). A specific example of a compound having formula 8 is as follows:

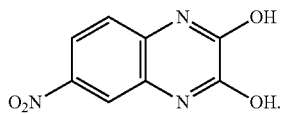 [SMILES: O=[N+]([O-])c1ccc2nc(O)c(O)nc2c1]

In a variation, the second organic compound used in the negative electrode electrolyte includes a compound having formula 10:

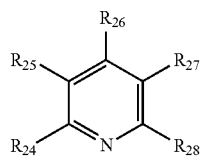

(10)

wherein $R_{24}$-$R_{28}$ are each independently H, $NH_2$, —$NHR_2$, —$N(R_2)_2$, —$O^-M^+$, —$NHCOR_2$, —$OR_2$, —$CH_3$, —$C_2H_5$, —$SO_3H$, —$PO_3H_2$, —COOH, —OH, —$N(R_2)_3^+X^-$, —$CF_3$, $CCl_3$, —CN, —$COOR_2$, F, Cl, Br, —CHO, —$COR_2$—$O^-M^+$, —$SO_3^-M^+$, —$PO_3^{2-}M^+_2$, —$COO^-M^+$, pyridinyl, imidazoyl, pyrroyl, or phenyl where $R_2$ is H or $C_{1-10}$ alkyl and $M^+$ is a positively charged counter ion. In one refinement, at least one of $R_{24}$-$R_{28}$ is an electron withdrawing group that can increase the reduction potential of the compound having the group. In a further refinement, 1, 2, 3, 4, 5, or 6 of $R_{24}$-$R_{28}$ are electron withdrawing groups. Examples of such electron withdrawing groups include but are not limited to, —$NO_2$, —$N(R_2)_3^+X^-$, —$CF_3$, $CCl_3$, —CN, —$SO_3H$, —$PO_3H_2$, —COOH, —OH, —$O^-M^+$, —$SO_3^-M^+$, —$PO_3^{2-}M^+_2$, —$COO^-M^+$, —$COOR_2$, F, Cl, Br, —CHO, —$COR_2$ where $R_2$ is H or $C_{1-10}$ alkyl, $M^+$ is a positively charged counter-ion (e.g., $Na^+$, $K^+$, and the like). As described herein, when electron withdrawing groups are used as substituents for organic compounds in the negative electrode electrolyte such groups can provide further separation from the reduction potential of the positive electrode electrolyte. In one refinement, at least one of $R_{24}$-$R_{28}$ is an electron donating group that can decrease the reduction potential. In a further refinement, 1, 2, 3, 4, 5, or 6 of $R_{24}$-$R_{28}$ are electron donating groups. Examples of such electron donating groups include but are not limited to, $C_{1-10}$ alkyl, $NH_2$, —$NHR_2$, —$N(R_2)_2$, —$O^-M^+$, —$NHCOR_2$, —$OR_2$, —$CH_3$, —$C_2H_5$, or phenyl where $R_2$ is H or $C_{1-10}$ alkyl and $M^+$ is a positively charged counter-ion (e.g., $Na^+$, $K^+$, or the like). As described herein, when electron donating groups are used as substituents for organic compounds in the positive electrode electrolyte such groups can provide further separation from the reduction potential of the negative electrode electrolyte. In still another refinement, at least one of $R_{24}$-$R_{28}$ is a functional group that increases water solubility. In a further refinement, 1, 2, 3, 4, 5, or 6 of $R_{24}$-$R_{28}$ are such functional groups. Examples of such functional groups include, but are not limited to, —$SO_3H$, —$PO_3H_2$, —COOH, —OH, —$O^-M^+$, —$SO_3^-M^+$, —$PO_3^{2-}M^+_2$, —$COO^-M^+$, pyridinyl, imidazoyl, and pyrroyl, where $M^+$ is a positively charged counter-ion (e.g., $Na^+$, $K^+$, and the like). Specific examples of these compounds are as follows:

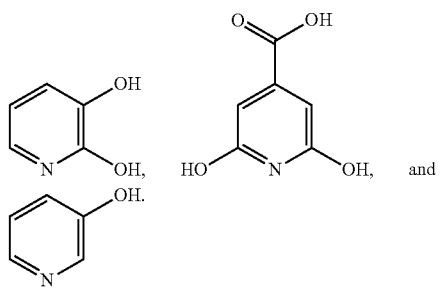

In a variation, the second organic compound used in the negative electrode electrolyte includes a compound having formula 11a, 11b, 12a, or 12b:

(11a)

(11b)

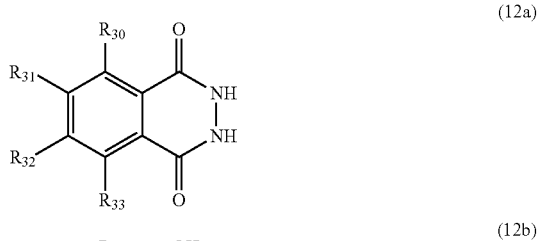

(12a)

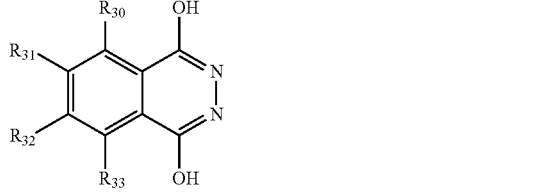

(12b)

wherein $R_{30}$, $R_{31}$, $R_{32}$, $R_{33}$ are each independently H, $NH_2$, —$NHR_2$, —$N(R_2)_2$, —$O^-M^+$, —$NHCOR_2$, —$OR_2$, —$CH_3$, —$C_2H_5$, —$SO_3H$, —$PO_3H_2$, —COOH, —OH, —$N(R_2)_3^+X$, —$CF_3$, $CCl_3$, —CN, —$COOR_2$, F, Cl, Br, —CHO, —$COR_2$—$O^-M^+$, —$SO_3^-M^+$, —$PO_3^{2-}M^+_2$, —$COO^-M^+$, pyridinyl, imidazoyl, pyrroyl, or phenyl where $R_2$ is H or $C_{1-10}$ alkyl and $M^+$ is a positively charged counter. In one refinement, at least one of $R_{30}$, $R_{31}$, $R_{32}$, $R_{33}$ is an electron withdrawing group that can increase the reduction potential of the compound having the group. In a further refinement, 1, 2, 3, 4, 5, or 6 of $R_{30}$, $R_{31}$, $R_{32}$, $R_{33}$ are electron withdrawing groups. Examples of such electron withdrawing groups include but are not limited to, —$NO_2$, —$N(R_2)_3{}^+X^-$, —$CF_3$, $CCl_3$, —CN, —$SO_3H$, —$PO_3H_2$, —COOH, —OH, —$O^-M^+$, —$SO_3{}^-M^+$, —$PO_3{}^{2-}M^+{}_2$, —$COO^-M^+$, —$COOR_2$, F, Cl, Br, —CHO, —$COR_2$ where $R_2$ is H or $C_{1-10}$ alkyl, $M^+$ is a positively charged counter-ion (e.g., $Na^+$, $K^+$, and the like). As described herein, when electron withdrawing groups are used as substituents for organic compounds in the negative electrode electrolyte such groups can provide further separation from the reduction potential of the positive electrode electrolyte. In one refinement, at least one of $R_{30}$, $R_{31}$, $R_{32}$, $R_{33}$ is an electron donating group that can decrease the reduction potential. In a further refinement, 1, 2, 3, 4, 5, or 6 of $R_{30}$, $R_{31}$, $R_{32}$, $R_{33}$ are electron donating groups. Examples of such electron donating groups include but are not limited to, $C_{1-10}$ alkyl, $NH_2$, —$NHR_2$, —$N(R_2)_2$, —$O^-M^+$, —$NHCOR_2$, —$OR_2$, —$CH_3$, —$C_2H_5$, or phenyl where $R_2$ is H or $C_{1-10}$ alkyl and $M^+$ is a positively charged counter-ion (e.g., $Na^+$, $K^+$, or the like). As described herein, when electron donating groups are used as substituents for organic compounds in the positive electrode electrolyte such groups can provide further separation from the reduction potential of the negative electrode electrolyte. In still another refinement, at least one of $R_{30}$, $R_{31}$, $R_{32}$, $R_{33}$ is a functional group that increases water solubility. In a further refinement, 1, 2, 3, 4, 5, or 6 of $R_{30}$, $R_{31}$, $R_{32}$, $R_{33}$ are such functional groups. Examples of such functional groups include, but are not limited to, —$SO_3H$, —$PO_3H_2$, —COOH, —OH, —$O^-M^+$, —$SO_3{}^-M^+$, —$PO_3{}^{2-}M^+{}_2$, —$COO^-M^+$, pyridinyl, imidazoyl, and pyrroyl, where $M^+$ is a positively charged counter-ion (e.g., $Na^+$, $K^+$, and the like). Specific examples of these compounds include the following:

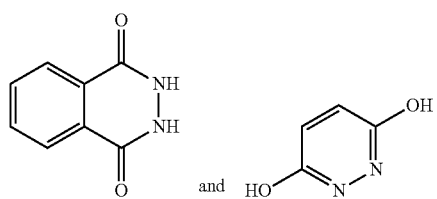

Figure 7:
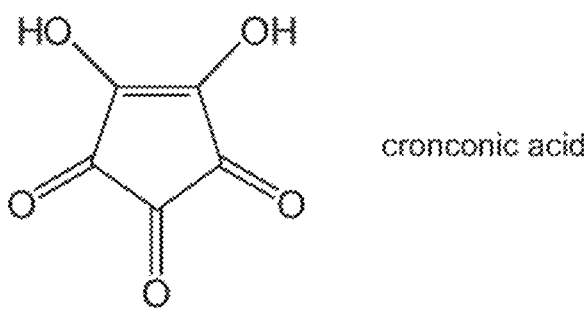
FIG. 7 provides additional quinone compounds that can be used in a flow battery.
Figure 7:
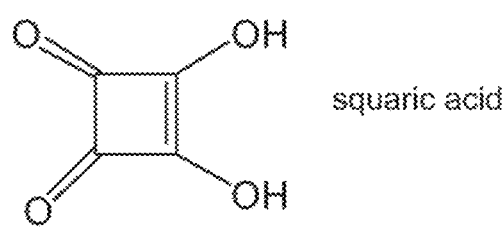
Figure 7:
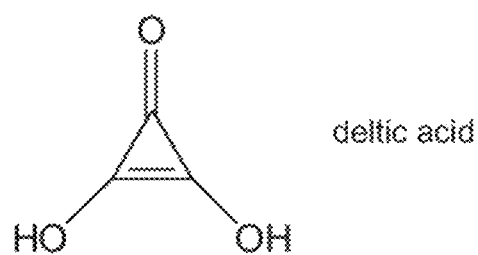
Figure 8A:
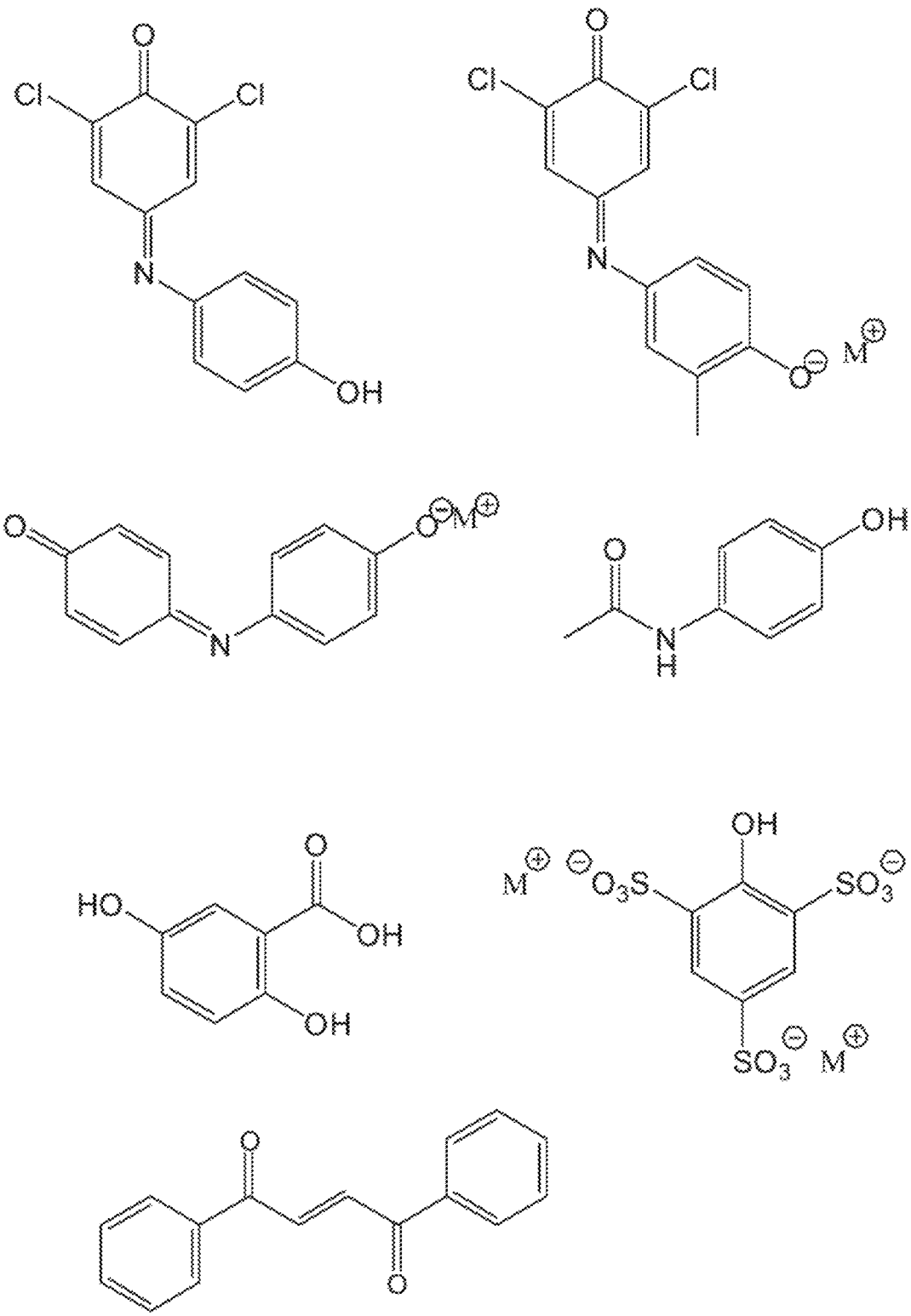
FIGS. 8A-C provides additional quinone compounds that can be used in a flow battery.
Figure 8B:
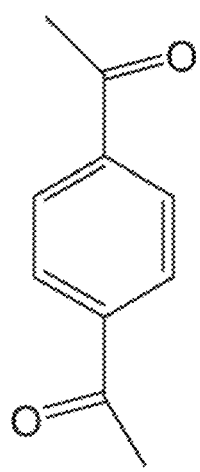
Figure 8B:
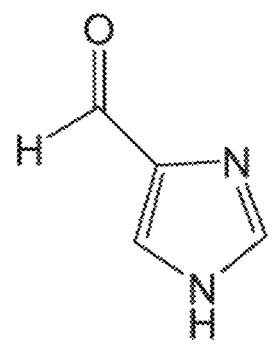
Figure 8B:
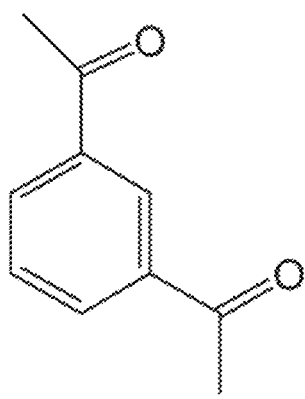
Figure 8B:
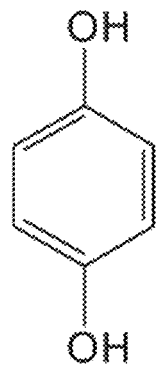
Figure 8B:
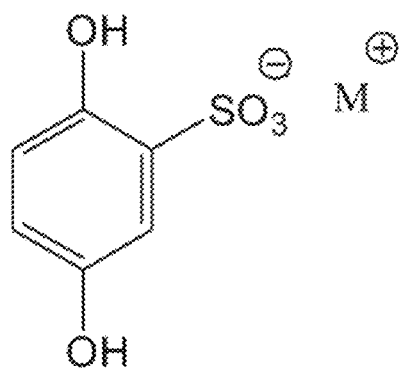
Figure 8B:
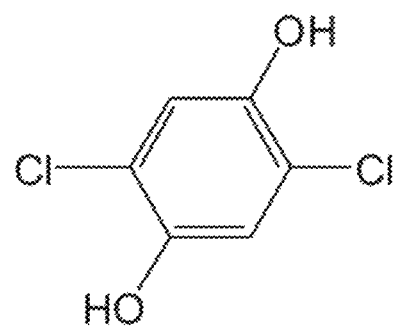
Figure 8C:
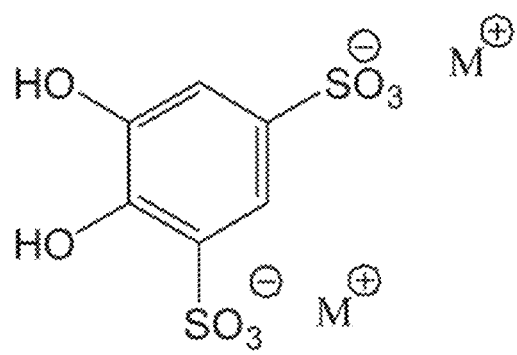
Figure 8C:
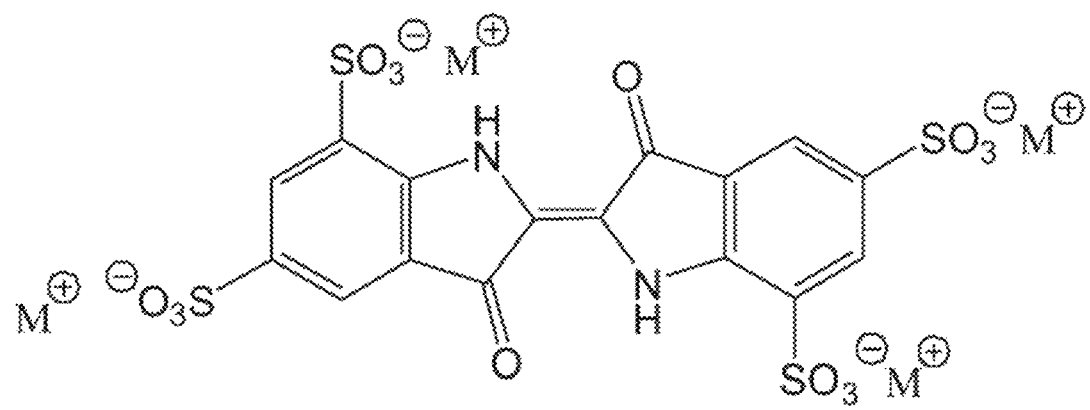
Figure 8C:
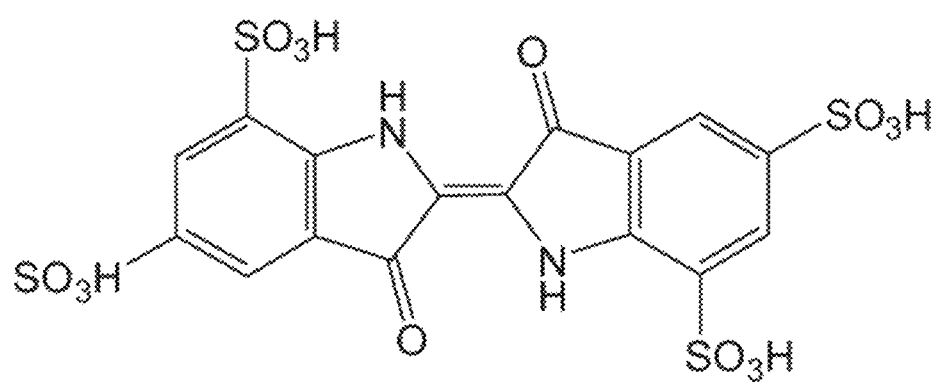

FIGS. 6, 7 and 8A-C provide additional compounds that can be used in a flow battery. It should be noted that rhodizonic acid can be used at both the positive and negative electrodes since it has both oxidizable and reducible forms that have a significant potential difference as shown in FIG. 7.

Figure 9A:
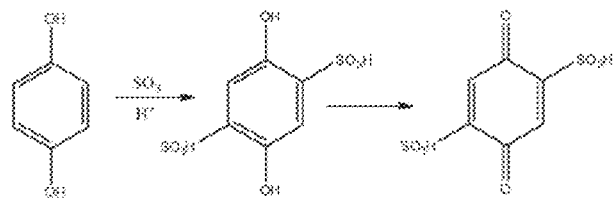
FIG. 9A provides a synthetic pathway for forming substituted quinones.
Figure 9A:
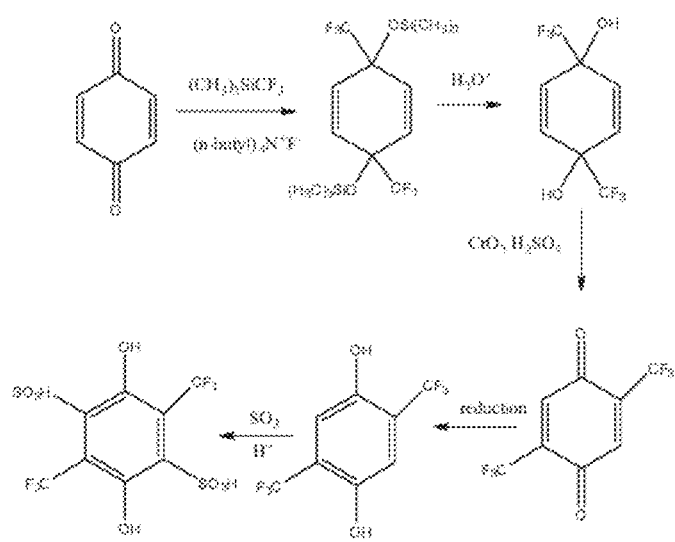
Figure 9A:
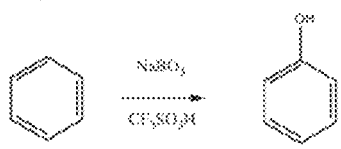
Figure 9A:
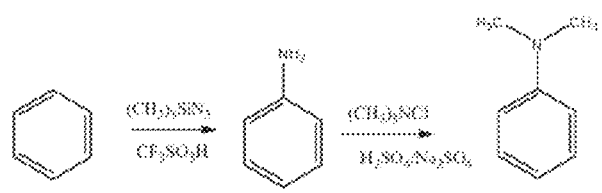
Figure 9B:
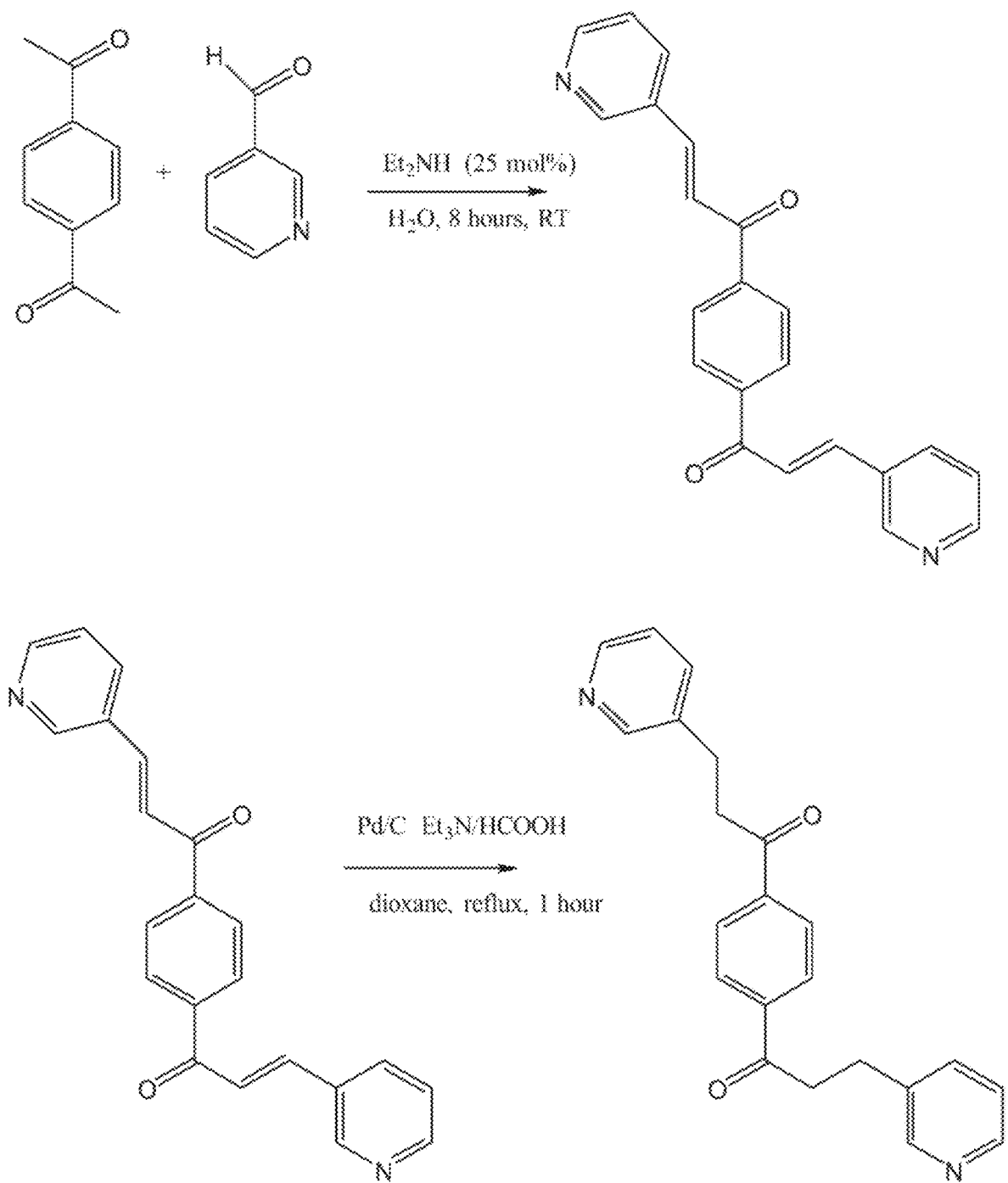
FIG. 9B provides a synthetic pathway for forming pyridinyl substituted compounds.

As set forth above, the addition of electron-withdrawing substituents such as sulfonic acid or trifluoromethyl groups increases the standard reduction potential. Sulfonic acid substituents increase solubility in water. For example, the higher electrode potential (approximately 85 mV higher) of the 1,2-benzoquinone (ortho-quinone) relative to the 1,4-benzoquinone(para-quinone) can be exploited. By this approach, potentials as high as 1.1V can be achieved. Many of the quinones are readily available for purchase as coloring agents. FIG. 9A shows synthetic schemes that are used to prepare the substituted quinones. These synthetic methods are tested extensively for oxidative trifluoromethylation, hydroxylation and amination. The reduction potential, reversibility of the reactions and the diffusion coefficients of the compounds is measured by cyclic voltammetry in a standard three-electrode electrochemical cell using a glassy carbon working electrode. Compounds with electron-transfer rate constants greater than $1\times10^{-6}$ $m^2s^{-1}$ are advantageously used to ensure that the energy storage and retrieval is efficient. FIG. 9B provide a synthetic pathway for forming pyridinyl substituted compounds which as discussed above enhances water solubility.

It should be appreciated that the organic compounds set forth above although designated for either the positive electrode electrolyte or the negative electrode electrolyte can be used for either electrolyte. This depends on the standard electrode potential for the selections of material for the counter-electrode. Moreover, each of these organic compounds and there related redox couple may be combined with other counter electrode system not specified herein.

As set forth above, the flow batteries include electrodes and a polymer membrane that separates the positive and negative sides. Examples of such membranes include perfluorinated membranes like NAFION® and interpenetrating polymeric network of polystyrenesulfonic acid with polyvinylidenefluoride (PSSAPVDF). The latter type of membrane by an impregnation, polymerization and crosslinking of styrene in a PVDF matrix is prepared. This membrane is sulfonated to produce the proton conducting form of the membrane. The conductivity of such membranes is in the range of 50-75 mS $cm^{-1}$ which is comparable to NAFION®. The electrodes can be formed from high surface area carbon (such as Vulcan XC-72) which is combined with the ionomer materials to form an ink and that is applied to the surface of the membrane. A porous conductive paper made from graphite fibers (TORAY™) is hot pressed onto the coated membrane to form a membrane-electrode assembly.

The following examples illustrate the various embodiments of the present invention. Those skilled in the art will recognize many variations that are within the spirit of the present invention and scope of the claims.

EXPERIMENTAL

Electrochemical Characterization

Measurement of kinetic parameters and diffusion coefficients was conducted in a three-electrode cell consisting of a rotating glassy carbon disk working electrode, a platinum wire counter electrode, and a mercury/mercuric sulfate reference electrode (E°=+0.65 V). The quinones, in either the fully reduced or fully oxidized form, were dissolved in 1 M sulfuric acid to a concentration of 1 mM. The solutions were de-aerated and kept under a blanket of argon gas throughout all the experiments. All measurements were conducted in the potentiodynamic mode (Versastat 300 potentiostat) at a scan rate of 5 mV $s^{-1}$ over a range of rotation rates (500 rpm to 3000 rpm). Impedance measurements were also made at each rotation rate. Cyclic voltammetry was conducted on a static glassy carbon electrode at a scan rate of 50 mV $s^{-1}$.

Charge/Discharge Cycling of Full ORBAT Cells

A flow cell was constructed using fuel cell hardware that has graphite end plates (Electrochem Inc.) and an electrode active area of 25 $cm^2$. The reactant was circulated using peristaltic pumps (Masterflex) at a flow rate of approximately 0.5-1.0 liter $min^{-1}$. Membrane electrode assemblies (MEA) needed for the cell were fabricated in house using procedures similar to those previously reported for direct methanol fuel cells. (G. K. S. Prakash, M. C. Smart, Q. J. Wang, A. Atti, V. Pleynet, B. Yang, K. McGrath, G. A. Olah, S. R. Narayanan, W. Chun, T. Valdez, S. Surampudi, *J. Fluorine Chemistry*, 125, 1217 (2004); the entire disclosure of which is hereby incorporated by reference). Specifically, two sheets of carbon paper (Toray 030-non-teflonized) were coated with an ink containing 0.1 g of Vulcan XC-72 carbon black and 0.3 g of NAFION®. The coated electrodes were hot pressed with a NAFION® 117 membrane to form a MEA. All full cell experiments were carried out at 23° C. Two glass containers served as reservoirs for the solutions of the redox couples. An argon flow was maintained above these solutions to avoid reaction of the redox couples with oxygen. The current-voltage characteristics of the cells were measured at various states of charge. Charge/discharge studies were carried out under constant current conditions.

Quantum Mechanics-Based Calculations

To determine $E_{1/2}$ values, we used density functional theory to calculate the standard Gibbs free energy change ($\Delta G°$) for the reduction of the oxidized form of the redox couple. The calculations were performed at the B3LYP/6-31+G(d,p) level of theory with thermal correction and implicit consideration of water-solvation. The free energy correction for the standard state of 1 atm in the gas phase and 1 M upon solvation was applied, i.e. $\Delta G_{solution} = \Delta G_{gas} + 1.9$ kcal·mol$^{-1}$ at 298 K. Considering the lower $pK_a$ value of benzenesulfonic acid ($pK_{a(sulfonic\ acid)} = -2.8$), quinone sulfonic acid derivatives are expected to dissociate to sulfonates in 1 M sulfonic acid aqueous solution. $\Delta G°$ was calculated based on the reduction of quinone derivatives with $H_2$. The standard electrode potential for the redox couple was deduced from $E° = -\Delta G°/nF$, where n is the number of protons involved in the reaction and F is the Faraday constant.

Results and Discussion

Figure 10A:
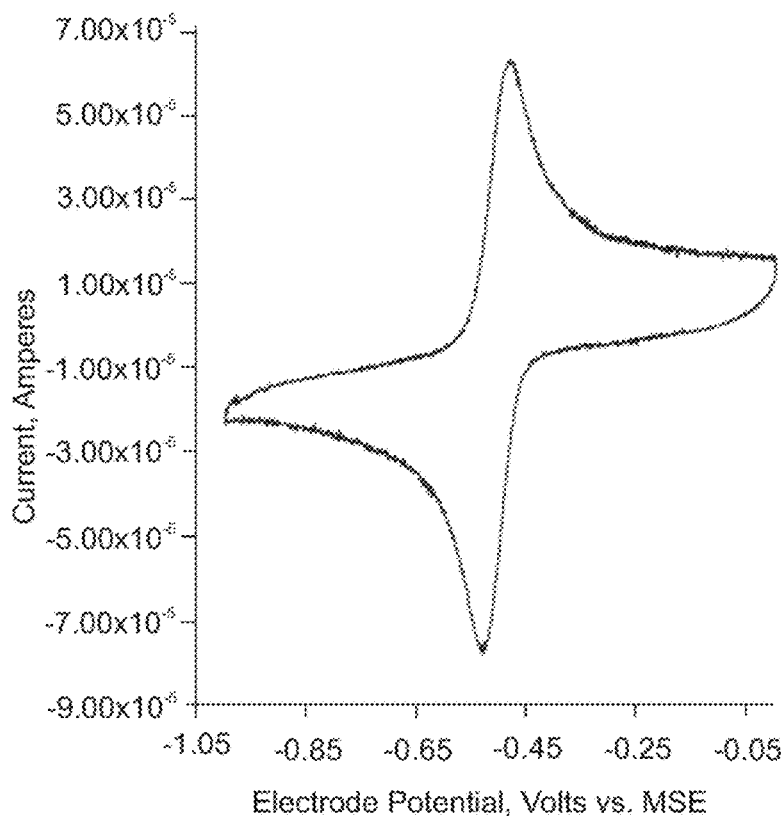
FIG. 10A. Cyclic voltammograms at a scan rate of 5 mV s$^{-1}$ on a glassy carbon electrode in 1 M sulfuric acid containing 1 mM anthraquinone-2-sulfonic acid.
Figure 10B:
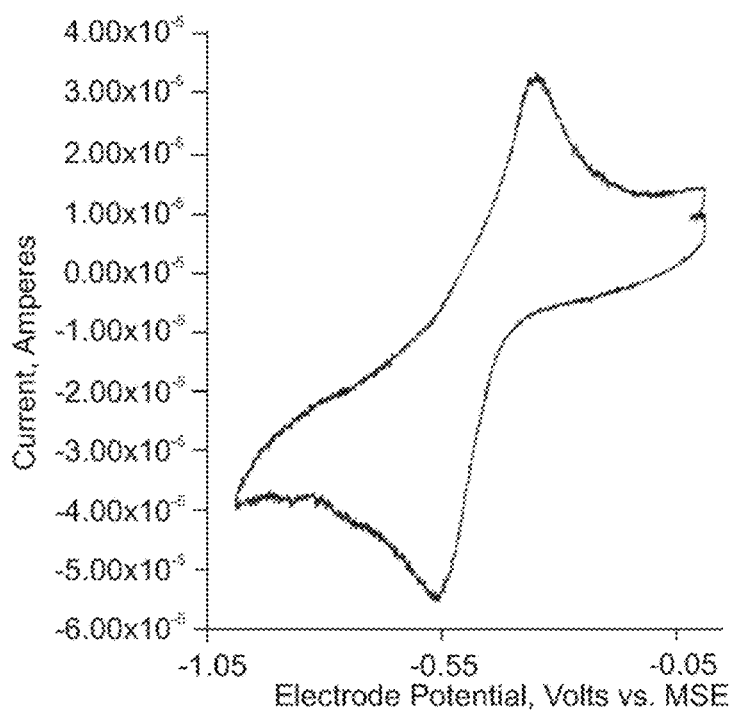
FIG. 10B. Cyclic voltammograms at a scan rate of 5 mV s$^{-1}$ on a glassy carbon electrode in 1 M sulfuric acid containing 1 mM anthraquinone-2,6-disulfonic acid.
Figure 10C:
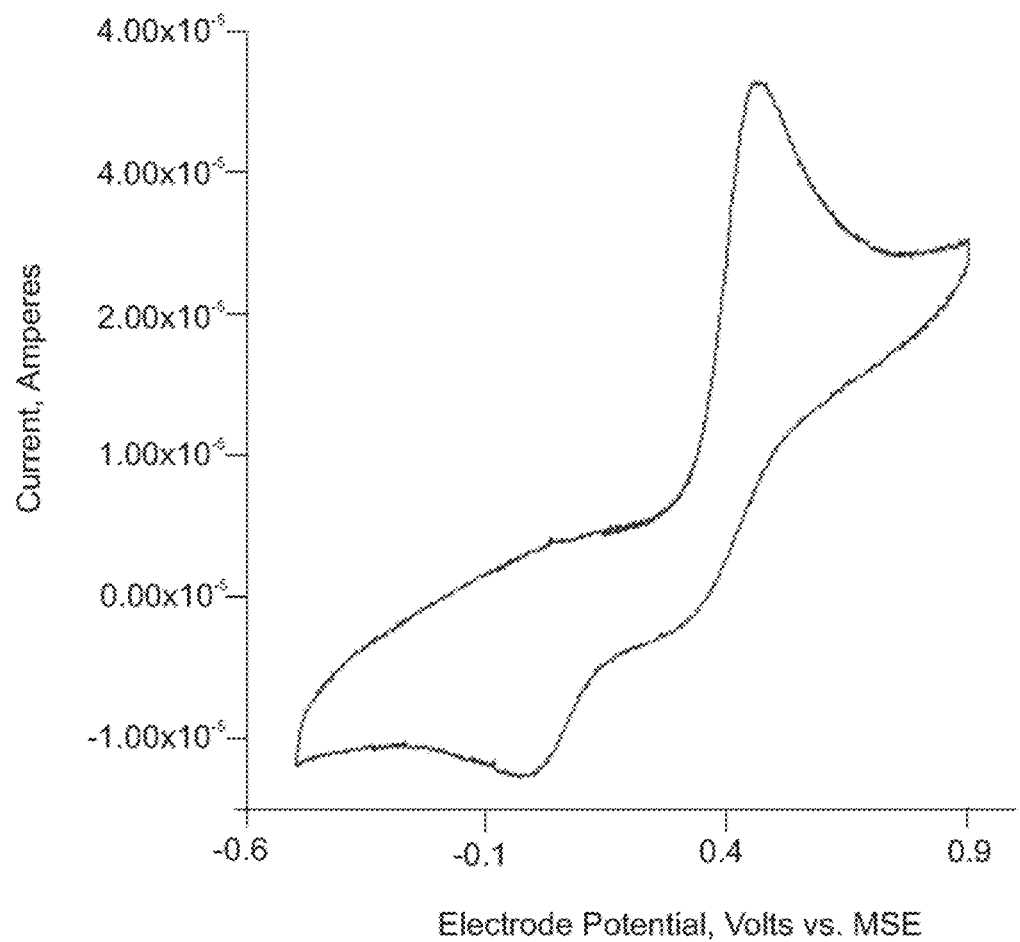
FIG. 10C. Cyclic voltammograms at a scan rate of 5 mV s$^{-1}$ on a glassy carbon electrode in 1 M sulfuric acid containing 1 mM 1,2-benzoquinone-3,5-disulfonic acid.

Cyclic voltammetric measurements on AQS and AQDS show a single step electrochemical reaction involving two electrons (FIGS. 10A and B). Peak separations suggested AQDS was less kinetically reversible than AQS. The cyclic voltammograms for BQDS showed a rapid oxidation step, but a slower reduction step (FIG. 10C). The shape of the reduction peak for BQDS suggested a possible slow chemical step following electron transfer. Such a slow step is consistent with the hydration process leading to the conversion of the hydroquinone to 1,4-benzoquinone-2-hydroxy-3,5-disulfonic acid, as reported by Xu and Wen. (Y. Xu, Y. Wen, J. Chenga, Y. Yang, Z. Xie, G. Cao, Non-Grid-Connected Wind Power and Energy Conference, IEEE Publication (2009)). The reversible potentials estimated from the anodic and cathodic scans for the three compounds were in agreement with the quantum mechanical calculations (Table 4). The facile proton and electron transfer processes occurring on a glassy carbon electrode in the absence of any catalyst confirmed an outer-sphere type of mechanism.

TABLE 4

Standard reduction potentials for selected quinones

| | Standard Reduction Potentials | | |
|---|---|---|---|
| Redox Couple | Experimental ($E_{1/2}$ values) vs. NHE | $E°_{(formal)}$ Measured | $E°$ Theoretical Calculation |
| Hydroquinone | 0.67 | 0.68 | 0.70 |
| Hydroquinone sulfonic acid | 0.82 | 0.70 | 0.77 |
| 1,2-benzoquinone-3,5-disulfonic acid | 1.1 | 0.87 | 0.85 |
| Anthraquinone | Insoluble | Insoluble | 0.05 |
| Anthraquinone-2-sulfonic acid | 0.13 | 0.15 | 0.09 |
| Anthraquinone-2,6-sulfonic acid | 0.05 | 0.19 | 0.12 |

Linear sweep voltammetric measurements at a rotating disk electrode at various rotation rates (FIG. 11 A, B, C) showed that the limiting current, $I_{lim}$, was found to depend linearly on the square root of the rotation rate, ω, as per the Levich equation (Eq. 3).

$$I_{lim} = 0.62n\ F\ A\ D_o^{2/3} \omega^{1/2} \nu^{-1/6} C^* \quad (3)$$

Where n is the number of electrons transferred, F, the Faraday constant, A, electrode area, $D_o$, the diffusion coefficient, ν, the kinematic viscosity of the solution and $C^*$, the bulk concentration of the reactants. For n=2, an active electrode area of 0.1925 cm$^2$, and a kinematic viscosity of the electrolyte of 0.01 cm$^2$ s$^{-1}$, we were able to evaluate the diffusion coefficient from the slope of the straight line plots in FIG. 11D.

Figure 11A:
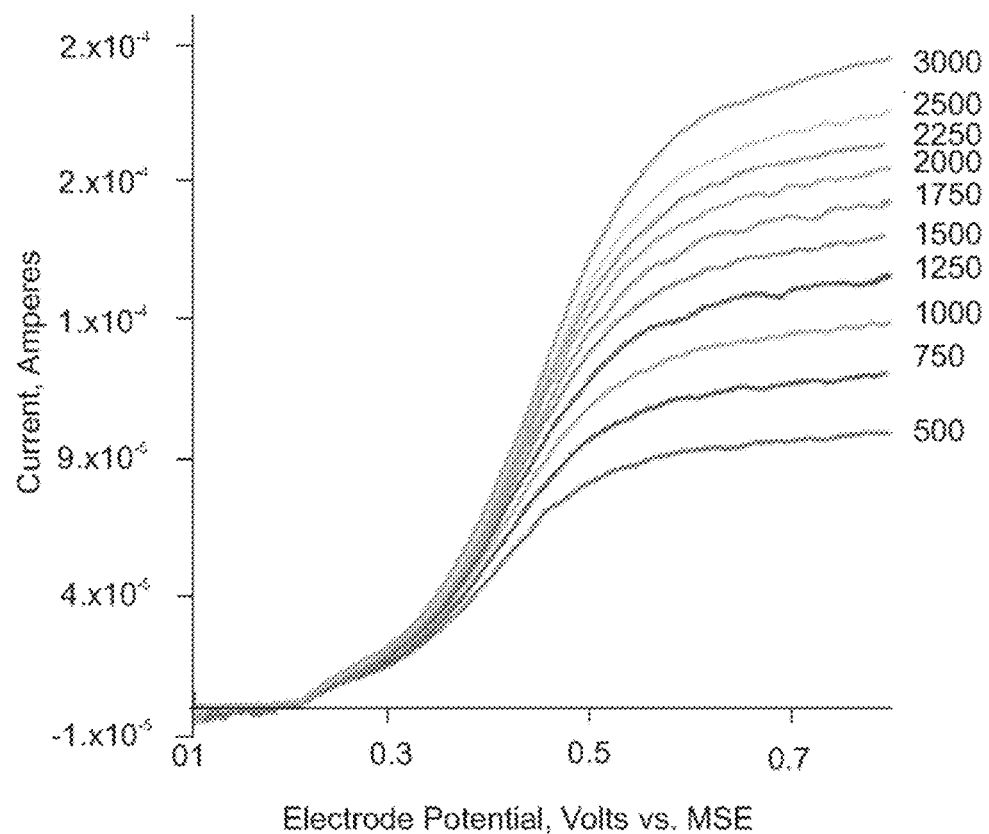
FIG. 11A. Linear sweep voltammetric data (scan rate of 5 mV s$^{-1}$) at a glassy carbon rotating disk electrode for 1 mM concentration of BQDS acid at the rotation rates indicated. Electrode potentials are versus a mercury sulfate reference electrode (E$^0$=+0.65).
Figure 11B:
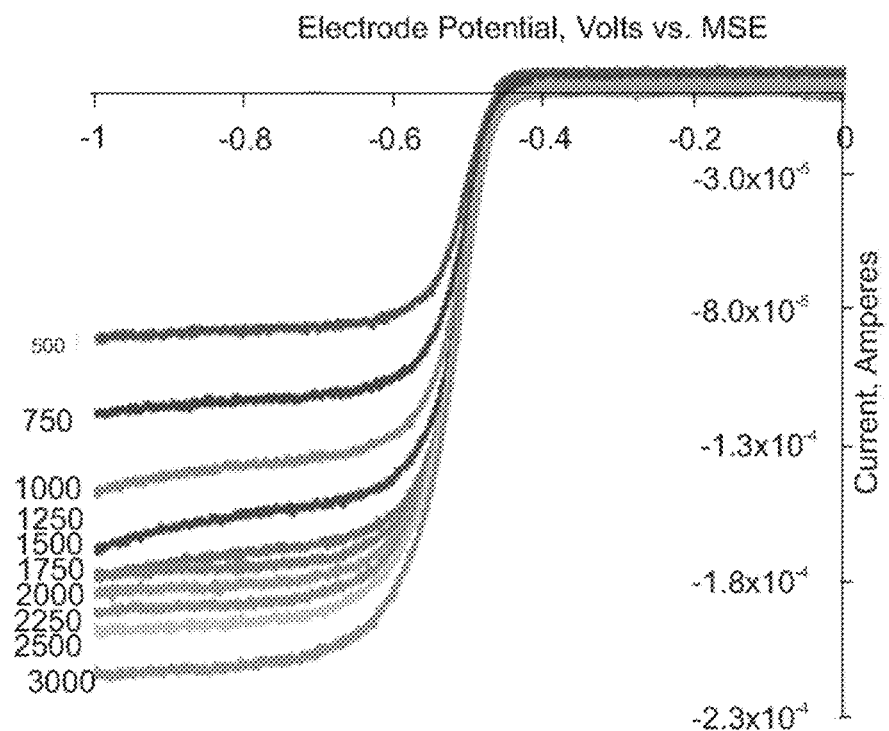
FIG. 11B. Linear sweep voltammetric data (scan rate of 5 mV s$^{-1}$) at a glassy carbon rotating disk electrode for 1 mM concentration of AQS acid at the rotation rates indicated. Electrode potentials are versus a mercury sulfate reference electrode (E$^0$=+0.65).
Figure 11C:
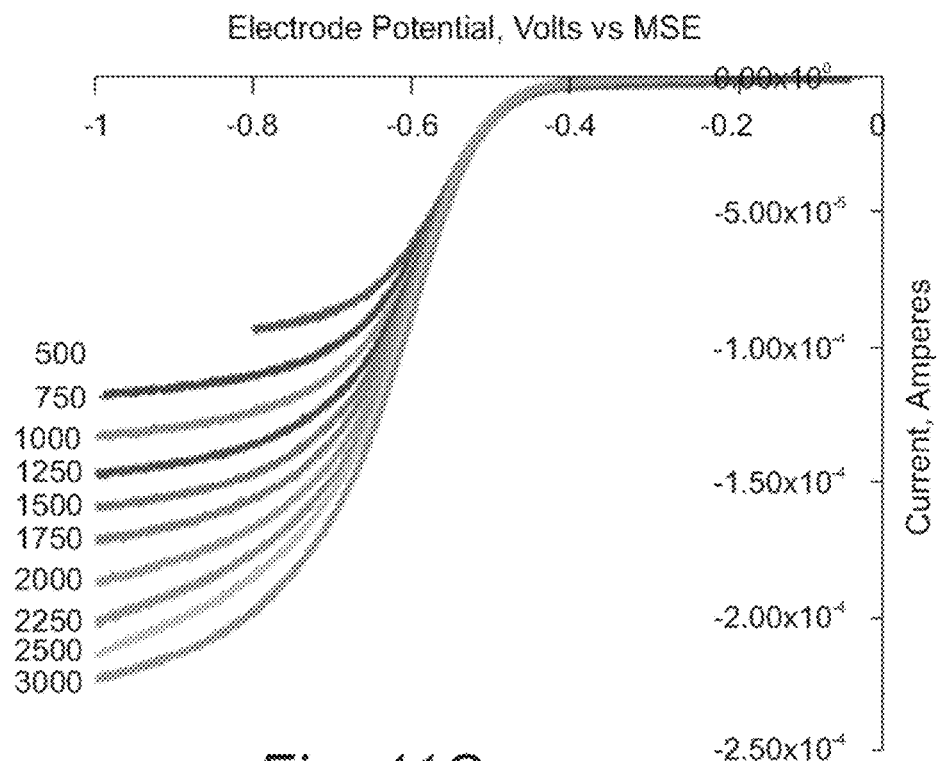
FIG. 11C. Linear sweep voltammetric data (scan rate of 5 mV s$^{-1}$) at a glassy carbon rotating disk electrode for 1 mM concentration of AQDS acid at the rotation rates indicated. Electrode potentials are versus a mercury sulfate reference electrode (E$^0$=+0.65).
Figure 11D:
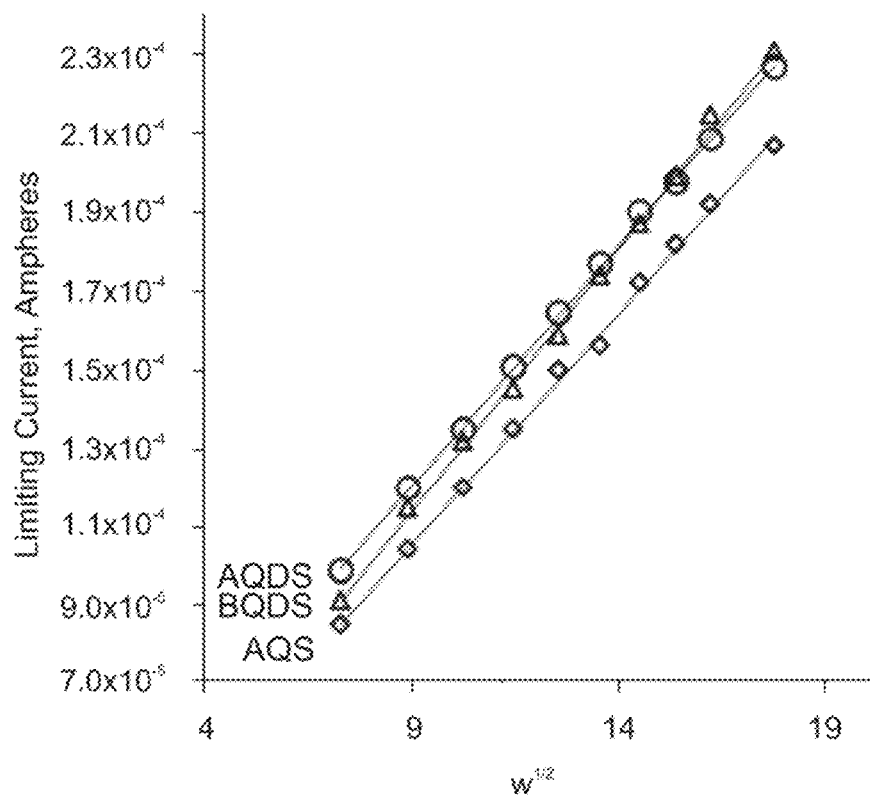
FIG. 11D. Levich plot of the square root of rotation rate vs the limiting current for AQS(◊), BQDS (Δ), and AQDS (o).
Figure 11E:
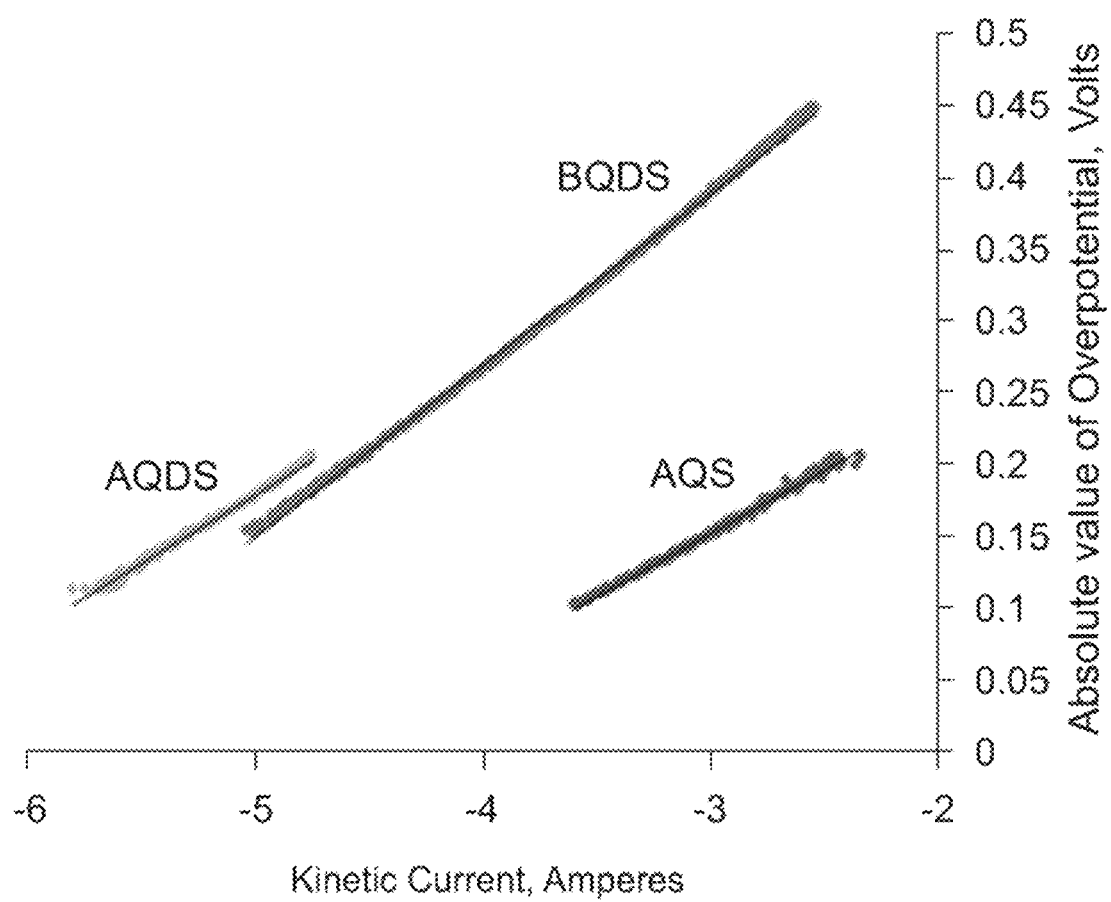
FIG. 11E. Mass transport-corrected current-voltage plot for BQDS, AQS, and AQDS.

To determine the kinetic parameters for the charge-transfer process, namely the rate constant and the apparent transfer coefficient, the logarithm of the kinetic current (after correction for mass-transport losses) was plotted against the observed overpotentials greater than 100 mV, where the Tafel equation is applicable (Eq. 4 and FIG. 11E).

$$\left(\frac{I}{1 - \frac{I}{I_{lim}}}\right) = I_{ex}\left[\frac{C_O}{C_O^*}\exp\left(-\frac{\alpha n F(E - E_{rev})}{RT}\right) - \frac{C_R}{C_R^*}\exp\left(\frac{(1-\alpha)nF(E - E_{rev})}{RT}\right)\right] \quad (4)$$

Where I is the current, $I_{lim}$ is the limiting current, $I_{ex}$ is the exchange current density, $C_O$ and $C_R$ are the concentration of the oxidized and reduced species at the surface of the electrode, $C_O^*$ and $C_R^*$ are the bulk concentrations of the oxidized and reduced species, α is the transfer coefficient, n is the number of electrons transferred, F is the Faraday constant, $E - E_{rev}$ is the overpotential, R is the gas constant, and T is the temperature. The rate constant, $k_o$, was obtained from the exchange current density (Eq. 5).

$$k_o = I_{ex}/nFAC^* \quad (5)$$

Besides BQDS, AQS and AQDS, we have also measured the current-overpotential curves for hydroquinone and hydroquinone sulfonic acid (see supplementary material). Solubility of anthraquinone in 1 M sulfuric acid was too low to obtain any reliable data.

The half-wave potential values (Table 5) are consistent with the values reported in the literature for the various compounds tested. (S. Miertus, E. Scrocco, J. Tomasi, Chem. Phys., 55, 117 (1981)). It is clear that the addition of aromatic rings has a marked effect of lowering the standard reduction potential and half-wave potential. The addition of sulfonic acid groups tends to increase the standard reduction potential, which is consistent with the lowering of molecular orbital energies by electro-withdrawing groups.

TABLE 5

Electrochemical properties of the redox couples determined from rotating disk electrode experiments. MSE refers to the mercury sulfate reference electrode (E° = +0.65 V).

| Redox Couple | $E_{1/2}$ vs. MSE, (Volt) | Exchange Current Density, (A cm$^{-2}$) | Diffusion Coefficient, (cm$^2$ s$^{-1}$) | Transfer Coefficient, $\alpha$n | Solubility | Rate Constant, k° (cm s$^{-1}$) |
|---|---|---|---|---|---|---|
| Hydroquinone | 0.02 | 5.09E−5 | 5.03E−6 | 0.508 | 0.53 M | 2.36E−3 |
| Hydroquinone sulfonic acid | 0.17 | 1.10E−5 | 4.28E−6 | 0.418 | 0.8 M | 5.52E−4 |
| 1,2-benzoquinone - 3,5-disulfonic acid | 0.45 | 3.00E−6 | 3.80E−6 | 0.582 | 1 M | 1.55E−4 |
| Anthraquinone-2-sulfonic acid | −0.52 | 1.96E−5 | 3.71E−6 | 0.677 | 0.2 M | 2.25E−4 |
| Anthraquinone 2,6-disulfonic acid | −0.60 | 2.97E−6 | 3.40E−6 | 0.426 | 0.5 M | 1.52E−4 |

To understand the changes in the standard reduction potentials we have used quantum mechanics to calculate the free-energy change in the reaction of the oxidized form of the redox couple with hydrogen. If $\Delta G°$ is the Gibbs free energy change under standard conditions, then $-\Delta G°/nF$ is the standard electrode potential for the redox couple, where n is the number of protons involved in the reaction and the F is the Faraday constant. The values of $E_{1/2}$ from experiments follow the trends predicted by the theoretical calculations (Table 4). The strong correlation between experimental and theoretical predictions suggest that such free energy calculations can be used to predict the trends in $E_{1/2}$ values of the redox compounds prior to experimental testing, potentially enabling the discovery of new redox couples by this computational approach.

The values of diffusion coefficients are about an order of magnitude smaller in aqueous solutions than in non-aqueous solvents such as acetonitrile. In aqueous solutions, the observed extent of decrease in the values of diffusion coefficients with increase in molecular mass is about $6\times10^{-9}$ cm$^2$ s$^{-1}$ per unit of molecular mass. This coefficient is an order of magnitude lower than that observed in acetonitrile. Thus, besides the effect of molecular mass, the molecular diameters resulting from the solvation and the interaction of ionic groups with water through hydrogen bonding have a significant effect on the diffusion coefficient values in aqueous solutions.

Rate constants are within the range of values found widely in the literature for quinones. (S. Ahmedaz, A. Y. Khanb, Russian J. of Electrochem., 49, 336 (2013); R. A. Marcus, J. Chem. Phys., 24, 966 (1956)). As sulfonic acid groups are added to the ring, the intra-molecular hydrogen bonding interactions in the quinone molecules bearing sulfonic acid groups increase. This intra-molecular hydrogen bonding plays a critical role in the rate limiting step of proton-coupled electron transfer, (T. W. Rosanske, D. H. Evans, J. Electroanal. Chem., 72, 277 (1976)) due to the increased stability of the compound and increased cleavage energy required for concerted proton and electron transfer. This stability provides a competition between the resident hydrogen atom and the incoming proton to interact with the carbonyl oxygen. According to our calculations, hydroquinone sulfonic acid preferentially adopts a conformation allowing the formation of intra-molecular hydrogen bonding, which leads to a stabilization energy of 1.6 kcal mol$^{-1}$. Similarly, intra-molecular hydrogen bonding provides extra stabilization of other hydroquinone sulfonic acid derivatives (Eq. 6 and Eq. 7). Thus, the intra-molecular hydrogen bonding could explain the lowering of the rate constants observed with the addition of sulfonic acid groups.

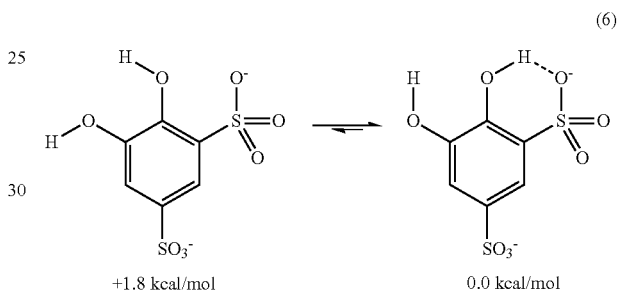

(6)

+1.8 kcal/mol        0.0 kcal/mol

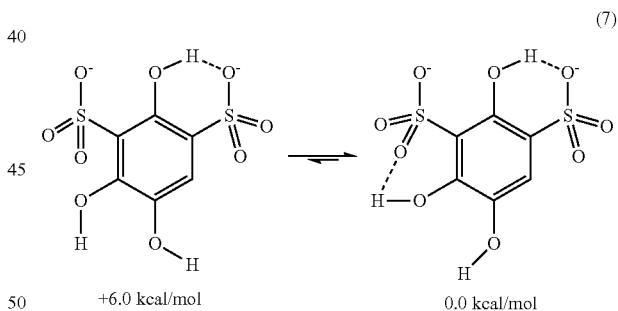

(7)

+6.0 kcal/mol        0.0 kcal/mol

The quinone-based redox systems have been extensively reported in the literature and it is well known that these systems undergo a proton-coupled electron transfer. The rate constants for charge transfer were generally quite high, at least an order of magnitude higher than that observed for the vanadium redox couples. The value of the transfer coefficients being close to 0.5 and the high values of rate constants suggest an "outer-sphere" process.

While the rate constants for the various compounds were at least one order of magnitude greater than that of vanadium system, the diffusion coefficients were comparable to that of vanadium, making the quinone redox couples very attractive from the standpoint of electrode kinetics compared to the vanadium redox flow battery system.

The Nernst diffusion layer model allows us to estimate the limiting current for the oxidation and reduction processes (Eq. 8).

$$I_{lim} = nFC^* \frac{D}{\delta} \quad (8)$$

Where $I_{lim}$ is the limiting current density, n is the number of moles of electrons transferred per mole of reactants, F is the Faraday constant (96485 C mole$^{-1}$), C* is the concentration, $D_O$ is the diffusion coefficient, and $\delta$ is the diffusion layer thickness.

For a diffusion layer thickness of 50 microns, a diffusion coefficient of 3.8×10$^{-6}$ cm$^2$ s$^{-1}$, and a bulk concentration of 0.2 M, we predict from Eq. 8 a limiting current density at room temperature to be approximately 30 mA cm$^{-2}$. Further increase in limiting current density can be achieved by increasing the concentration of reactants, reducing the diffusion layer thickness, and by increasing the diffusion coefficient. Higher concentrations and diffusion coefficients are achieved by raising the operating temperature while a lower diffusion layer thickness can be achieved by increased convective mass transport to the surface of the electrode.

Figure 12:
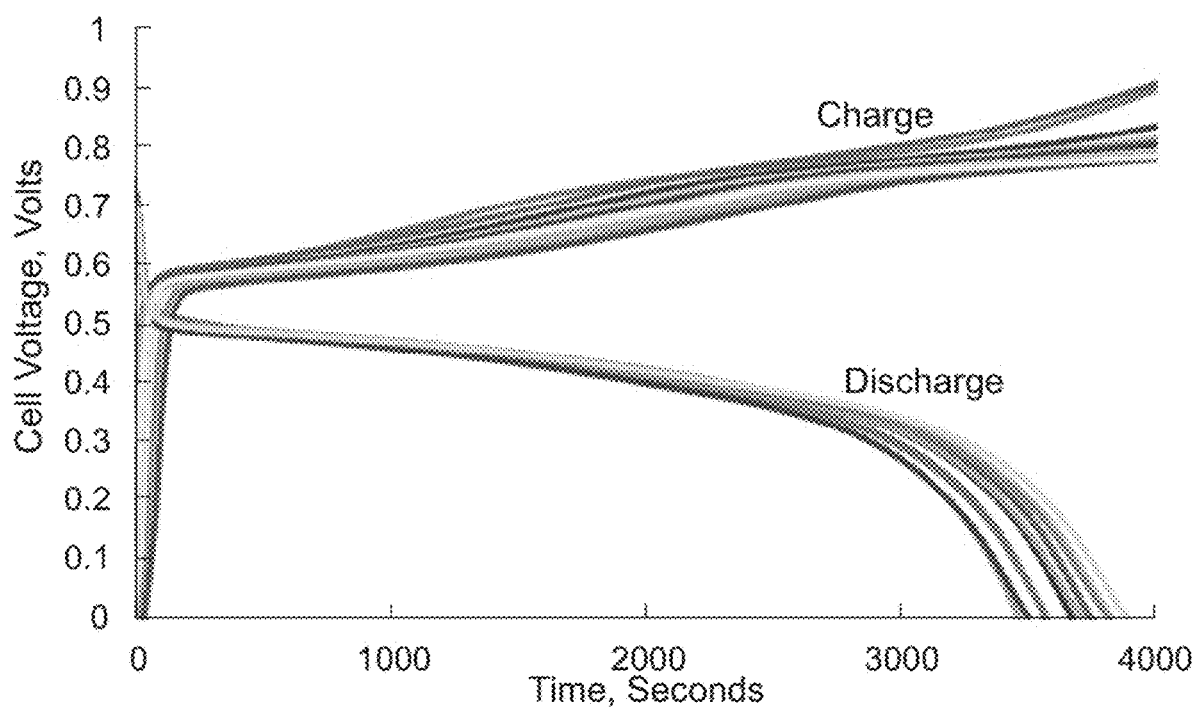
FIG. 12. Charge and discharge curves with a 25 cm$^2$ redox flow cell, 0.2 M BQDS and 0.2 M AQS, 1 M sulfuric acid, charge and discharge at 200 mA, flow rate of 0.5 liters min$^{-1}$.

We have operated flow cells with aqueous solutions of 0.2 M BQDS at the positive electrode and 0.2 M AQS or 0.2M AQDS at the negative electrode. In these cells the electrodes consisted of TORAY® paper coated with high-surface area carbon black bonded to the NAFION® membrane. These cells did not show any noticeable change in capacity over at least 12 cycles of repeated charge and discharge (FIG. 12). This result confirmed that the quinones in aqueous acid solution are chemically stable to repeated cycling. The capacity realized at a current density of 10 mA cm$^{-2}$ was over 90% of the capacity contained in the solutions. The use of TORAY® paper electrodes on either side of the cell as current collecting surfaces presented a barrier to convective transport, setting the diffusion layer thickness to as high as 150 microns, reducing the limiting current density and lowering the cell voltage.

Figure 13:
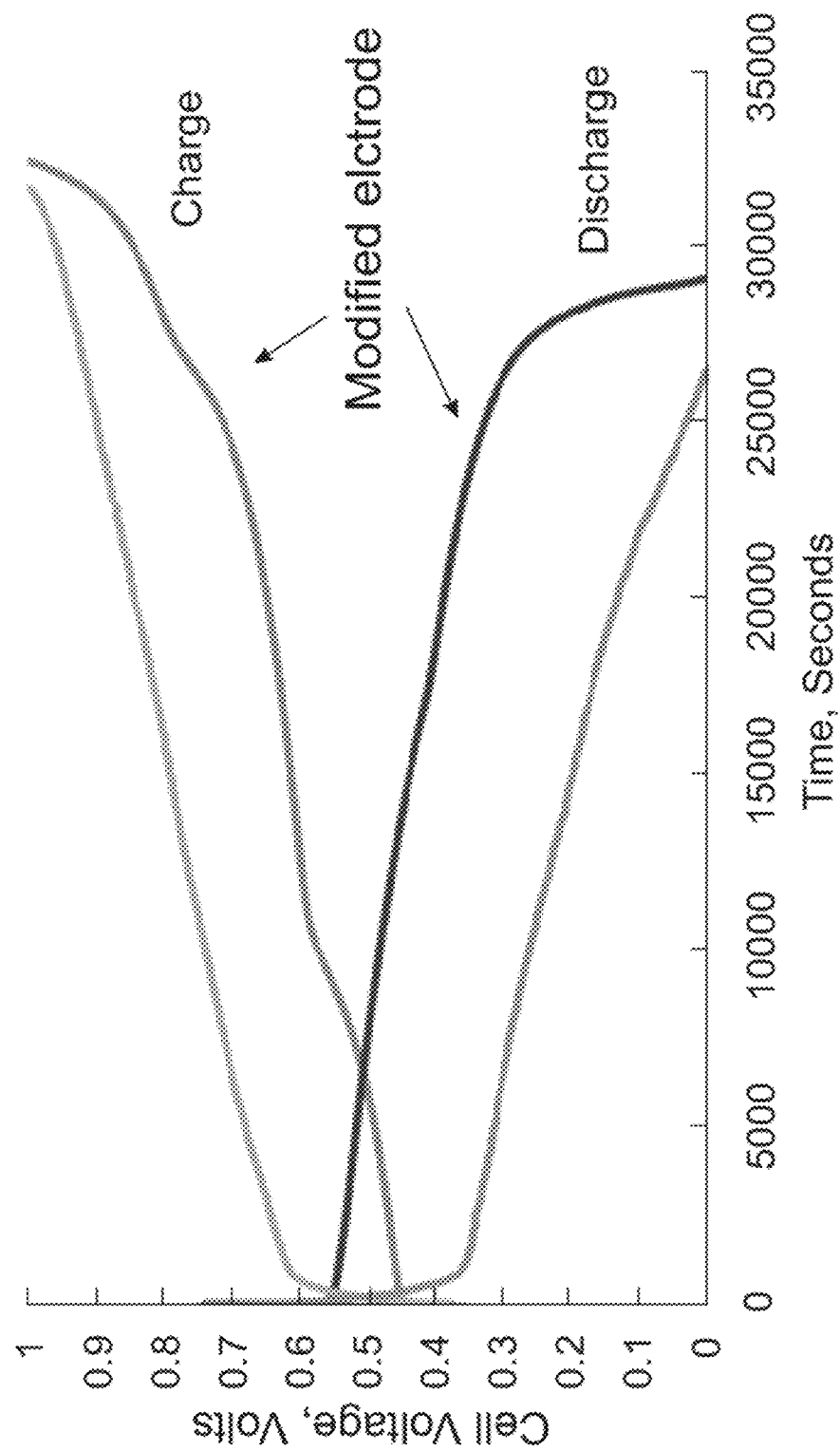
FIG. 13. The effect of electrode structure on cell performance: 9 equally spaced holes 1 cm in diameter were punched in the Toray paper electrodes. 25 cm$^2$ redox flow cell, 0.2 M BQDS, 0.2 M AQS, 1 M sulfuric acid, charge-discharge at 50 mA, flow rate 0.25 liter min$^{-1}$.

Increasing the mass transport of reactants and products improved the current density and cell voltage significantly. In one configuration of the electrodes, the increase in mass transport was achieved by punching nine equally-spaced holes 1 cm in diameter in the Toray paper electrodes to allow the flow of redox active materials to shear directly past the carbon black layer bonded to the membrane. The increased current and voltage observed as a result of the change in the access of the redox materials to the electrode (FIG. 13) confirmed that the kinetics of the electrode reactions are largely controlled by the mass transport of the reactants and products.

Figure 14A:
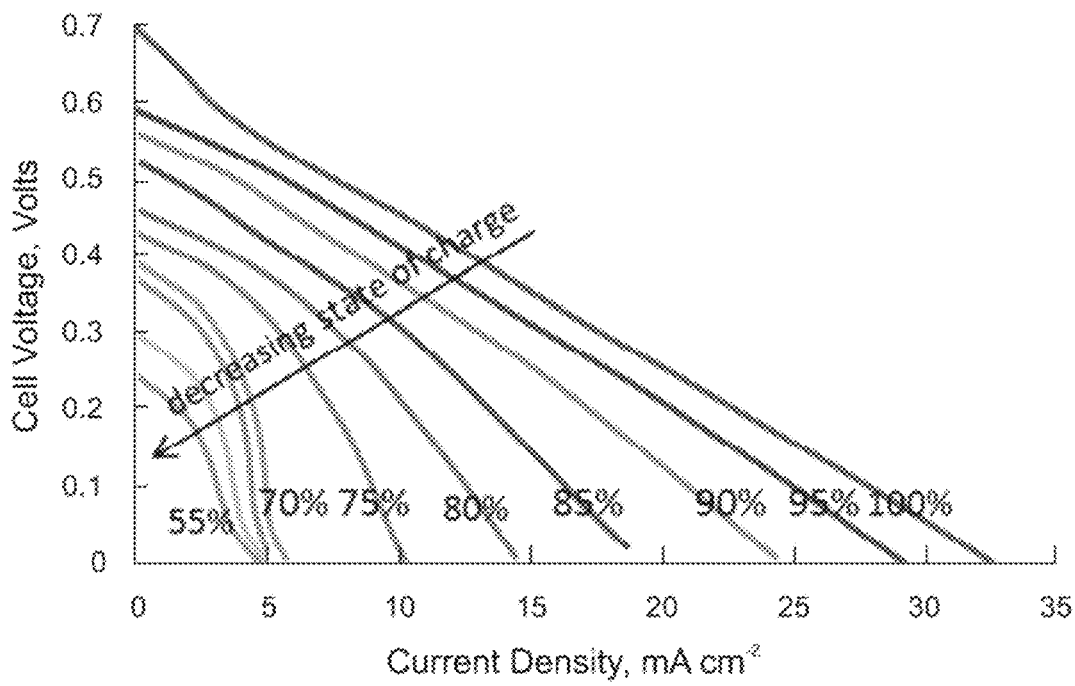
FIG. 14A. 25 cm² redox flow cell, 0.2 M BQDS, 0.2 M AQS, 1 M sulfuric acid. Cell voltage-current density curves as a function of state-of-charge (5% difference each run).
Figure 14B:
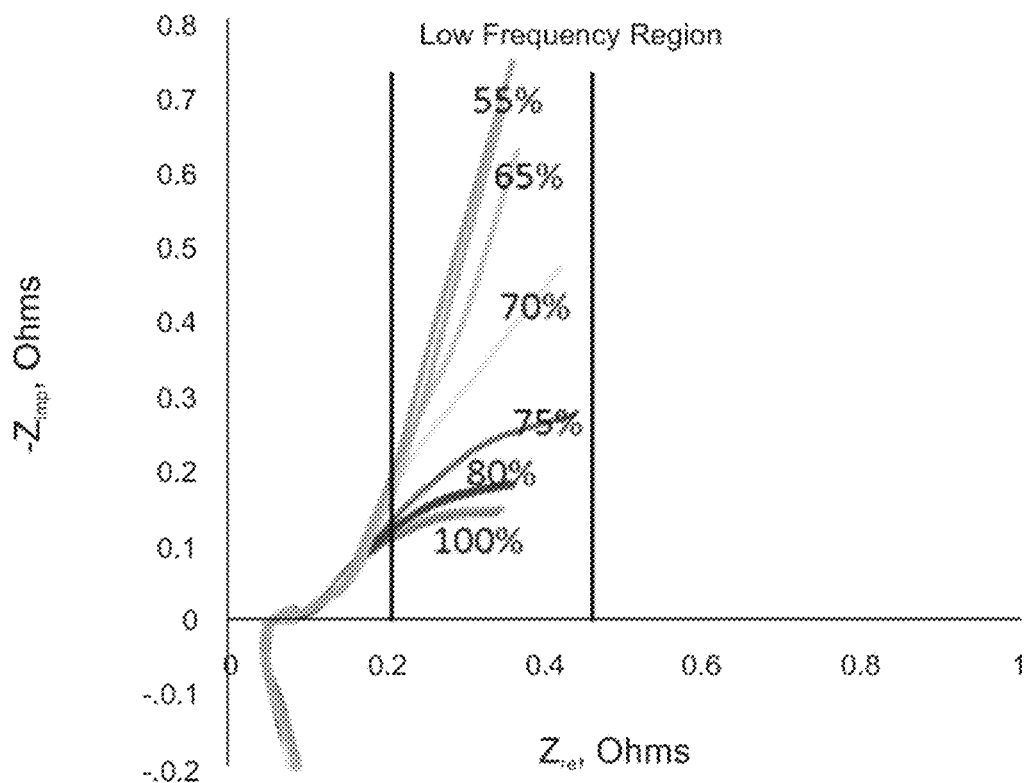
FIG. 14B. 25 cm² redox flow cell, 0.2 M BQDS, 0.2 M AQS, 1 M sulfuric acid. Impedance spectroscopy data from 10 kHz to 10 mHz on the cells at various states-of-charge.

The dependence of cell voltage on current density when measured as a function of the state of charge of ORBAT confirmed that the mass transport of reactants had a significant impact on the operating cell voltage (FIG. 14A). The power density of the cell decreased significantly below 50% state-of-charge. The alternating current impedance of the cells measured as a function of frequency also confirmed that the mass transport limitations increased as the state-of-charge decreased. The slopes of the Nyquist plot at low frequencies (<1 Hz) were found to steadily increase with decreasing state-of-charge, while the rest of the impedance spectrum remained almost unaffected (FIG. 14B), suggesting an increasing thickness of the diffusion layers with a decrease in the state-of-charge. Therefore, it is clear from the results in FIG. 14 that at all current densities, mass transport limitations made a significant contribution to the overpotential losses.

In an effort to understand the results presented in FIG. 14, we have analyzed the effect of state-of-charge on the current-voltage characteristics using a simplified one-dimensional model (see Appendix). The assumptions in this analysis are based on experimental findings from RDE studies and flow cell studies that show that the charge-transfer reactions are facile and that mass transport processes determine the cell voltage during operation.

The analysis yields the following relationship between the observed cell voltage and the discharge current as a function of state-of-charge.

$$V_{cell} = E_c^0 - E_a^0 + \frac{RT}{nF} \ln\left(\frac{Q^2}{(1-Q)^2}\right) - \\ 2I_d\left(\frac{RT}{nF}\right)\left[\frac{1}{nFm_tAQC_i - I_d} + \frac{1}{nFm_tA(1-Q)C_i + I_d}\right] - I_d R_{ohmcell} \quad (9)$$

Where $V_{cell}$ is the cell voltage during discharge and $E_{cnot}$ and $E_{anot}$ are the standard reduction potentials for the two redox couples used at the cathode and anode, respectively. $I_d$ is the discharge current and Q is the state-of-charge with values between 0 to 1. $C_{initial}$ is the starting concentration of the reactants at 100% state-of-charge; $C_{initial}$ is assumed in this analysis to be the same at both electrodes. A is the area of the electrode, and $m_t$ is the mass transport coefficient defined as the diffusion coefficient divided by the diffusion layer thickness. R is the universal gas constant, F is the Faraday constant, T is the temperature, and n is the number of electrons in the redox reaction.

Eq. 9 has been graphed (FIG. 15) for various states-of-charge using experimentally determined parameters for the BQDS and AQS system (Table 6).

TABLE 6

Parameters used in the analysis of current-voltage curves as a function of state-of-charge.

| Parameter | Value |
| --- | --- |
| Standard Reduction Potential of Cathode ($E_{cnot}$), V | +0.45 |
| Standard Reduction Potential of Anode ($E_{anot}$), V | −0.52 |
| Initial concentration of reactants ($C_{initial}$) moles cm$^{-3}$ | 2E−4 |
| Diffusion coefficient of cathode and anode reactants and products (D) cm$^2$ s$^{-1}$ | 4E−6 |
| Diffusion layer thickness ($\delta$) cm | 4E−3 |
| Geometric Area of the Electrode (A), cm$^2$ | 25 |
| Number of electrons in the reaction (n) | 2 |
| Series equivalent resistance at impedance at 10 kHz ($R_{ohmcell}$), Ohm | 0.05 |

Figure 15:
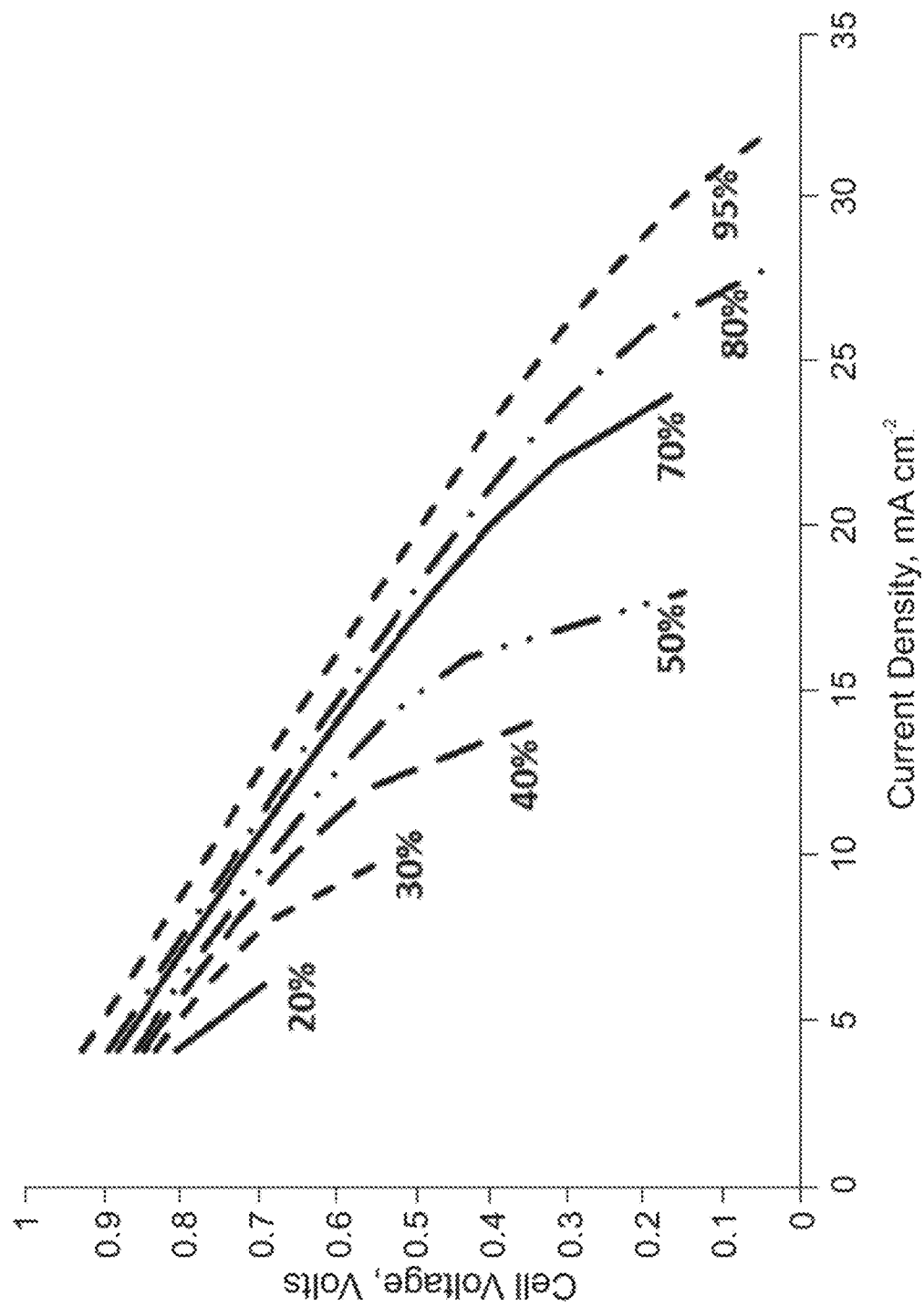
FIG. 15. Simulation of cell voltage as a function of discharge current density (as per Eq. 9) at various states-of-charge, as indicated on the curves using parameters in Table 6.

Comparison of FIG. 15 with the experimental data in FIG. 14 shows general agreement of the trend predicted by the analysis with the observed experimental results; decrease in state-of-charge resulted in a decrease of discharge current at any particular voltage, leading to a significant reduction in discharge rate capability at low states-of-charge. However, the experimental current-voltage curves were nearly linear at the high states of charge and the experimental values of cell voltage at low current values decreased substantially with decreasing state-of-charge. These deviations from the analytical expression suggest that there are additional resistance elements under dynamic operating conditions that are not captured in the simplified analysis. We list at least two other effects that can cause substantial changes to the observed voltage:

1. Electro-osmotic drag of water molecules (estimated to be about 3 molecules per proton) occurs across the membrane during passage of current. These water molecules either appear or are removed from the diffusion layer at each electrode causing changes to the pH and concentration of reactants and products. These concentration changes at the interface will contribute to a reduction in cell voltage. For example, at the cathode during discharge, water molecules could be added to the diffusion layer causing the pH to increase and, consequently, the electrode potential to decrease. Correspondingly, water molecules will be removed from the anode, causing the pH to decrease, the electrode potential to increase, and the cell voltage to decrease.

2. At the anode, we use a solution of AQS at concentrations close to the solubility limit (0.2 M). Consequently, at a low state-of-charge when the oxidized form of AQS at the negative electrode is present in high concentrations in the bulk of the solution, the high rates of discharge would cause the solubility limits to be exceeded at the surface of the negative electrode. This would result in the precipitation of redox materials at the surface of the electrode and with a significant reduction of the current. To avoid such an abrupt drop in cell voltage at high current densities and low states-of-charge, the solubility of the redox materials must be high. Additionally, reducing the thickness of the diffusion layer by using a flow-through electrode will increase the "saturation-limited" current density.

3. The analysis helps us to quantify the variations in performance that can result from changes to local mass-transport conditions at any state-of-charge. The observed differences between the experimental data and the predictions of simple analysis of the cell performance also help us to identify the phenomena that are important to consider for further design and modeling of redox flow cells.

Figure 16A:
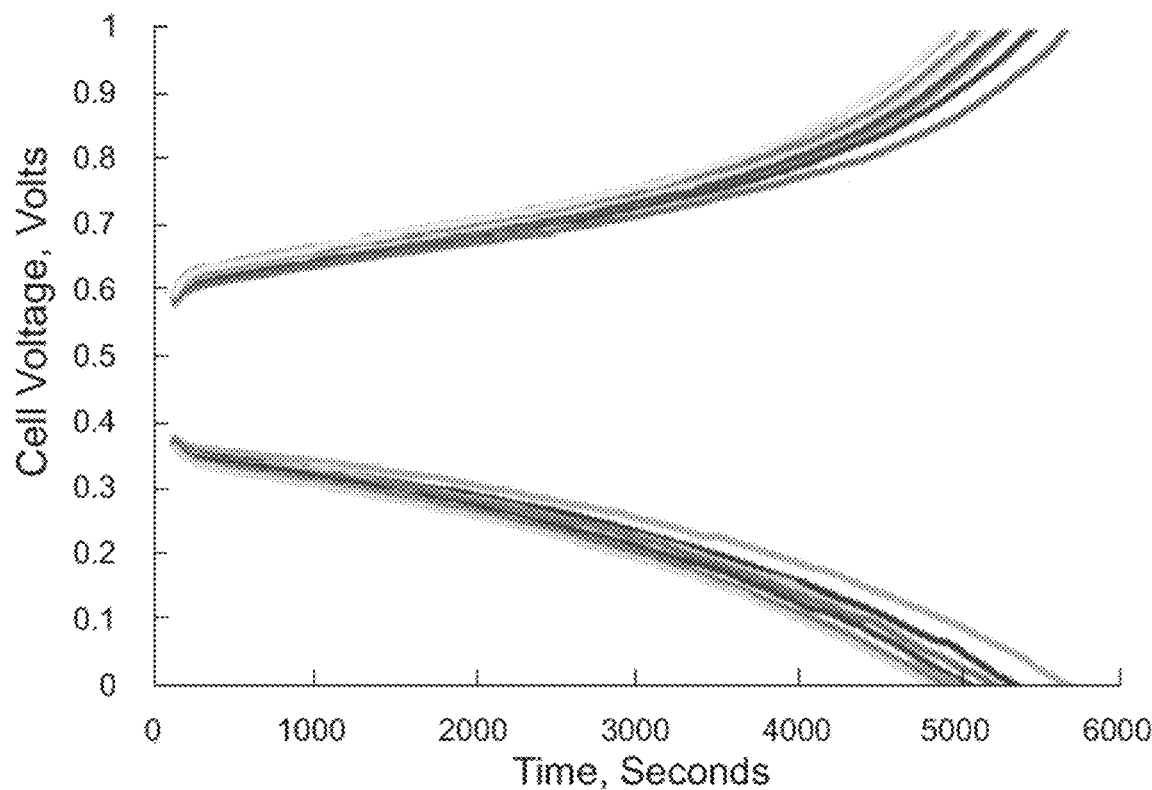
FIG. 16A. 12 charge and discharge curves with a 25 cm² redox flow cell, 0.2 M BQDS, 0.2 M AQDS, 1 M sulfuric acid, charge and discharge at 200 mA, flow rate of 1 liters $min^{-1}$ on a peristaltic pump.
Figure 16B:
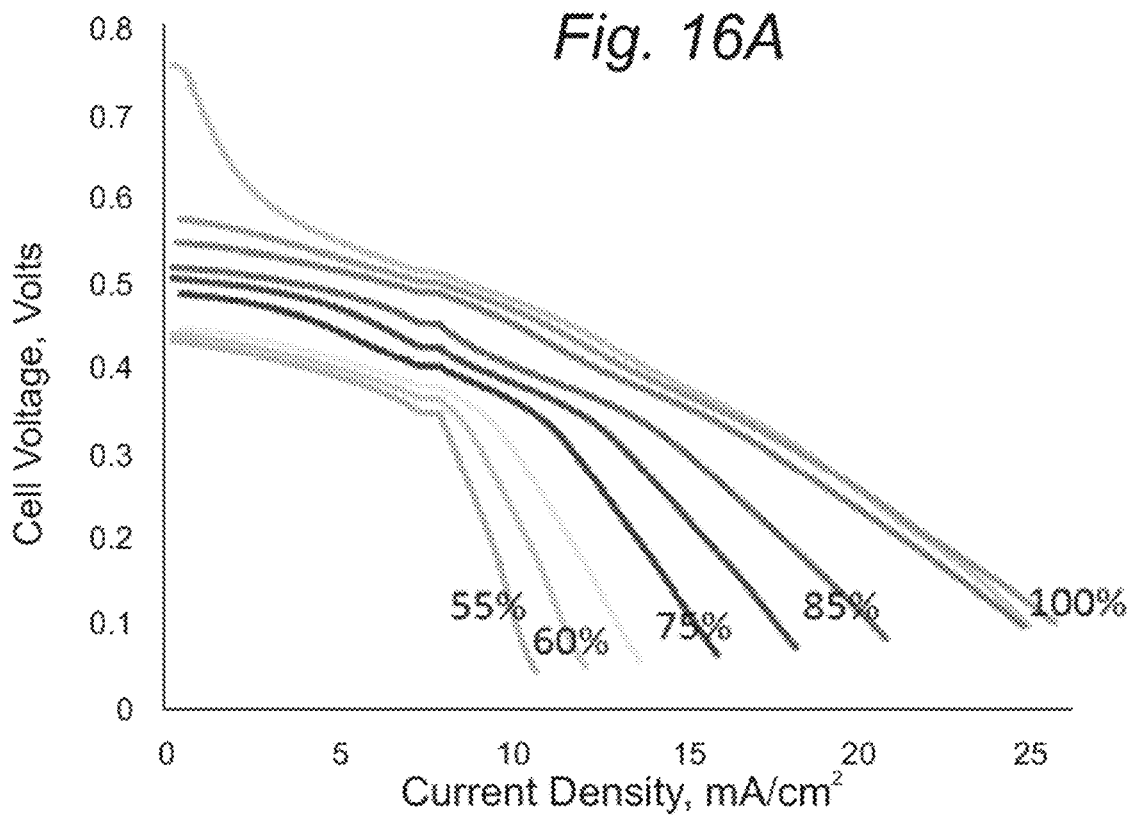
FIG. 16B. Cell voltage-current density curves as a function of state-of-charge (as indicated by percent stated, 5% difference each run) in a 25 cm² redox flow cell, 0.2 M BQDS, 0.2 M AQDS, 1 M sulfuric acid.

When and aqueous solution of 0.2 M AQDS was used on the negative side of the flow battery, the tests showed charge-discharge cycling stability similar to AQS. By operating at a higher pumping speed, the cell voltages and capacity for the BQDS/AQDS cell could be increased, consistent with the reduction of the voltage losses from mass transport limitations (FIG. 16A). The cell voltage and current density did not drop off as quickly with state-of-charge as in the case of AQS. The aqueous solubility limit of AQDS is about 0.5 M while that of AQS is about 0.2 M. Consequently, even at very low states-of-charge, the solubility limit was less likely to be exceeded with AQDS than with AQS. Thus, higher solubility allows the cell voltage to be maintained at a higher value with AQDS compared to AQS especially at low states-of-charge. This difference in performance of AQDS and AQS highlights the role of solubility limits on the rate capability at various states-of-charge. Such findings motivate us to investigate higher concentrations and temperatures with AQDS in future studies.

For the first time, we have demonstrated the feasibility of operating an aqueous redox flow cell with reversible water-soluble organic redox couples (we have termed ORBAT). This type of metal-free flow battery opens up a new area of research for realizing inexpensive and robust electrochemical systems for large-scale energy storage. The cells were successfully operated with 1,2-benzoquinone disulfonic acid at the cathode and anthraquinone-2-sulfonic acid or anthraquinone-2,6-disulfonic acid at the anode. The cell used a membrane-electrode assembly configuration similar to that used in the direct methanol fuel cell. (S. R. Narayanan, A. Kindler, B. Jeffries-Nakamura, W. Chun, H. Frank, M. Smart, T. I. Valdez, S. Surampudi, G. Halpert, J. Kosek, and C. Cropley, "Recent Advances in PEM Liquid Feed Direct Methanol Fuel Cells", *Eleventh Annual Battery Conference on Applications and Advances*, Long Beach, CA, 1996. doi: 10.1109/BCAA.1996.484980). We have shown that no precious metal catalyst is needed because these redox couples undergo fast proton-coupled electron transfer.

We have determined the critical electrochemical parameters and various other factors governing the performance of the cells. The standard reduction potentials calculated using density functional theory were consistent with the experimentally determined values. This type of agreement suggested that quantum mechanical methods for prediction of the reduction potentials could be used reliably for screening various redox compounds. The experimental values of the diffusion coefficients of the various quinones in aqueous sulfuric acid suggested that strong interaction of the ionized quinones with water resulted in lower diffusion coefficients compared to those in non-aqueous media. Further, we found that significant stabilization by intra-molecular hydrogen bonding occurred with the sulfonic acid substituted molecules. These differences will be important to consider in interpreting the changes in the rate of proton-coupled electron transfer in these molecules.

Our experiments also demonstrated that the organic redox flow cells could be charged and discharged multiple times at high faradaic efficiency without any sign of degradation. Our analysis of cell performance shows that the mass transport of reactants and products and their solubilities are critical to achieve high current densities.

Determination of Electrode Characteristics of Various Organic Compounds for Flow Cells Electrode Application.

Measurement of kinetic parameters and diffusion coefficients was conducted in a three-electrode cell consisting of a rotating glassy carbon disk working electrode, a platinum wire counter electrode, and a mercury/mercuric sulfate reference electrode ($E°=+0.65$ V). The quinones, in either the fully reduced or fully oxidized form, were dissolved in 1 M sulfuric acid to a concentration of 1 mM. The solutions were de-aerated and kept under a blanket of argon gas throughout all the experiments. All measurements were conducted in the potentiodynamic mode (Versastat 300 potentiostat) at a scan rate of 5 mV s$^{-1}$ over a range of rotation rates (500 rpm to 3000 rpm). Impedance measurements were also made at each rotation rate. Cyclic voltammetry was conducted on a static glassy carbon electrode at a scan rate of 50 mV s$^{-1}$.

Linear sweep voltammetric measurements at a rotating disk electrode at various rotation rates (FIG. 11 A, B, C) showed that the limiting current, $I_{lim}$, was found to depend linearly on the square root of the rotation rate, $\omega$, as per the Levich equation (Eq. 3).

$$I_{lim} = 0.62 n \, F \, A \, D_o^{2/3} \omega^{1/2} \nu^{-1/6} C^* \tag{3}$$

Where n is the number of electrons transferred, F, the Faraday constant, A, electrode area, $D_o$, the diffusion coefficient, $\nu$, the kinematic viscosity of the solution and $C^*$, the bulk concentration of the reactants. For n=2, an active electrode area of 0.1925 cm$^2$, and a kinematic viscosity of the electrolyte of 0.01 cm$^2$ s$^{-1}$, we were able to evaluate the diffusion coefficient from the slope of the straight line plots.

To determine the kinetic parameters for the charge-transfer process, namely the rate constant and the apparent transfer coefficient, the logarithm of the kinetic current (after correction for mass-transport losses) was plotted against the observed overpotentials greater than 100 mV, where the Tafel equation derived from the Butler-Volmer Equation is applicable:

$$\left(\frac{I}{1-\frac{I}{I_{lim}}}\right) = I_{exp}\left[\frac{C_O}{C_O^*}\exp\left(-\frac{\alpha nF(E-E_{rev})}{RT}\right) - \frac{C_R}{C_R^*}\exp\left(\frac{(1-\alpha)nF(E-E_{rev})}{RT}\right)\right]$$

Where I is the current, $I_{lim}$ is the limiting current, $I_{ex}$ is the exchange current density, $C_O$ and $C_R$ are the concentration of the oxidized and reduced species at the surface of the electrode, $C_O^*$ and $C_R^*$ are the bulk concentrations of the oxidized and reduced species, $\alpha$ is the transfer coefficient, n is the number of electrons transferred, F is the Faraday constant, $E-E_{rev}$ is the overpotential, R is the gas constant, and T is the temperature. The rate constant, $k_o$, was obtained from the exchange current density using the relationship $$k_o I_{ex}/nFAC^*$$

TABLE 7

| Name of redox couple | $E_{1/2}$ vS. MSE, Volt | Exchange Current density (A/cm$^2$) | Diffusion Coefficient (cm$^2$/sec) | Tafel Slope, mV/decade, d$\eta$/d(log I) | Solubility |
|---|---|---|---|---|---|
| Hydroquinone disulfonic acid | 0.45 | 3.47E−6 | 3.80E−6 (4.04E−6) | 123 | 1M |
| Maleic hydrazide | 0.6 | 5.86E−6 | 6.57E−6 | 54 | 0.1M |
| Phthalyl hydrazide | 0.5 | 3.03E−6 | 1.07E−6 | 40 | 0.01M |
| Hydroquinone | 0.02 | 9.17E−5 | 5.03E−6 (5.4E−6) | 110 | 0.53M |
| Hydroquinone sulfonic acid | 0.17 | 2.59E−5 | 4.28E−6 | 63 | 0.8M |
| Dichloroquinone (unsulfonated) | 0.05 | 3.64E−6 | 4.57E−7 | 26 | <1 mM |
| Anthraquinone sulfonic acid | −0.52 | 1.95E−5, (2.91E−5) | 3.18E−6 (3.35E−6) | 65 (58) | 0.2M |
| Quinoxaline | −0.50 −0.70 | 3.25E−5; 9.8E−5 | 1.36E−6, 1.09E−6 | 84, 64 | >7M |
| Anthraquinone 2-sulfonic acid | −0.52 | 1.95E−5 | 3.35E−6 | | |
| 2,6 Anthraquinone disulfonic acid | −0.58 | 1.81E−6 | 4.04E−6 | | |
| 2,7 Anthraquinone disulfonic acid | −0.57 | 7.82E−7 | 1.82E−6 | | |
| 1,8 Anthraquinone disulfonic acid | −0.70 | 1.60E−6 | 3.39E−6 | | |

Figure 17:
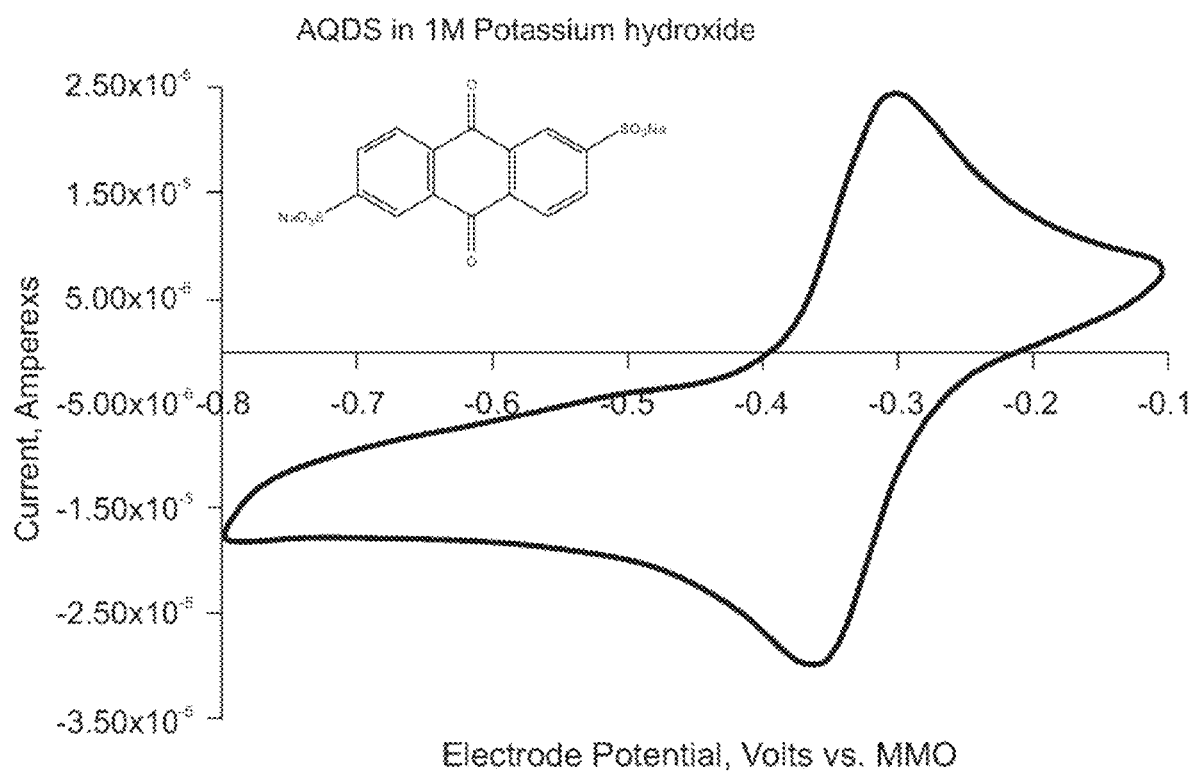
FIG. 17 provides a cyclic voltammogram for anthraquinone-2,6-disulfonic acid in 1M potassium hydroxide.
Figure 18:
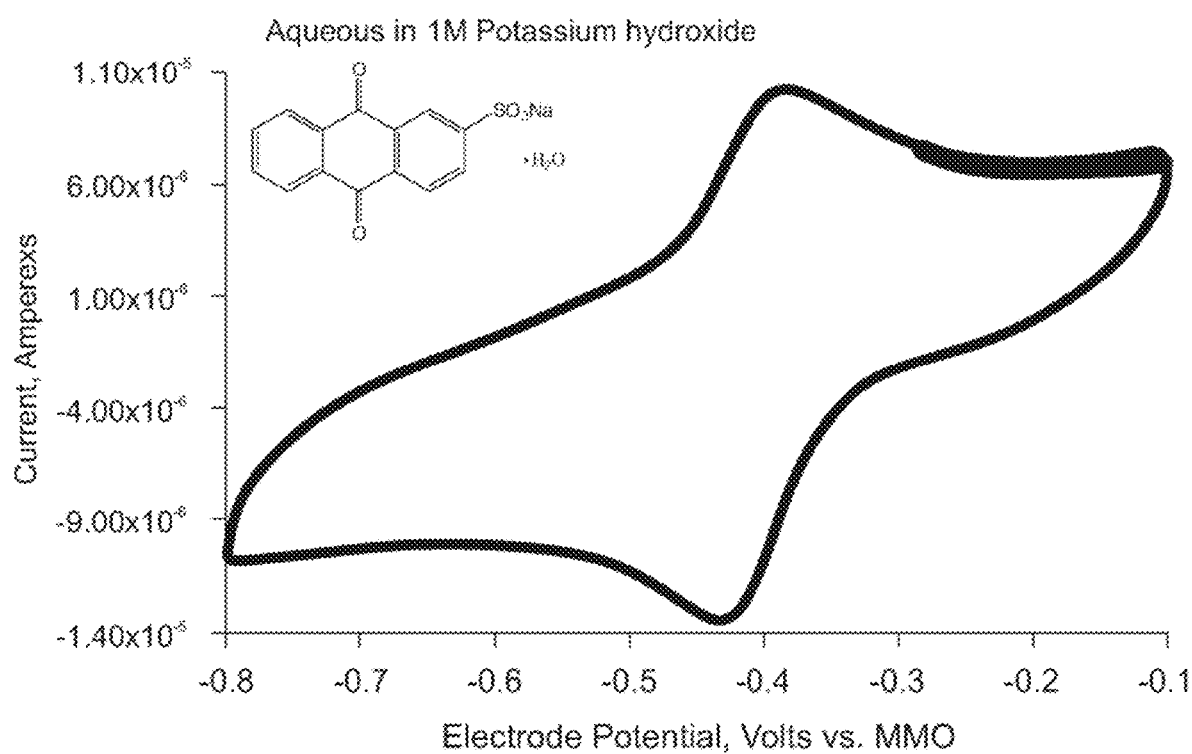
FIG. 18 provides a cyclic voltammogram for anthraquinone-2-sulfonic acid salt in 1M potassium hydroxide.
Figure 19:
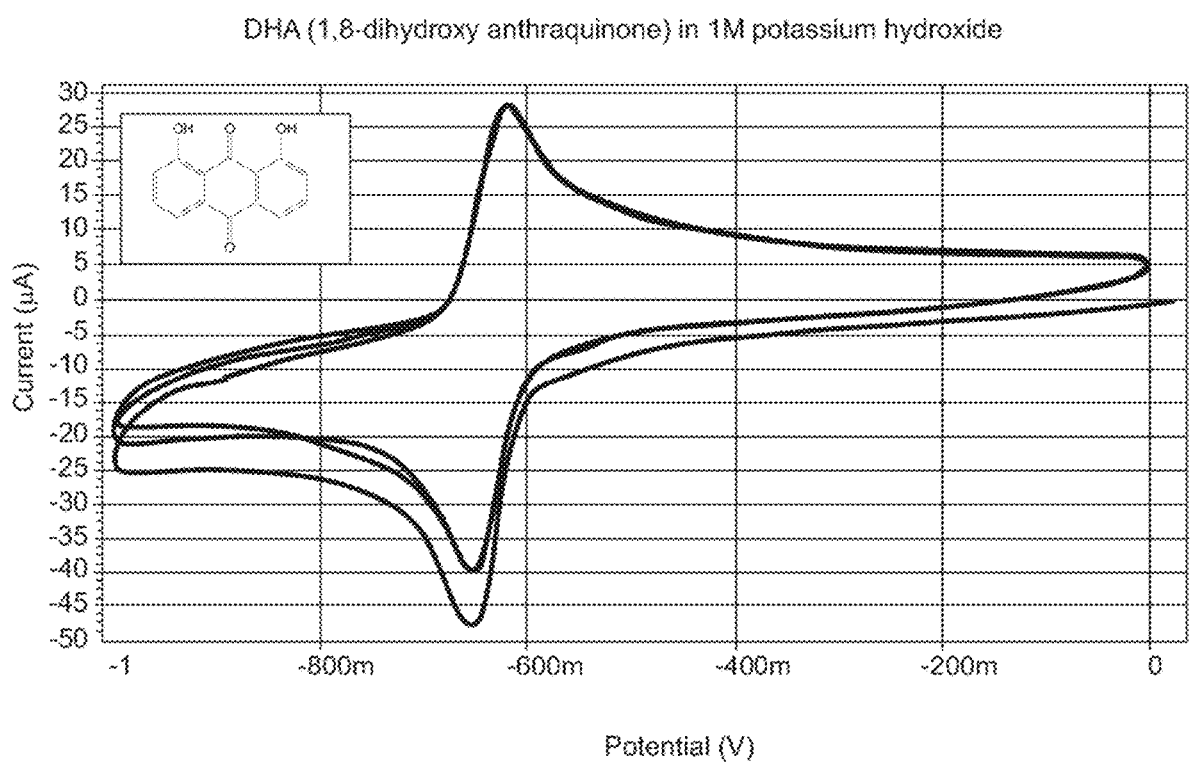
FIG. 19 provides a cyclic voltammogram for 1,8-dihydroxy anthraquinone in 1M potassium hydroxide.

A feature of the present invention is the ability of the organic compound redox couples set forth above to operate in basic (pH 9-14) solutions. FIGS. 17, 18, and 19 provide cyclic voltammograms for flow cell electrode reactions in basic solutions. FIG. 17 provides a cyclic voltammogram for anthraquinone-2,6-disulfonic acid in 1M potassium hydroxide. The voltammogram shosl a reversible peal at about −0.35 V vs. MMO. FIG. 18 provides a cyclic voltammogram for anthraquinone-2-sulfonic acid salt in 1M potassium hydroxide. The voltammogram show a reversible peak at about −0.4 V vs MMO which is slightly more negative than AQDS. FIG. 19 provides a cyclic voltammogram for 1,8-dihydroxy anthraquinone in 1M potassium hydroxide. The voltammogram show a very reversible peak at approximately −0.60 V vs. MMO which is more reversible and has a more negative potential than either of the sulfonic acid anthraquinones. Solubility of 1,8-dihydroxy anthraquinone is also enhanced.

Figure 20:
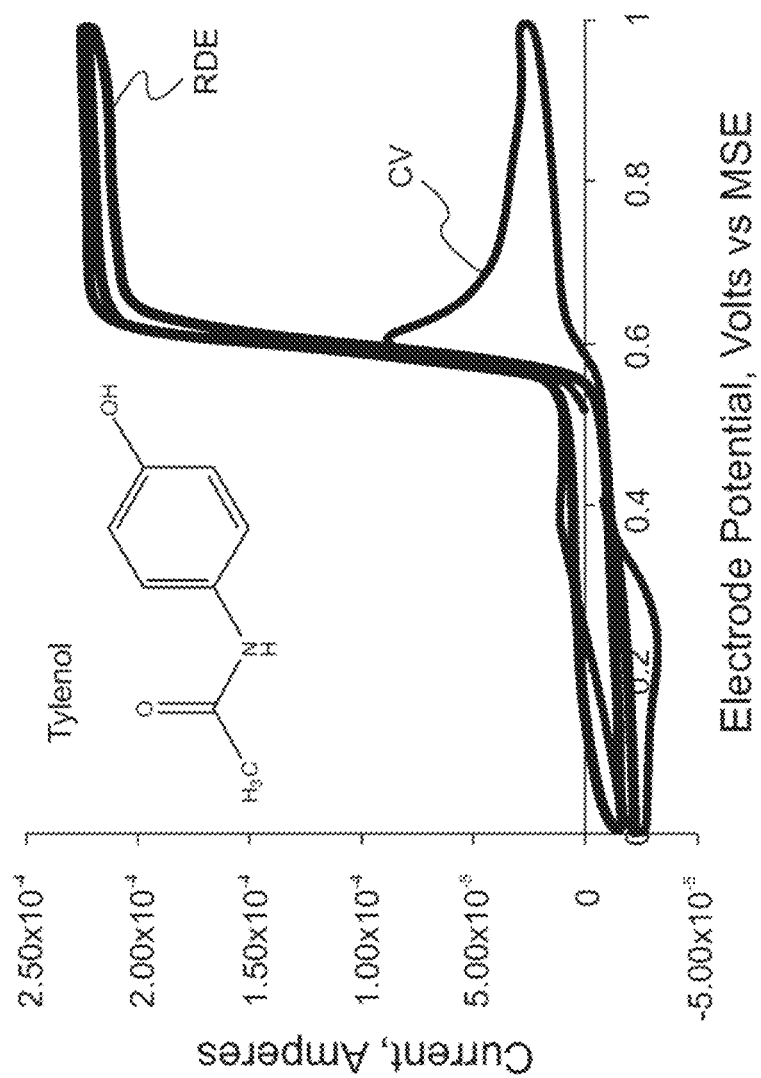
FIG. 20 provides a cyclic voltammogram for TYLENOL®.
Figure 21:
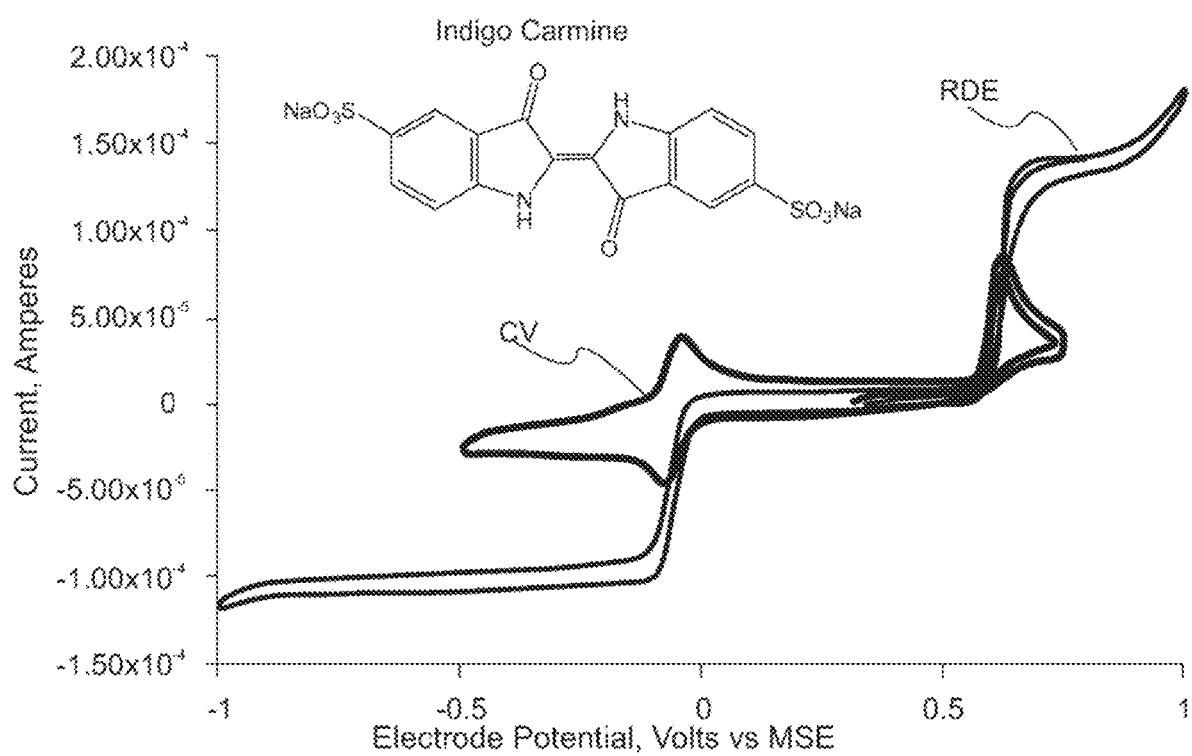
FIG. 21 provides a cyclic voltammogram for Indigo Carmine.
Figure 22:
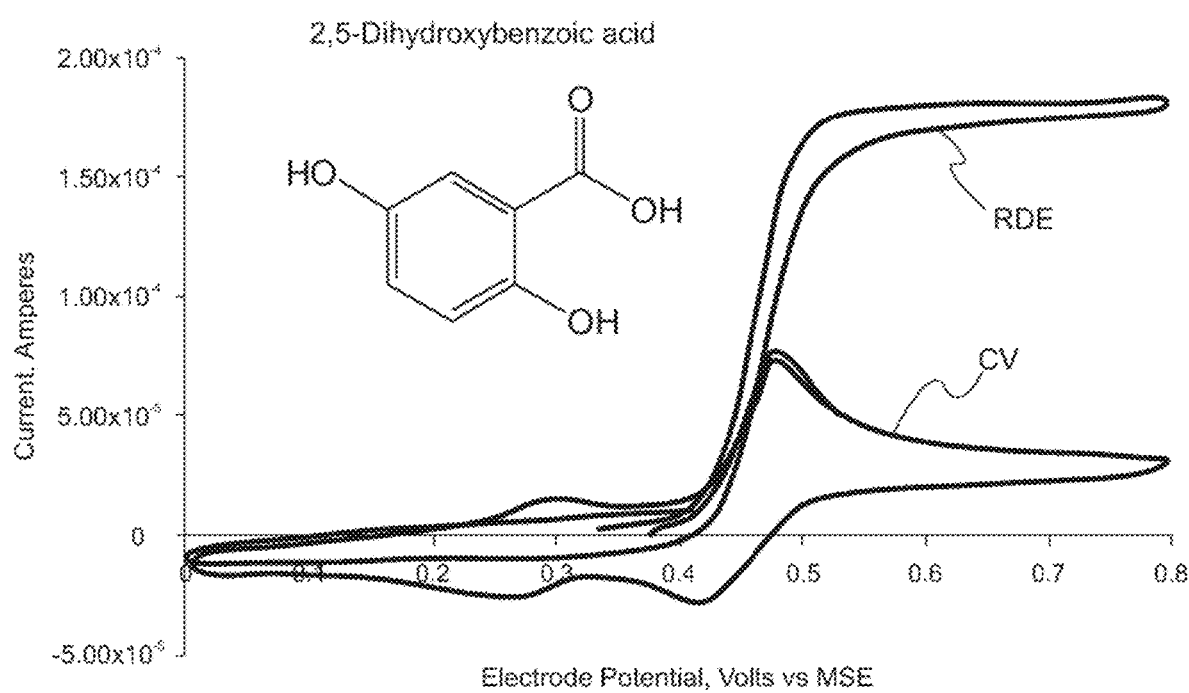
FIG. 22 provides a cyclic voltammogram for 2,5-dihydroxybenzoic acid.
Figure 23:
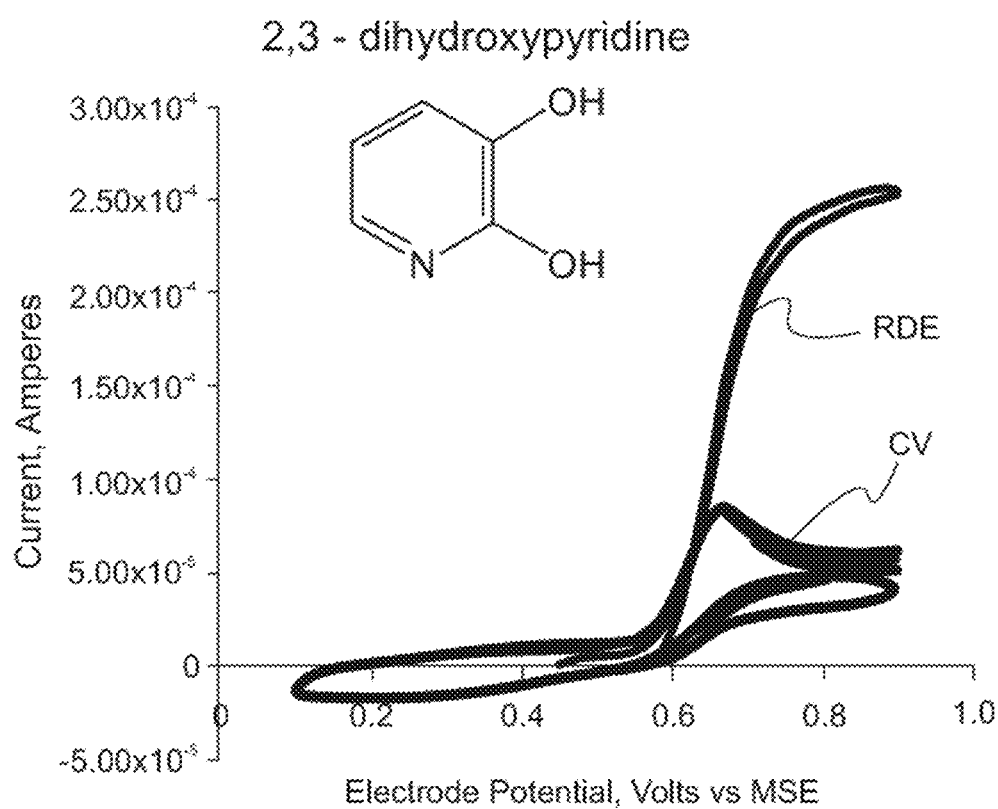
FIG. 23 provides a cyclic voltammogram for 2,3-dihydroxypyridine.
Figure 24:
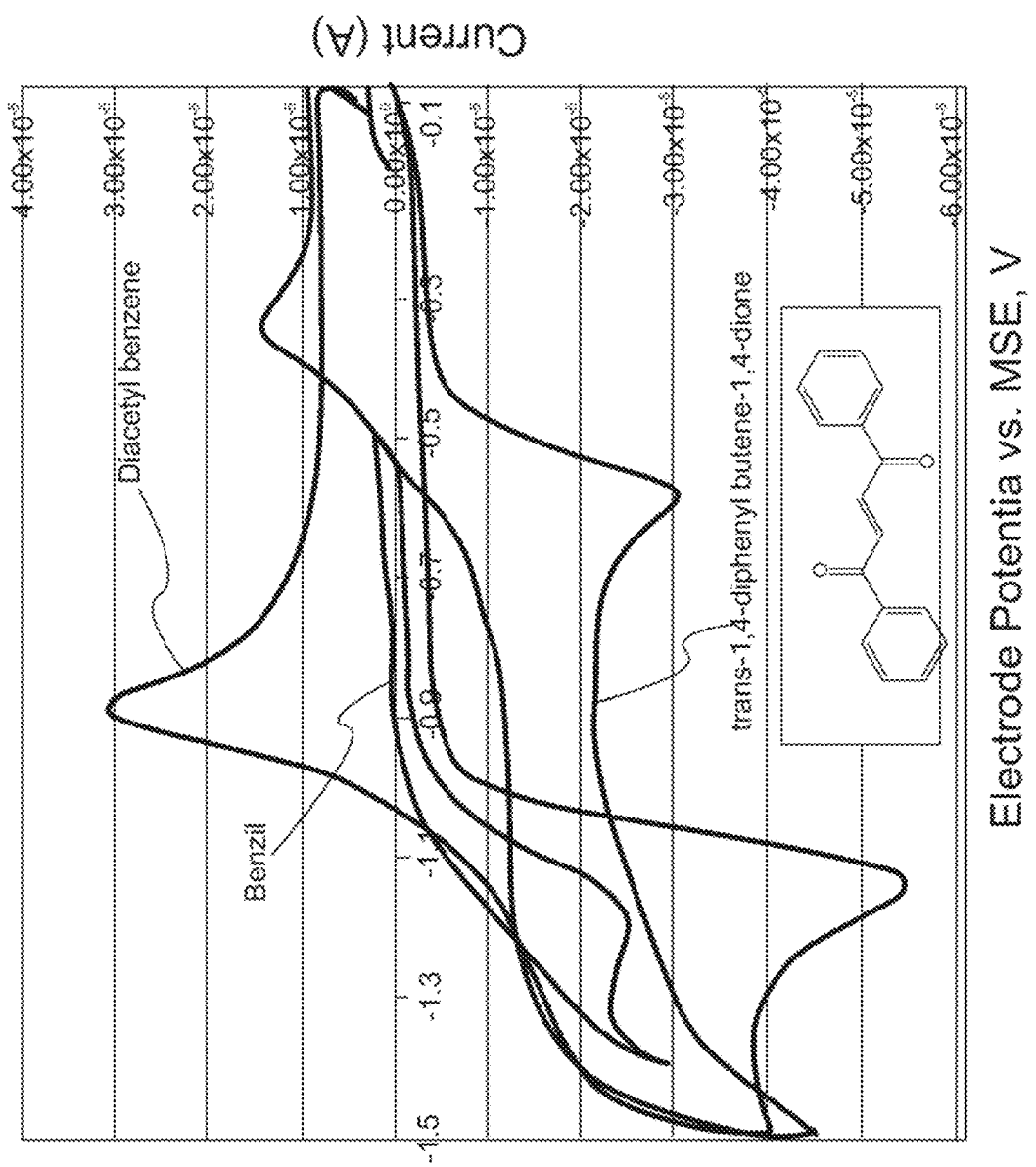
FIG. 24 provides a comparison of the cyclic voltammograms diacetyl benzene, benzyl, and trans-1,4-diphenyl butane-1,4-dione.
Figure 25:
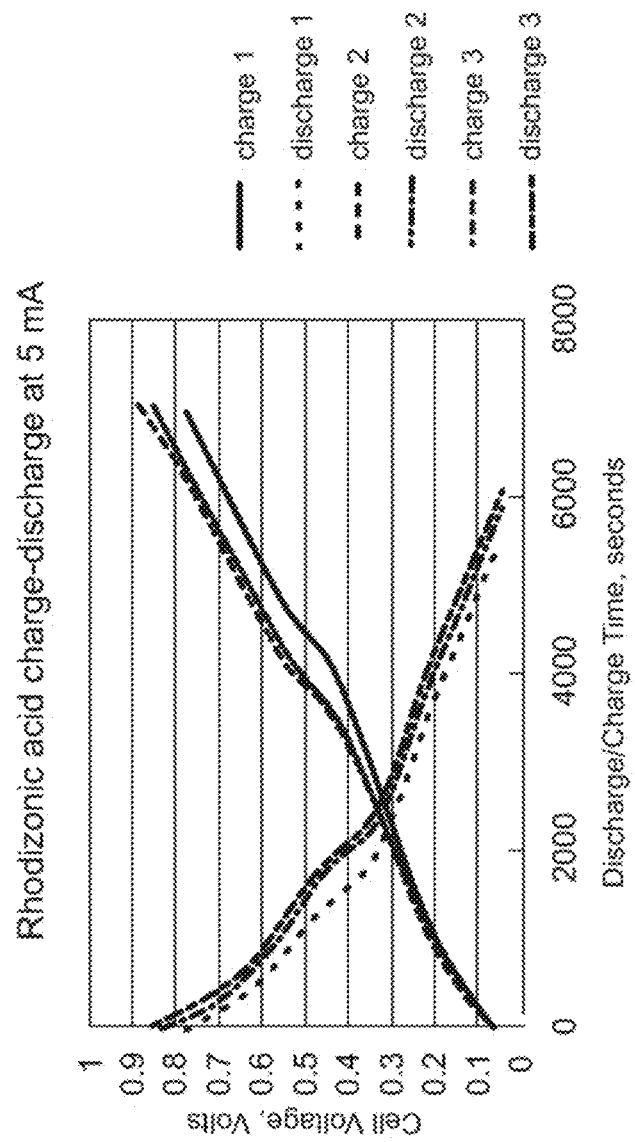
FIG. 25 provides charging and discharging curves for rhodizonic acid at 5 mA.

FIGS. 20-23 provide cyclic voltammograms for various examples of the compounds set forth above demonstrating their reversibility and therefore suitability for flow cells. FIG. 20 provides a cyclic voltammogram for TYLENOL®. FIG. 21 provides a cyclic voltammogram for Indigo Carmine. FIG. 22 provides a cyclic voltammogram for 2,5-dihydroxybenzoic acid. FIG. 23 provides a cyclic voltammogram for 2,3-dihydroxypyridine. FIG. 24 provides a comparison of the cyclic voltammograms diacetyl benzene, benzyl, and trans-1,4-diphenyl butane-1,4-dione FIG. 25 provides charging and discharging curves for rhodizonic acid at 5 mA demonstrating the suitability of this compound to function in a flow cell electrode.

Figure 26:
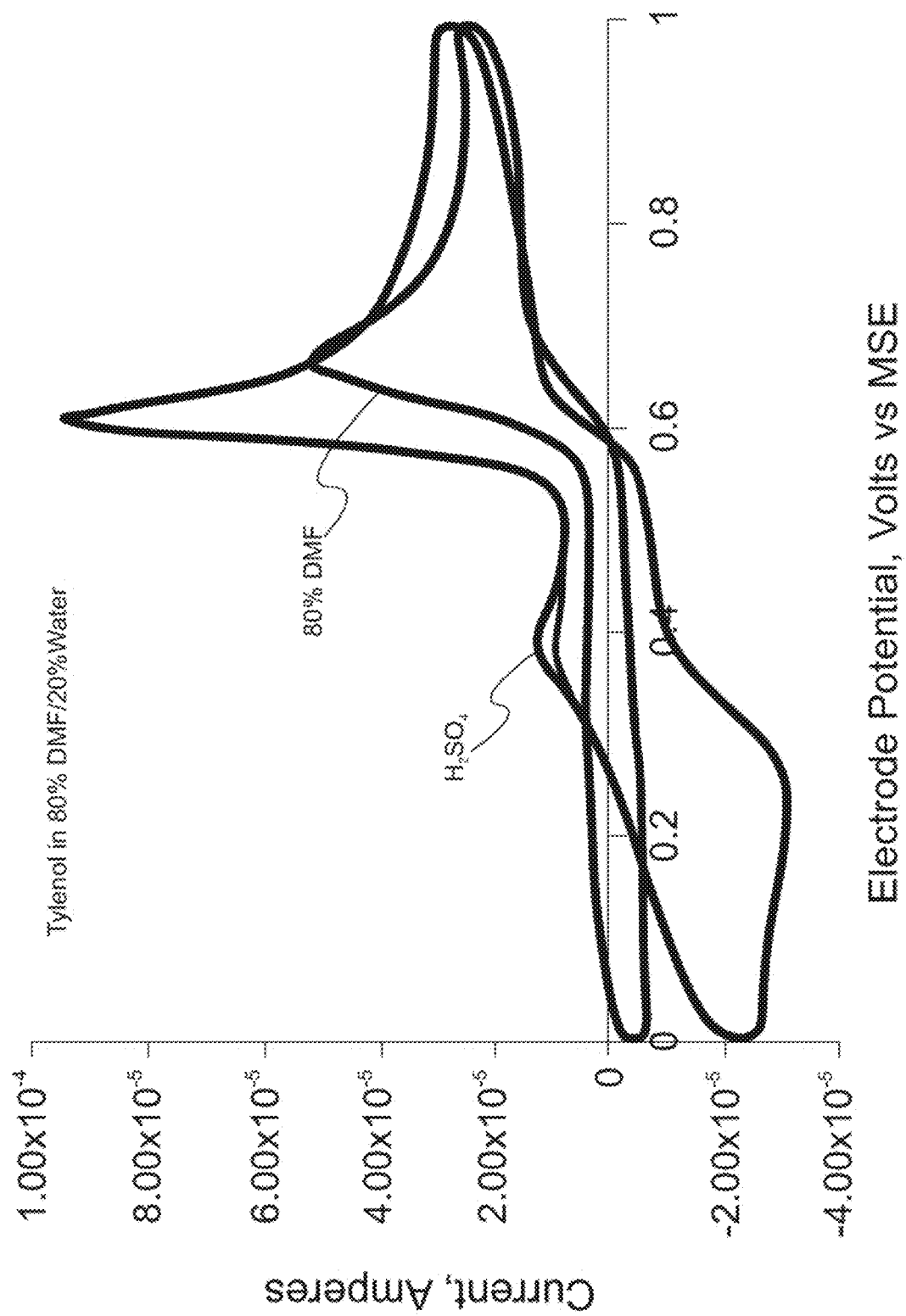
FIG. 26 provides a cyclic voltammogram TYLENOL® in 80% DMF/20% Water.
Figure 27:
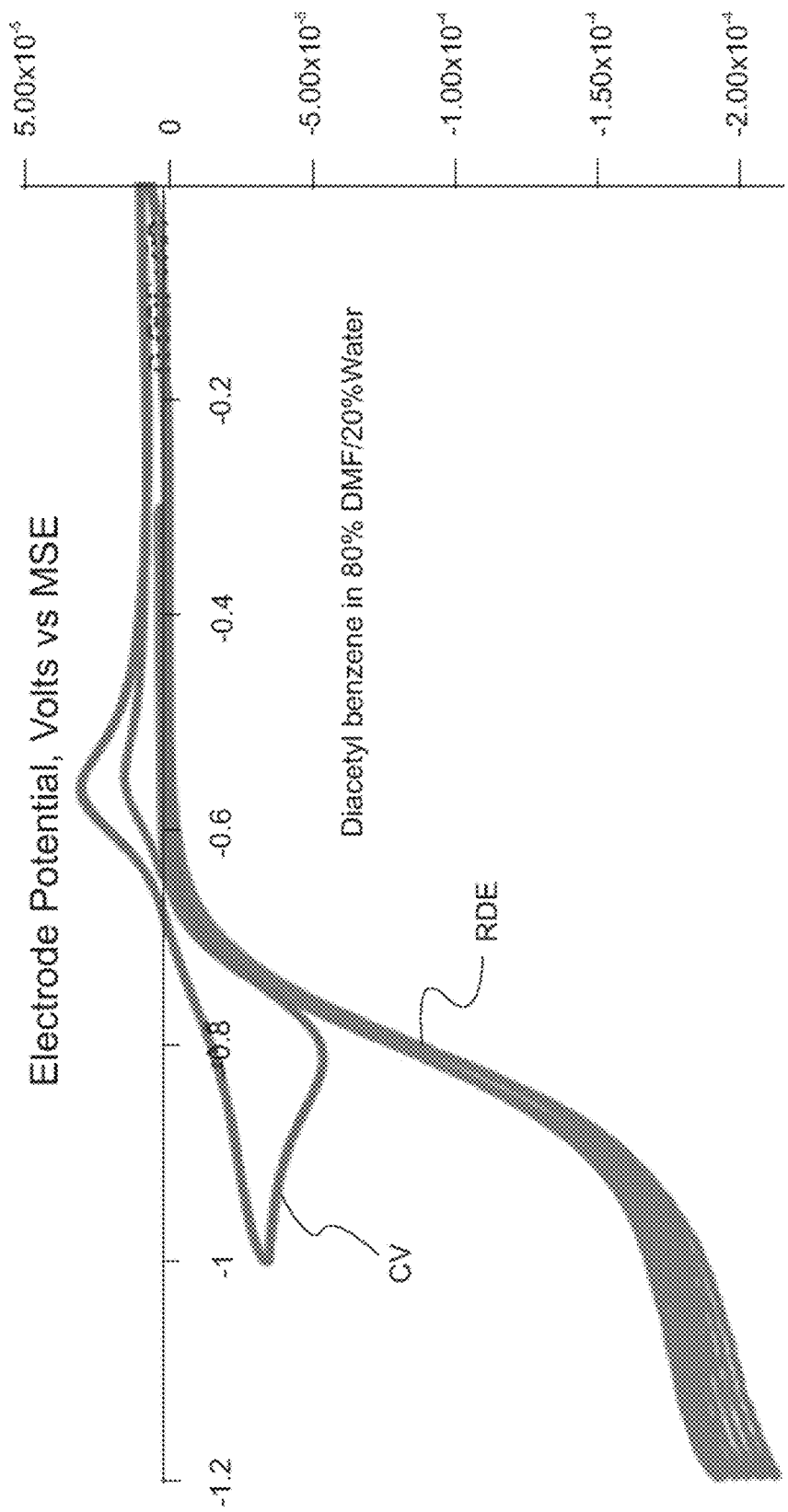
FIG. 27 provides a cyclic voltammogram for diacetyl benzene in 80% DMF/20% Water.
Figure 28:
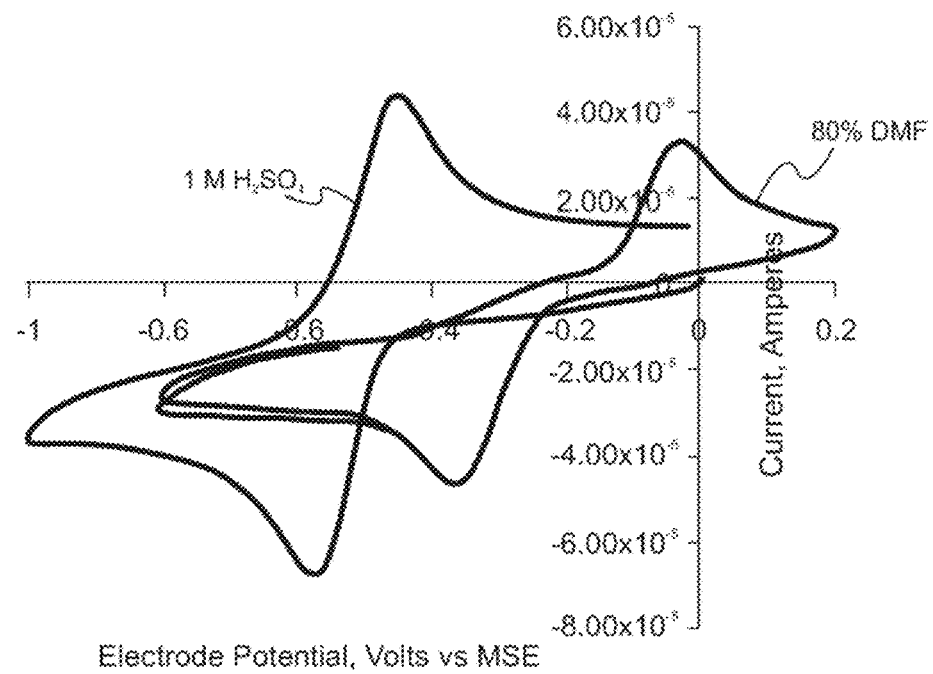
FIG. 28 provides a cyclic voltammogram for anthraquinone sulfonic acid in DMF and in 1M sulfuric acid.
Figure 29:
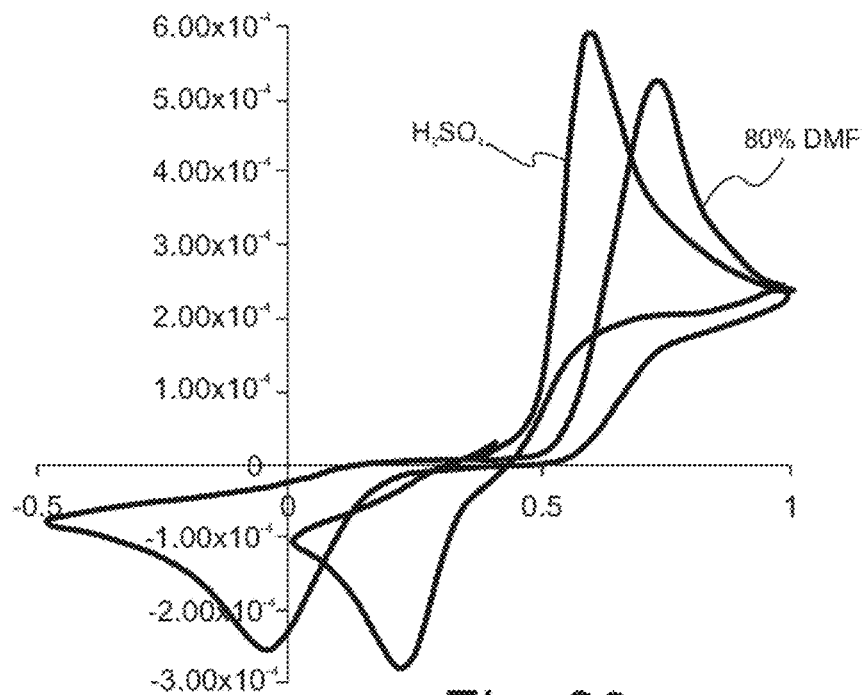
FIG. 29 provides a cyclic voltammogram for hydroquinone sulfonic acid in 1M sulfuric acid.

FIGS. 26-29 provide cyclic voltammograms for various examples of the compounds set forth above in mixed solvent systems. These figures demonstrate the reversibility and therefore suitability for flow cells. FIG. 26 provides a cyclic voltammogram TYLENOL® in 80% DMF/20% Water. It is notes that DMF does not enhance the reversibility of the electrochemistry. FIG. 27 provides a cyclic voltammogram for diacetyl benzene in 80% DMF/20% Water. FIG. 28 provides a cyclic voltammogram for anthraquinone sulfonic acid in DMF and in 1M sulfuric acid. This figure shows that the electrochemistry is reversible in DMF/water. There is also enhanced solubility in DMF/water (0.7 M). FIG. 29 provides a cyclic voltammogram for hydroquinone sulfonic acid in DMF and in 1M sulfuric acid.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A flow battery comprising:
a positive electrode;
a positive electrode electrolyte including water and a first redox couple that includes a first organic compound and a reduction product of the first organic compound, the positive electrode electrolyte flowing over and contacting the positive electrode, the positive electrode electrolyte having a pH from 0.5 to 6.5, wherein the first organic compound is a first quinone and the reduction product of the first organic compound is a first hydroquinone;
a negative electrode;
a negative electrode electrolyte including water and a second redox couple that includes a second organic compound and a reduction product of the second organic compound, the negative electrode electrolyte flowing over and contacting the negative electrode, the negative electrode electrolyte having a pH from 0.5 to 6.5, wherein the second organic compound is a second quinone and the reduction product of the second organic compound is a second hydroquinone; and
a polymer electrolyte membrane interposed between the positive electrode and the negative electrode, wherein the second quinone is described by formula 7:

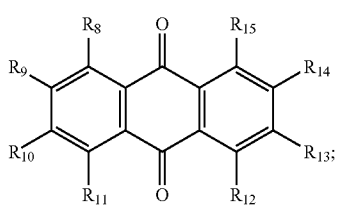

(7)

and
$R_8$-$R_{15}$ are each independently selected from the group consisting of H, —$SO_3H$, and electron donating groups with the proviso that at least one of $R_8$-$R_{15}$ is an electron-donating group.

2. The flow battery of claim 1 wherein the first organic compound is reduced to the reduction product of the first organic compound during discharge and the reduction product of the second organic compound is oxidized to the second organic compound during discharge.

3. The flow battery of claim 1 further comprising:
a positive electrode reservoir in fluid communication with the positive electrode, the positive electrode electrolyte being stored in the positive electrode reservoir to charge and discharge the flow battery; and
a negative electrode reservoir in fluid communication with the negative electrode, the negative electrode electrolyte being stored in the negative electrode reservoir to charge and discharge the flow battery.

4. The flow battery of claim 1 wherein the first organic compound has a standard electrode potential that is at least 0.3 volts higher than a standard electrode potential for the second organic compound.

5. The flow battery of claim 1 wherein the first organic compound has a standard electrode potential greater than 0.6 volts relative to a standard hydrogen electrode and the organic second compound has a standard electrode potential less than 0.3 volts relative to a standard hydrogen electrode.

6. The flow battery of claim 1 wherein the first organic compound has formula 5 or 6:

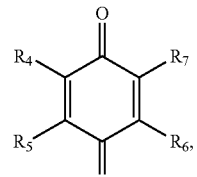

(5)

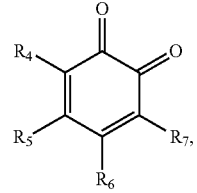

(6)

wherein $R_4$, $R_5$, $R_6$, $R_7$ are each independently selected from the group consisting of hydrogen and electron withdrawing groups.

7. The flow battery of claim 6 wherein $R_4$, $R_5$, $R_6$, $R_7$ are each independently —$NO_2$, —$N(R_2)_3^+X^-$, —$CF_3$, $CCl_3$, —CN, —$SO_3H$, —$PO_3H_2$, —COOH, —OH, —$O^-$ $M^+$, —$SO_3^-M^+$, —$PO_3^{2-}M^+_2$, —$COO^-M^+$, —$COOR_2$, F, Cl, Br, —CHO, —$COR_2$ where $R_2$ is H or $C_{1-10}$ alkyl, $M^+$ is a positively charged counter-ion, and $X^-$ is a negatively charge counter-ion.

8. The flow battery of claim 6 wherein $R_4$, $R_5$, $R_6$, $R_7$ are each independently H, —$NO_2$, —$CF_3$, or —$SO_3H$.

9. The flow battery of claim 6 wherein the first organic compound includes a component selected from the group consisting of:

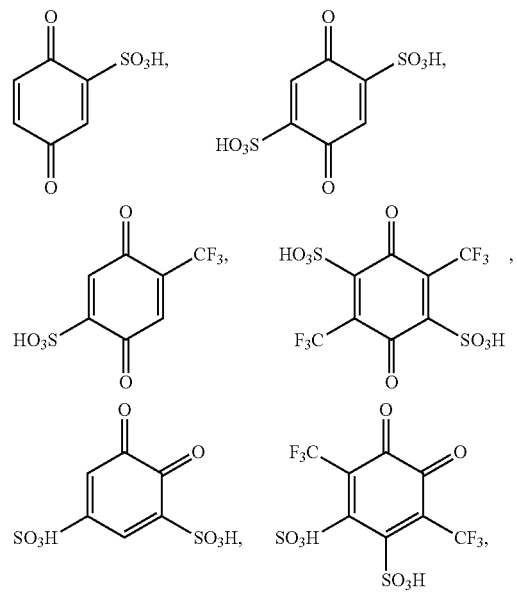

and salts thereof.

10. The flow battery of claim 1 wherein the second organic compound includes a component selected from the group consisting of:

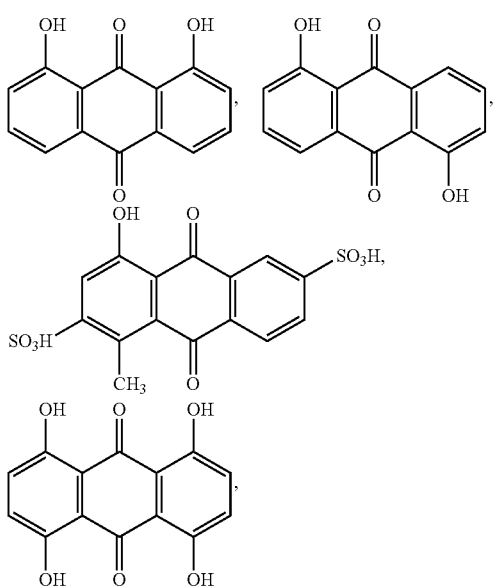

and salts thereof.

11. The flow battery of claim 1 wherein the first organic compound has formula 6:

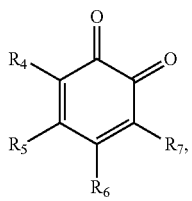

(6)

wherein $R_4$, $R_5$, $R_6$, $R_7$ are each independently selected from the group consisting of hydrogen and electron withdrawing groups.

12. The flow battery of claim 1 wherein the first organic compound includes a component selected from the group consisting of:

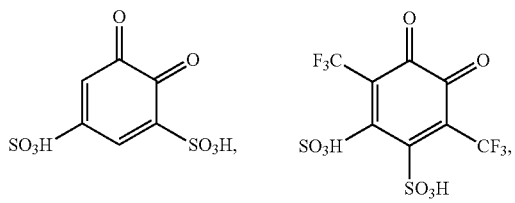 [SMILES: O=C1C=C(S(=O)(=O)O)C=C(S(=O)(=O)O)C1=O ; O=C1C(=O)C(C(F)(F)F)=C(S(=O)(=O)O)C(S(=O)(=O)O)=C1C(F)(F)F]

and salts thereof.

13. The flow battery of claim 1 wherein at least one of $R_8$-$R_{15}$ is $C_{1-10}$ alkyl, $NH_2$, —$NHR_2$, —$N(R_2)_2$, —$O^-M^+$, —$NHCOR_2$, —$OR_2$, —$CH_3$, —$C_2H_5$, or phenyl where $R_2$ is H or $C_{1-10}$ alkyl and $M^+$ is a positively charged counter ion.

14. The flow battery of claim 1 wherein at least one of $R_8$-$R_{15}$ is hydrogen, methoxy, —N-(dimethyl), or hydroxyl.

15. The flow battery of claim 1 wherein at least one of $R_8$-$R_{15}$ is —$SO_3H$, —$PO_3H_2$, —COOH, —OH, —$O^-M^+$, —$SO_3^-M^+_2$, —$PO_3^{2-}M^+_2$, —$COO^-M^+$, pyridinyl, imidazoyl, and pyrroyl, where $M^+$ is a positively charged counter ion.

16. The flow battery of claim 1 wherein at least one of $R_8$-$R_{15}$ is hydroxyl, $NH_2$, —$NHR_2$, $N(R_2)_2$, pyridinyl, imidazoyl, or pyrroyl, where $R_2$ is H or $C_{1-10}$ alkyl.

17. The flow battery of claim 1 wherein at least one of $R_8$-$R_{15}$ is hydroxyl.

18. The flow battery of claim 1 wherein at least one of $R_8$-$R_{15}$ is $NH_2$, —$NHR_2$, or $N(R_2)_2$, where $R_2$ is H or $C_{1-10}$ alkyl.

19. The flow battery of claim 1 wherein at least one of $R_8$-$R_{15}$ is pyridinyl, imidazoyl, or pyrroyl.

20. The flow battery of claim 1 wherein the second quinone includes a component selected from the group consisting of:

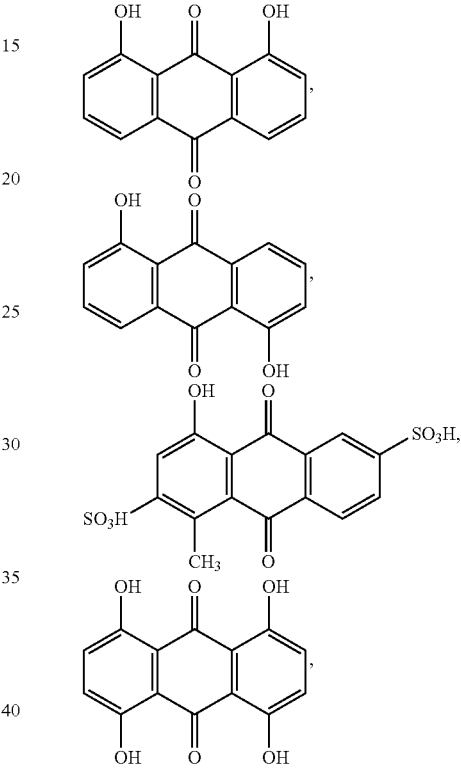

and salts thereof.

21. The flow battery of claim 1 wherein the positive electrode electrolyte and/or the negative electrode electrolyte includes a component selected from the group consisting of:

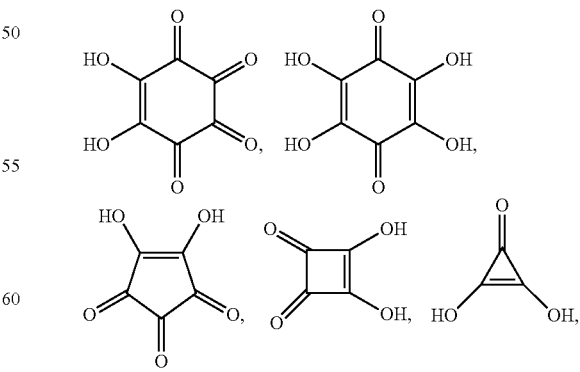

and salts thereof.

* * * * *